(12) United States Patent
Gysling

(10) Patent No.: US 12,209,894 B2
(45) Date of Patent: Jan. 28, 2025

(54) CORIOLIS METER APPARATUS AND METHODS FOR THE CHARACTERIZATION OF MULTIPHASE FLUIDS

(71) Applicant: Corvera, LLC, South Glastonbury, CT (US)

(72) Inventor: Daniel Gysling, South Glastonbury, CT (US)

(\*) Notice: Subject to any disclaimer, the term of this patent is extended or adjusted under 35 U.S.C. 154(b) by 0 days.

(21) Appl. No.: 17/800,039

(22) PCT Filed: Feb. 17, 2021

(86) PCT No.: PCT/US2021/018283
§ 371 (c)(1),
(2) Date: Aug. 16, 2022

(87) PCT Pub. No.: WO2021/167921
PCT Pub. Date: Aug. 26, 2021

(65) Prior Publication Data
US 2023/0160734 A1    May 25, 2023

Related U.S. Application Data

(63) Continuation-in-part of application No. 16/946,497, filed on Jun. 24, 2020, now Pat. No. 11,796,366.

(60) Provisional application No. 63/145,300, filed on Feb. 3, 2021, provisional application No. 62/706,986, filed on Sep. 22, 2020, provisional application No. 63/000,296, filed on Mar. 26, 2020, provisional application No. 62/977,653, filed on Feb. 17, 2020.

(51) Int. Cl.
*G01F 1/84* (2006.01)
*G01N 9/32* (2006.01)

(52) U.S. Cl.
CPC ........ *G01F 1/84* (2013.01); *G01N 9/32* (2013.01)

(58) Field of Classification Search
CPC .............................................. G01F 1/84–8495
See application file for complete search history.

(56) References Cited

U.S. PATENT DOCUMENTS

| | | |
|---|---|---|
| 7,360,452 B2 | 4/2008 | Rieder et al. |
| 2010/0134304 A1 | 6/2010 | Weinstein et al. |
| 2011/0023626 A1 | 2/2011 | Weinstein |
| 2014/0076035 A1 | 3/2014 | Henry |

*Primary Examiner* — Erika J. Villaluna
(74) *Attorney, Agent, or Firm* — Matthew J Patterson

(57) ABSTRACT

A flow measuring device capable of measuring at least parameters of a multiphase flow and to quantify an effect of decoupling on an interpretation of the parameters based on at least one characteristic of the multiphase fluid is disclosed. The flow measuring system includes various augmentations and enhancements to a Coriolis meter. The flow measuring system is capable of determining decoupling parameters that can be used to improve the output of a Coriolis meter. A method of retrofitting a Coriolis meter is also disclosed.

25 Claims, 63 Drawing Sheets

CORIOLIS METER APPARATUS AND METHODS FOR THE CHARACTERIZATION OF MULTIPHASE FLUIDS

CROSS REFERENCE TO RELATED APPLICATIONS

This application claims the benefit of Patent Cooperation Treaty Application Serial No. PCT/US21/18283 having a filing date of 17 Feb. 2021, U.S. Non-Provisional patent application Ser. No. 16/946,497 having a filing date of 24 Jun. 2020, U.S. Provisional Patent Application Ser. Nos. 62/977,653 having a filing date of 17 Feb. 2020, 63/000,296 having a filing date of 26 Mar. 2020, 62/706,986 having a filing date of 22 Sep. 2020 as well as 63/145,300 having a filing date of 3 Feb. 2021. The disclosure of the applications above are incorporated herein by reference in their entirety.

BACKGROUND OF THE INVENTION

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. The references cited and discussed in this specification are incorporated herein by reference in their entireties and to the same extent as if each reference was individually incorporated by reference. In terms of notation, hereinafter, "[n]" represents the nth reference cited in the reference list. For example, [2] represents the second reference cited in the reference list, namely, "Gysling, D, "An aeroelastic model of Coriolis mass and density meters operating on aerated mixtures" Journal of Flow Measurement and Instrumentation, Volume 18, Issue 2, April 2007, Pages 69-77".

FIELD OF THE INVENTION

Embodiments of the disclosure generally relate to apparatus and methods for determining flow characteristics using Coriolis flow meters in inhomogeneous and compressible process fluid flow regimes.

DESCRIPTION OF THE RELATED ART

Coriolis meters are designed to provide a measurement of the mass flow and/or density of a fluid flow passing through a pipe. It is known that Coriolis meters provide erroneous mass flow and density measurements in the presence of entrained gases and or particles within the fluid flow (e.g., entrained gases within liquid are known as bubbly gas). There have been attempts in the prior art for compensating the Coriolis meter to provide corrected or improved density and/or mass flow measurements for Coriolis meters operating on multiphase mixtures such as references Gysling [2], [8], and [9], Zhu [11]. Other prior art references that attempt address the effects of compressibility on a Coriolis meter include Cage [6] and Weinstein [4]. Such prior art attempts at compensating errors of mass flow and density of Coriolis flow meters due to presence of entrained gas have many limitations and, in many applications, have failed to provide accurate measure of the process fluid as will be described in more detail herein below.

As discussed immediately above, it is well known that bubbly liquids can degrade the ability of Coriolis mass and density flow meters to accurately measure process fluid mass flow and density. The vast majority of current, state of the art Coriolis flow meters operate under an assumption that the process fluid is both homogeneous and incompressible. The literature is replete with examples of how the introduction of bubbles into the process fluid flowing through a Coriolis meter can degrade the accuracy of a Coriolis meter operating under an assumption that the fluid is homogeneous and incompressible. The literature describes how bubbles impact the accuracy of Coriolis meters through two primary mechanisms, compressibility and decoupling.

What is needed are devices and methodologies that provide in-situ quantification of decoupling effects within Coriolis meters operating on multiphase flows to improve the ability of Coriolis meters to accurately determine physical characteristics of multiphase phase flows, including but not limited to one of more of the following: mixture mass flow, mixture density, liquid density, gas void fraction, bubble size.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of measuring a multiphase fluid. The method also includes providing a flow measuring device that may include at least one fluid-conveying flow tube conveying the multiphase fluid, measuring a first measured parameter of the multiphase fluid, measuring at least one additional measured parameter of the multiphase fluid, providing a processing unit for analyzing the first measured parameter and the at least one additional measured parameter, determining at least one decoupling parameter using at least one of the first measured parameter and the at least one additional measured parameter, and quantifying, using the at least one decoupling parameter in a decoupling model, an effect of variable levels of decoupling on an interpretation of at least one of the first measured parameter and the at least one additional measured parameter in terms of at least one characteristic of the multiphase fluid. Other embodiments of this aspect include corresponding computer systems, apparatus, and computer programs recorded on one or more computer storage devices, each configured to perform the actions of the methods.

Implementations may include one or more of the following features. The method may include where the determining at least one decoupling parameter may include: identifying, experimentally, the at least one decoupling parameter, producing a range of decoupling parameters, and specifying at least one specific decoupling parameter based on at the at least one of the first measured parameter and the at least one additional measured parameter in terms of the at least one characteristic of the multiphase fluid. The method may include: determining a mass flow rate of the multiphase fluid based on the at least one decoupling parameter and the at least one characteristic of the multiphase fluid. The determining the at least one decoupling parameter is determined concurrently with the at least one characteristic of the multiphase fluid. Measuring the first measured parameter and the at least one additional measured parameter are measured at a plurality of instances over which at least one characteristic of the multiphase fluid is varying and at least one characteristic of the multiphase fluid is constant or known and where the determining the at least one decoupling parameter may include using the plurality of instances of measuring the first measured parameter and the at least one additional measured parameter. The first measured parameter is a measured Coriolis frequency and the at least one additional measured parameter is a measured multiphase fluid speed of sound. The first measured parameter is indicative of a first measured Coriolis density at a first measured frequency and the at least one additional measured parameter is a second measured Coriolis density at a second frequency. Determining the at least one decoupling parameter may include determining a first decoupling parameter at the first measured frequency and determining a second decoupling parameter using the first decoupling parameter, the first measured frequency and the second frequency. The measuring of the first measured parameter and the at least one additional measured parameter are measured simultaneously over at least one period of time for which a characteristic of the multiphase fluid is essentially constant. The first measured parameter is a measured Coriolis density and the at least one additional measured parameter is a measured speed of sound. The first measured parameter is indicative of a first measured Coriolis density at a first measured frequency and the at least one additional measured parameter is a second measured Coriolis density at a second frequency. Determining the at least one decoupling parameter may include determining a first decoupling parameter at the first measured frequency and determining a second decoupling parameter using the first decoupling parameter, the first measured frequency and the second frequency. The first measured parameter is a measured Coriolis density and the at least one additional measured parameter may include a measured differential pressure, a measured Coriolis mass flow and a measured speed of sound. The first measured parameter is a measured Coriolis density and the at least one additional measured parameter may include a measured differential pressure and a measured Coriolis mass flow. The first measured parameter is a measured Coriolis density and the at least one additional measured parameter may include a measured differential pressure, a measured Coriolis mass flow and a speed of sound of the multiphase fluid. The first measured parameter is indicative of a first measured Coriolis density at a first measured frequency and the at least one additional measured parameter may include a measured differential pressure, a measured Coriolis mass flow and a second measured Coriolis density at a second frequency. Determining the at least one decoupling parameter may include determining a first decoupling parameter at the first measured frequency and determining a second decoupling parameter using the first decoupling parameter, the first measured frequency and the second frequency. The at least one decoupling parameter may include a density decoupling parameter and where the density decoupling parameter is utilized to determine a mass flow decoupling parameter and the at least one characteristic of the multiphase fluid includes a mass flow of the multiphase fluid. The method may include: determining a bubble size parameter using the at least one decoupling parameter. Implementations of the described techniques may include hardware, a method or process, or computer software on a computer-accessible medium.

One general aspect includes a flow measuring device may include: at least one flow tube configured to convey a multiphase fluid and capable of measuring a first measured a first measured parameter of the multiphase fluid, and the flow measuring device further configured to measure at least one additional measured parameter of the multiphase fluid. The system also includes a processing unit configured to: receive the first measured parameter and the at least one additional measured parameter; determining at least one decoupling parameter using at least one of the first measured parameter and the at least one additional measured parameter; and quantify, by using the at least one decoupling parameter in a decoupling model, an effect of variable levels of decoupling on an interpretation of at least one of the first measured parameter and the at least one additional measured parameter in terms of at least one characteristic of the multiphase fluid. Other embodiments of this aspect include corresponding computer systems, apparatus, and computer programs recorded on one or more computer storage devices, each configured to perform the actions of the methods.

Implementations may include one or more of the following features. The flowmeter system may include where the processing unit is configured to specify, based on at the at least one of the first measured parameter and the at least one additional measured parameter in terms of the at least one characteristic of the multiphase fluid, at least one specific decoupling parameter from a range of decoupling parameters, where the range of decoupling parameters is experimentally identified. The flowmeter system is further configured to determine a mass flow rate of the multiphase fluid based on the at least one decoupling parameter and the at least one characteristic of the multiphase fluid. The flowmeter system may include where the processing unit is configured to determine the at least one decoupling parameter concurrently with the at least one characteristic of the multiphase fluid. The flowmeter system is further configured to measure the first measured parameter and the at least one additional measured parameter at a plurality of instances over which at least one characteristic of the multiphase fluid is varying and at least one of characteristic of the multiphase fluid are constant or known and to determine the at least one decoupling parameter using the plurality of instances of measuring the first measured parameter and the at least one additional measured parameter. The flow measuring device may include a Coriolis meter and a sound speed meter and where the first measured parameter is a measured Coriolis frequency and the at least one additional measured parameter is a measured multiphase fluid speed of sound. The flow measuring device may include a dual frequency Coriolis meter and where the first measured parameter is indicative of a first measured Coriolis density at a first frequency and the at least one additional measured parameter is a second measured Coriolis density at a second frequency. The flowmeter system is further configured to determine the at least one decoupling parameter may include by determining a first decoupling parameter at the first frequency and by determining a second decoupling parameter using the first decoupling parameter, the first frequency and the second frequency. The flowmeter system is further configured to measure the first measured parameter and the at least one additional measured parameter are measured simultaneously over at least one period of time for which a characteristic of the multiphase fluid is essentially constant. The flow measuring device may include a Coriolis meter and a sound speed meter and where the first measured parameter is a measured Coriolis density and the at least one additional measured parameter is a measured speed of sound. The flow measuring device may include a dual frequency Coriolis meter and where the first measured parameter is indicative of a first measured Coriolis density at a first frequency and the at least one additional measured parameter is a second measured Coriolis density at a second frequency. The flowmeter system is further configured to determine the at least one decoupling parameter by determining a first decoupling parameter at the first frequency and by determining a second decoupling parameter using the first decoupling parameter, the first frequency and the second frequency. The flow measuring device may include a Coriolis meter, a differential pressure meter and a sound speed meter and where the first measured parameter is a measured Coriolis density and the at least one additional measured parameter may include a measured differential pressure, a measured Coriolis mass flow and a measured speed of sound. The flow measuring device may include a Coriolis meter and a differential pressure meter and where the first measured parameter is a measured Coriolis density and the at least one additional measured parameter may include a measured differential pressure and a measured Coriolis mass flow. The flow measuring device may include a Coriolis meter, a differential pressure meter and a sound speed meter and where the first measured parameter is a measured Coriolis density at a first frequency and the at least one additional measured parameter may include a measured differential pressure, a measured Coriolis mass flow and a speed of sound of the multiphase fluid. The flow measuring device may include a dual frequency Coriolis meter and a sound speed meter and where the first measured parameter is indicative of a first measured Coriolis density at a first frequency and the at least one additional measured parameter may include a measured differential pressure, a measured Coriolis mass flow and a second measured Coriolis density at a second frequency. The flowmeter system is further configured to determine the at least one decoupling parameter may include by determining a first decoupling parameter at the first frequency and by determining a second decoupling parameter using the first decoupling parameter, the first frequency and the second frequency. The at least one decoupling parameter may include a density decoupling parameter and where the density decoupling parameter is utilized to determine a mass flow decoupling parameter and the at least one characteristic of the multiphase fluid includes a mass flow of the multiphase fluid. The flowmeter system is further configured to determine a bubble size parameter using the at least one decoupling parameter. Implementations of the described techniques may include hardware, a method or process, or computer software on a computer-accessible medium.

One general aspect includes a method of retrofitting a Coriolis meter. The method also includes configuring the Coriolis meter to measure at least one additional measured parameter of the multiphase process fluid; and configuring the processing unit to receive the first measured parameter and the at least one additional measured parameter, to determine at least one decoupling parameter using at least one of the first measured parameter and the at least one additional measured parameter and to quantify, using the at least one decoupling parameter in a decoupling model, an effect of variable levels of decoupling on an interpretation of at least one of the first measured parameter and the at least one additional measured parameter in terms of at least one characteristic of the multiphase process fluid. Other embodiments of this aspect include corresponding computer systems, apparatus, and computer programs recorded on one or more computer storage devices, each configured to perform the actions of the methods.

Implementations may include one or more of the following features. The method may include configuring the processing unit to specify, based on at the at least one of the first measured parameter and the at least one additional measured parameter in terms of the at least one characteristic of the multiphase process fluid, at least one specific decoupling parameter from a range of decoupling parameters, where the range of decoupling parameters is experimentally identified. The method may include configuring the processing unit to determine a mass flow rate of the multiphase fluid based on the at least one decoupling parameter and the at least one characteristic of the multiphase fluid. The method may include configuring the processing unit to determine the at least one decoupling parameter concurrently with the at least one characteristic of the multiphase process fluid. The method may include configuring the processing unit to configured to measure the first measured parameter and the at least one additional measured parameter at a plurality of instances over which at least one characteristic of the multiphase fluid is varying and at least one of characteristic of the multiphase fluid are constant or known and to determine the at least one decoupling parameter using the plurality of instances of measuring the first measured parameter and the at least one additional measured parameter. The first measured parameter is a measured Coriolis frequency and the at least one additional measured parameter is a measured multiphase process fluid speed of sound. The Coriolis meter may include a dual frequency Coriolis meter and where the first measured parameter is indicative of a first measured Coriolis density at a first measured frequency and the at least one additional measured parameter is a second measured Coriolis density at a second frequency. The method may include configuring the processing unit to determine the at least one decoupling parameter may include by determining a first decoupling parameter at the first measured frequency and by determining a second decoupling parameter using the first decoupling parameter, the first measured frequency and the second frequency. The method may include configuring the processing unit to measure the first measured parameter and the at least one additional measured parameter simultaneously over at least one period of time for which a characteristic of the multiphase process fluid is essentially constant. The first measured parameter is a measured Coriolis density and the at least one additional measured parameter is a measured speed of sound. The Coriolis meter may include a dual frequency Coriolis meter where the first measured parameter is indicative of a first measured Coriolis density at a first measured frequency and where the at least one additional measured parameter is a second measured Coriolis density at a second measured frequency. The method may include configuring the processing unit to determine the at least one decoupling parameter by determining a first decoupling parameter at the first measured frequency and by determining a second decoupling parameter using the first decoupling parameter, the first measured frequency and the second measured frequency. The first measured parameter is a measured Coriolis density and the at least one additional measured parameter may include a measured differential pressure, a measured Coriolis mass flow and a measured speed of sound. The first measured parameter is a measured Coriolis density and the at least one additional measured parameter may include a measured differential pressure and a measured Coriolis mass flow. The first measured parameter is a measured Coriolis density at a first frequency and the at least one additional measured parameter may include a measured differential pressure, a measured Coriolis mass flow and a speed of sound of the multiphase process fluid. The Coriolis meter may include a dual frequency Coriolis meter and where the first measured parameter is indicative of a first measured Coriolis density at a first measured frequency and the at least one additional measured parameter may include a measured differential pressure, a measured Coriolis mass flow and a second measured Coriolis density at a second frequency. The method may include configuring the processing unit to determine the at least one decoupling parameter may include by determining a first decoupling parameter at the first measured frequency and by determining a second decoupling parameter using the first decoupling parameter, the first measured frequency and the second frequency. The at least one decoupling parameter may include a density decoupling parameter and where the density decoupling parameter is utilized to determine a mass flow decoupling parameter and the at least one characteristic of the multiphase process fluid includes a mass flow of the multiphase process fluid. The method may include configuring the processing unit to determine a bubble size parameter using the at least one decoupling parameter. Implementations of the described techniques may include hardware, a method or process, or computer software on a computer-accessible medium.

BRIEF DESCRIPTION OF THE DRAWINGS

So that the manner in which the above-recited features of the present disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2823 is a graphical representation of an optimization function over a range of decoupling parameter versus watercut in accordance with the present disclosure;

FIG. 24 is a graphical representation of an optimization function over a range of decoupling parameter versus watercut in accordance with the present disclosure;

DETAILED DESCRIPTION

Figure 1:
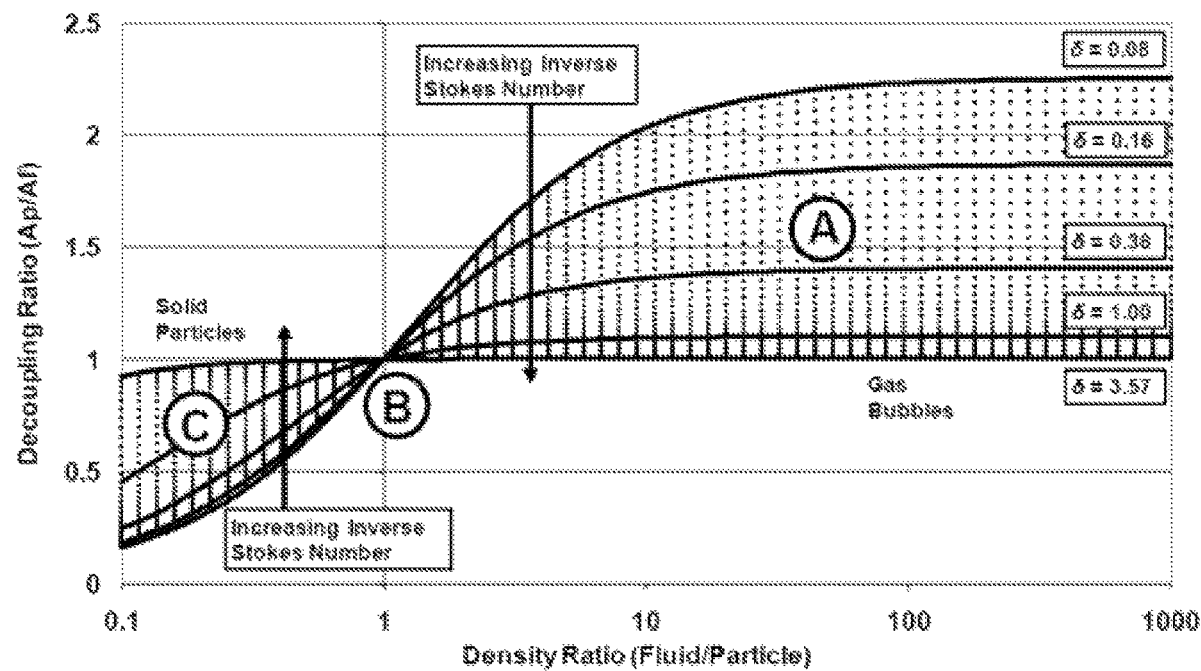
FIG. 1 is a graphical representation of flow characteristics for a fluid mixture from the prior art.

In the following detailed description of the embodiments, reference is made to the accompanying drawings, which form a part hereof, and within which are shown by way of illustration specific embodiments by which the examples described herein can be practiced. It is to be understood that other embodiments can be utilized, and structural changes can be made without departing from the scope of the disclosure.

With respect to Coriolis meters operating in process fluid flows, compressibility effects are known to scale with the reduced frequency of the tube vibration in a Coriolis flow meter. The reduced frequency can be defined as follows:

$$f_{red} \equiv \frac{2\pi f_{tube} D/2}{a_{mix}}. \quad \text{(Equation 1)}$$

Where $f_{tube}$ is the vibrational frequency of the tube, D is the inner diameter of the tube, and $\alpha_{mix}$ is the sound speed of the process fluid. The reduced frequency is a non-dimensional number that characterizes the impact of fluid compressibility Coriolis flow meters, and, as shown, is related to the inverse of the sound speed of the process fluid.

Decoupling of a multiphase fluid undergoing transverse vibration, such as that that occurs within a vibrating Coriolis flow tube, occurs when different components of the fluid move in a non-uniform manner. The degree of decoupling for bubbles or particles within a multiphase fluid tends to scale with inversely with the inverse Stokes number. For bubbly flows, the inverse Stokes number is defined as follows:

$$\delta \equiv \sqrt{\frac{2\mu}{\rho \omega R_{bubble}^2}}. \quad \text{(Equation 2)}$$

Where $\mu$ is the dynamic viscosity of the liquid, $\rho$ is the density of the liquid, $\omega$ is the frequency, and $R_{bubble}$ is the radius of the bubbles. The smaller the inverse Stokes number, i.e. less viscous fluid, larger bubbles, higher frequency vibration, the more decoupling that occurs, with the maximum decoupling occurring at the inviscid limit, associated with the inverse Stokes number approaching zero. For large inverse Stokes numbers, i.e. more viscous fluid, smaller bubbles, lower vibrational frequency, the bubbles will tend to track with the liquid as the tube oscillates transversely and the effects of decoupling are minimized.

As part of the present disclosure, it has been discovered that, following a conceptual model developed by Hemp [1], the density and mass flow rate measured by a prior art Coriolis meter that was calibrated on an essentially homogenous and incompressible fluid, but operating on a bubbly fluid, can be expressed in terms of actual multiphase liquid density and mixture mass flow rate as follows:

$$\rho_{meas} = \left(1 - K_d \alpha + G_d (f_{red})^2\right) \rho_{liq}; \quad \text{(Equation 3)}$$

and $$\dot{m}_{meas} = \left(1 - \frac{(K_m - 1)}{1 - \alpha}\alpha + G_m(f_{red})^2\right)\dot{m}_{mix}. \quad \text{(Equation 4)}$$

Where $\rho_{liq}$ is the density of the liquid component of the multiphase mixture, $\dot{m}_{mix}$ is the mass flow rate of the mixture. Since the mass flow rate of the gas of a bubbly mixture is typically negligible compared to the liquid, the mixture mass flow rate and the liquid mass flow rate are essentially the same. The at least two decoupling parameters $K_d$ and $K_m$ are defined as real numbers in the range of $1 > K_d > 3$ and $1 > K_m > 3$ and depend at least on the inverse Stokes number. It should be appreciated by those skilled in the art that the decoupling ratio of the prior art is, in general, a complex number indicating a magnitude difference and phase lag between the motion of the fluid and the motion of the bubble. As part of the present disclosure, this relationship between the decoupling ratio and the decoupling parameters, $K_d$ and $K_m$, is inventively simplified to a real number that is sufficient to characterize the continuum between a fully coupled multiphase fluid $K_d=1$ and $K_m=1$, and the inviscid limit where $K_d=3$ and $K_m=3$. In addition the compressibility parameter $G_d$ and $G_m$ can be determined empirically in general, but can be assumed for purposes of illustration, to be $G_d=0.25$ and $G_m=0.50$.

Although the decoupling parameters $K_d$ and $K_m$ can, in some circumstances, be treated as being constant over a limited range of conditions, it is inventively disclosed that they can be determined on a real time or quasi-real time basis in some embodiments of this disclosure. In some embodiments of the present disclosure, and as will be disclosed in more detail herein after, by measuring a first measured parameter and at least one additional measured parameter a decoupling parameter can be determined and a model is employed to capture the effects of decoupling which can be referred to herein as a decoupling model. Note, that in Equation 3, $K_d$ is the decoupling parameter, which can be specified or determined as part of an optimization. Although $K_d$ is a parameter utilized in the decoupling model, it does not specify the decoupling effects and is but at least one decoupling parameter as will be disclosed herein after. The product of gas void fraction, $\alpha$, and $K_d$ specifies the decoupling effects. Thus, it is the models for the effects of decoupling and compressibility on Coriolis meter (Equation 3 and 4) that quantify the effects of decoupling, and compressibility on the relationship between the measured density and the actual liquid density (Equation 3) and the relationship between the measured mass flow and the actual mass flow rate (Equation 4).

It is noted that the compressibility and decoupling models disclosed herein can be used as examples, but it is recognized that other models addressing similar phenomena could be used within the context of the methodology taught in this disclosure.

Referring to FIG. 1 from the prior art, there is shown that the Decoupling Ratio as described in [3] as the amplitude ratio of the displacement of an entrained particle in an oscillating fluid as a function of particle to fluid density ratio for a range of inverse Stokes numbers. In reference [3], bubbles and solids are each referred to as particles. The plots are a result of a calculation of an analytical model of a single particle in an infinite fluid. Although actual bubbly flows within a Coriolis meter would be significantly more complex with varying bubble size and size distributions, the model used to produce the plots does serve to illustrate some of the complexity associated with estimating a decoupling parameter for representative flow fields.

The appropriate value of the density decoupling parameters, $K_d$ as defined in Equation 3, and the mass flow decoupling parameter, $K_m$ as defined in Equation 4, will be dependent on parameters which are often unknown and difficult to predict or measure, such as, for example, bubble size and distribution of said bubbles. However, to accurately interpret density and mass flow measurements in non-homogeneous fluids, characterizing the effect of decoupling can be important. Embodiments of the present disclosure include methods for empirically determining values for decoupling parameters and methods for correcting for the effects of compressibility and decoupling on the output of a Coriolis meter.

As disclosed in Gysling [8], [9], it is known that augmenting a Coriolis meter with a representative measurement of the speed of sound of the process fluid can improve the accuracy of a Coriolis meter operating in multiphase flows. What has been discovered is, for a bubbly liquid, the relationship among the gas void fraction and liquid density and the measured vibrational frequency of the flow tube of the Coriolis meter and the measured speed of sound can be determined utilizing methods that include a model of the decoupling and compressibility characteristics within the Coriolis meter. As disclosed herein, adding a process fluid sound speed measurement to a Coriolis density and mass flow measurement and using a model that quantifies the decoupling effects of bubbles on a Coriolis density and mass flow measurement enables the in-situ determination of mass flow, liquid density, and gas void fractions of bubbly mixtures. The interpretation of measured parameters in terms of multiphase flow characteristics, in general, requires other available, or readily estimated parameters of the mixture, such as process fluid pressure, process fluid temperature, gaseous phase sound speed and density, liquid phase sound speed. Embodiments disclosed herein, are in part enabled by use of the well-known Wood's Equation relating the speed of sound to the compositional characteristics of the bubbly fluid as set forth in Equation 5 below. As known to those skilled in the art, Wood's equation provides a relationship between the mixture characteristics and the speed of sound. Other equations can be utilized to provide this relationship (Temkin [13]).

It should be appreciated by those skilled in the art that for sound propagating within a conduit for which the wavelength is large compared to both the length scale of the fluid inhomogeneities and the cross-sectional length scale of the conduit, Wood's Equation relates the measured mixture sound speed and density to the phase fractions, density and sound speeds of the components. The elasticity E of the conduit also enters into Wood's equation, for a thin-walled (i.e. the ratio of wall thickness to radius is small), circular cross section conduit of outer diameter D and wall thickness of t is given as follows:

$$\frac{1}{\rho_{mix} a_{meas}^2} = \sum_{i=1}^{N} \frac{\varphi_i}{\rho_i a_i^2} + \frac{D-t}{Et}. \quad \text{(Equation 5)}$$

And wherein the mixture density is given by the following:

$$\rho_{mix} = \sum_{i=1}^{N} \varphi_i \rho_i \quad \text{(Equation 6)}.$$

If the process liquid density is not known, the determination of gas void fraction based on a measured sound speed and knowledge of the gas properties is not uniquely defined. Combining process fluid density measurement, as measured by a Coriolis meter operating on the bubbly mixture, and a process fluid sound speed measurement with a model for the effect of compressibility and decoupling associated with a bubbly mixture on a Coriolis density measurement enables an improved determination of both the process liquid density and the gas void fraction as described below:

For a bubbly liquid, Wood's Equation can be expressed as follows:

$$\frac{1}{\rho_{mix} a_{meas}^2} = \frac{\alpha}{\rho_{gas} a_{gas}^2} + \frac{1-\alpha}{\rho_{liq} a_{liq}^2} + \frac{D-t}{Et}. \quad \text{(Equation 7)}$$

Where $\alpha$ is the gas void fraction and the mixture density is given by:

$$\rho_{mix} = \alpha \rho_{gas} + (1-\alpha) \rho_{liq} \quad \text{(Equation 8)}.$$

The measured speed of sound for the mixture can be expressed as a function of the gas void fraction and the fluid properties and properties of the conduit as follows:

$$a_{meas} = sqrt\left(\frac{1}{\left(\rho_{mix}\left(\frac{\alpha}{\rho_{gas} a_{gas}^2} + \frac{1-\alpha}{\rho_{liq} a_{liq}^2} + \frac{D-t}{Et}\right)\right)}\right). \quad \text{(Equation 9)}$$

As developed above, the density measurement from the Coriolis meter, (operating on a bubbly mixture and based on interpreting the natural frequency of the flow tube vibration in terms of a calibration developed for an essentially single phase, essentially incompressible fluid), is related to 1) the density of the liquid phase; 2) the gas void fraction; and 3) the reduced frequency, as a function of mixture sound speed, the decoupling parameter $K_d$, and the compressibility parameter, $G_d$ is expressed as follows:

$$\rho_{meas} = \rho_{liq}(1 - K_d \alpha + G_d(f_{red})^2) \quad \text{(Equation 10)}.$$

Note that if the decoupling and compressibility parameters are known, and the sound speed of the liquid component and the speed of sound and density of the gas are known, Equations 8, 9 and 10 can be solved for the three unknowns of $\rho_{liq}$, $\rho_{mix}$, and $\alpha$. It should be appreciated by those skilled in the art that errors in estimating the sound speed of the liquid component in the mixture, provided it is a reasonable estimate, have little impact on the accuracy of the determination of liquid density and gas void fraction for gas void fractions on the order of approximately 1% and above. As such, any inability to precisely determine the speed of sound of the liquid phase of a bubbly mixture is not viewed as limiting the applicability of embodiments of the present disclosure to a wide range of applications. The density and speed of sound of the gas component is typically well-modelled knowing the gas composition and using an equation of state model for the gas properties.

A Method of Solving for Liquid Density and Gas Void Fraction of Bubbly Liquids

In accordance with one embodiment of this disclosure, for applications in which the decoupling and compressibility parameters are assumed known, a method to solve for the liquid density and the gas void fraction involves defining: 1) an error function based on comparing a measured density from a Coriolis meter to a simulated trial measured density; and 2) a measured sound speed to a simulated trial measured sound speed. Trial values for characteristics of the multiphase flows (liquid density and gas void fraction) are used as input to the models developed herein to calculate trial values for the measured parameters associated with the trial values for the flow characteristics. The difference between the actual measured parameters and the trial simulated measured parameters forms the basis of an error function. The optimized liquid density and gas void fraction can then be determined by adjusting the trial liquid densities and trial gas void fractions over a range of allowable values such that the error function is minimized. As those skilled in the art are aware, there are many methods to solve the set of coupled non-linear equations. In this disclosure, the error function is evaluated over a grid of trial values for the multiphase flow characteristics and the characteristics associated with the smallest error function are selected as the optimized answer.

Trial values for the liquid density and gas void fraction can span the range of allowable values for the individual characteristics. For example, for a mixture of oil, water, and gas, the allowable range of liquid densities could span range of densities between the oil component and the water component. If additional knowledge is available to reduce the range of allowable parameters, the allowable range of trial values could be constrained. For example, if, it is known that the gas void fraction is less than 10% by volume, this constraint could be placed on the allowable trial gas void fraction assessed in any optimization.

One embodiment of an error function is given in the following equation:

$$\text{error} = \alpha_1 \left( \frac{\rho_{meas_{trial}} - \rho_{meas_{actual}}}{\rho_{meas_{actual}}} \right)^2 + \alpha_2 \left( \frac{a_{meas_{trial}} - a_{meas_{actual}}}{a_{meas_{actual}}} \right)^2 \quad \text{(Equation 11)}$$

Where $\rho_{meas}$ is a density measured by a Coriolis meter calibrated on a single phase fluid, and $a_{meas}$ is the speed of sound of the process fluid and $\alpha_1$ and $\alpha_2$ are weighting constants for the optimization and $$\rho_{meas_{trial}} = \rho_{liq_{trial}} \left( 1 - K_d \alpha_{trial} + \frac{1}{4} \left( \frac{2\pi f_{tube} R_{tube}}{a_{meas_{trial}}} \right)^2 \right). \quad \text{(Equation 12)}$$

In Equation 11, $\rho_{meas_{actual}}$ is the density reported from the Coriolis meter that was calibrated on a single phase flow at negligible reduced frequency, and $\alpha_{meas_{actual}}$ is the measured speed of sound of the process fluid within the flow tubes of the Coriolis meter. The trial speed of sound of the mixture used in Equation 11 is characterized as follows:

$$a_{meas_{trial}} = sqrt\left( \frac{1}{\left( \rho_{mix_{trial}} \left( \frac{\alpha_{trial}}{\rho_{gas} a_{gas}^2} + \frac{1 - \alpha_{trial}}{\rho_{liq_{trial}} a_{liq}^2} + \frac{D-t}{Et} \right) \right)} \right). \quad \text{(Equation 13)}$$

The trial density of the mixture in Equation 13 is characterized as follows:

$$\rho_{mix_{trial}} = \alpha_{trial} \rho_{gas} + (1 - \alpha_{trial}) \rho_{liq_{trial}} \quad \text{(Equation 14).}$$

As noted above, the sound speed of the liquid phase of a bubbly mixture has little impact on the optimized values for liquid density and gas void fraction. In some embodiments of the present disclosure the process liquid can comprise a mixture of liquids such as a mixture of oil and water commonly found in the oil and gas industry. For the calculations shown in Equations 11-14, the trial values for liquid density and the liquid sound speed were linked together as a function of watercut based on Wood's Equation for an oil and water mixture over a range of watercuts using fixed values for the density and sound speeds of the oil and water components.

Figure 2:
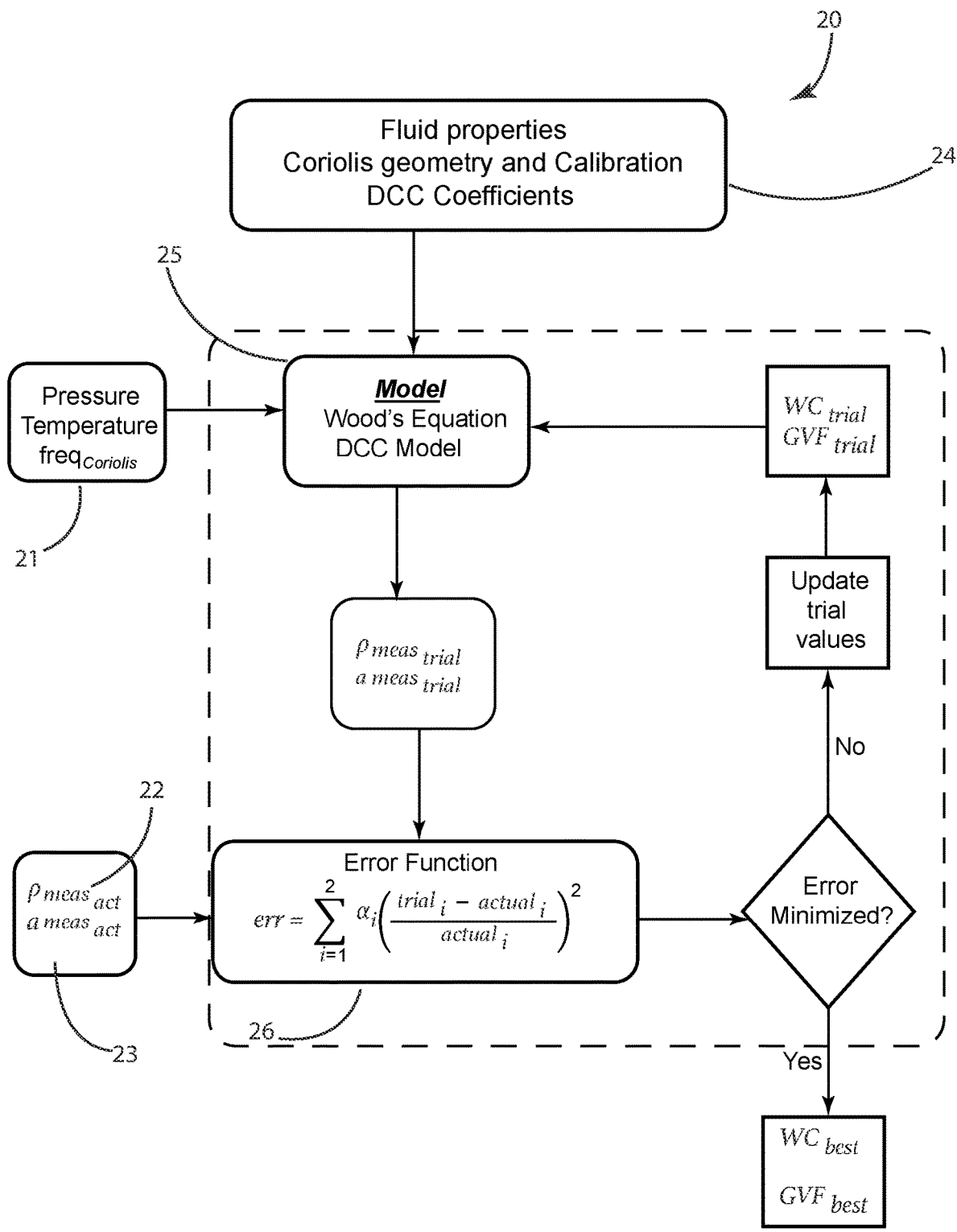
FIG. 2 is a schematic representation of an optimization process in accordance with the present disclosure.

Referring now to FIG. 2, there is shown a schematic diagram of an optimization process 20 to determine watercut and gas void fraction of a three phase fluid comprised of oil, water and entrained gas. Optimization process 20 involves using the measured Coriolis frequency 21 of Coriolis flow tubes (and the associated measured density 22 interpreted therefrom based on calibration using an essentially incompressible, homogeneous fluid) and a measured process fluid speed of sound 23 with known Coriolis decoupling and compressibility parameters 24. Optimization process 20 further uses a measured pressure and measured temperature of the process fluid as inputs into model 25 (which model can comprise Wood's Equation and Coriolis density over-reading models among other models relating to characterizing bubbly fluids) along with known fluid properties and parameters related specifically to the Coriolis meter. For a given set of trial watercut and gas void fraction, model 25 outputs a trial measured density and a trial sound speed as input to the error function 26.

The method of optimization of the error function 26 to determine the gas void fraction and liquid density of a bubbly mixture being measured by a speed of sound augmented Coriolis meter can be simulated by using simulated "actual" measured parameters calculated utilizing said models developed herein with a specified decoupling parameter utilized to generate simulated measured sound speed and measured Coriolis density for use in the optimization process 20. The error generated by error function 26 using said simulated "actual" measured parameters and said trial measurements can be seen with reference to FIG. 3 where the error function 30 is shown as a function of trial gas void fractions and trial liquid densities. The simulated "measured" parameters were determined using a consistent set of equations for given set point values of gas void fraction and liquid density. For the case shown in FIG. 3, the liquid density for the set point is 940 kg/m^3 with a gas void fraction of 5%, for a measured speed of sound of 205 m/sec. In this particular example, a decoupling parameter of $K_d$=2.0 was used to generate the actual "measured" values, and this value of $K_d$=2.0 was used to generate trial values for the trial measured parameters for the optimization process 20 (FIG. 2). As shown by the contour lines, the error function 30 has a unique minimum at the set point values where the actual solution matches the optimized solution at point 31.

Figure 4:
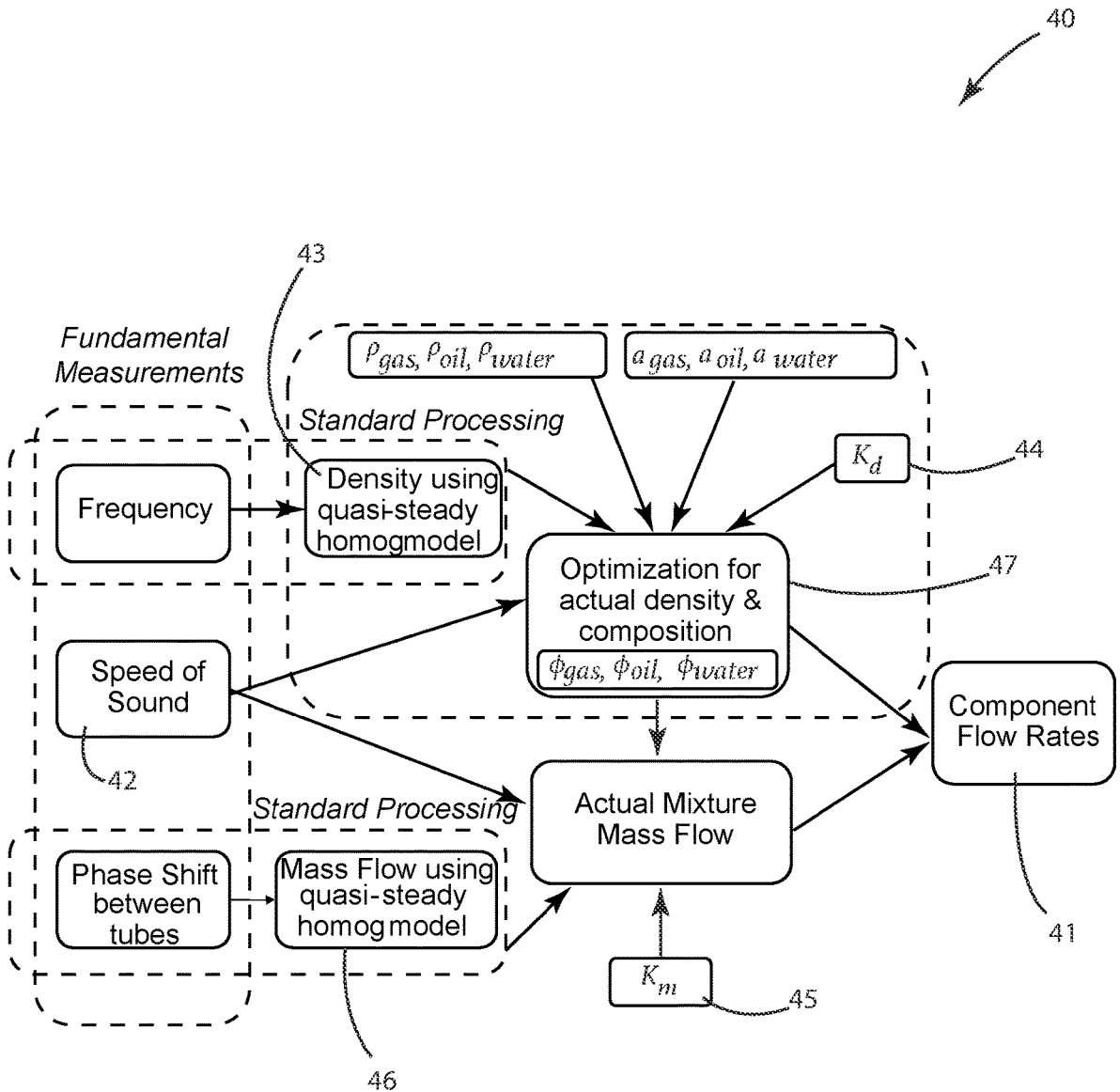
FIG. 4 shows a schematic representation of an interpretation process to determine component flow rates of a three phase mixture in accordance with the present disclosure.

Referring now to FIG. 4, there is shown a schematic diagram of an interpretation process 40 to determine component flow rates 41 of a three-phase (two liquid components and a gas component) mixture using a speed of sound augmented Coriolis meter. In this embodiment, interpretation process 40 minimizes the error function given in Equation 11. The speed of sound augmented Coriolis meter utilizes the measured speed of sound 42, measured density 43, a known density decoupling parameter 44 and a known compressibility parameter to determine the liquid density and gas void fraction. Those skilled in the art recognize that, assuming the density of the oil and water components are known, a measure of the liquid density provides a measure of the watercut of the liquid. Once the gas void fraction is determined in interpretation process 40, the measured sound speed 42, the determined gas void fraction, and the measured Coriolis mass flow 46, are used in a model in step 48 which accounts for the effects of decoupling and compressibility as expressed in Equation 10 where mass flow decoupling parameter 45 and compressibility parameter are known to determine mass flow of the mixture. Assuming that the mixture is well-mixed with negligible slip among the oil, water, and gas components, the flow rates of the three components (gas, oil and water) are then determined utilizing the mixture mass flow and the compositional information from interpretation process 40.

Figure 3:
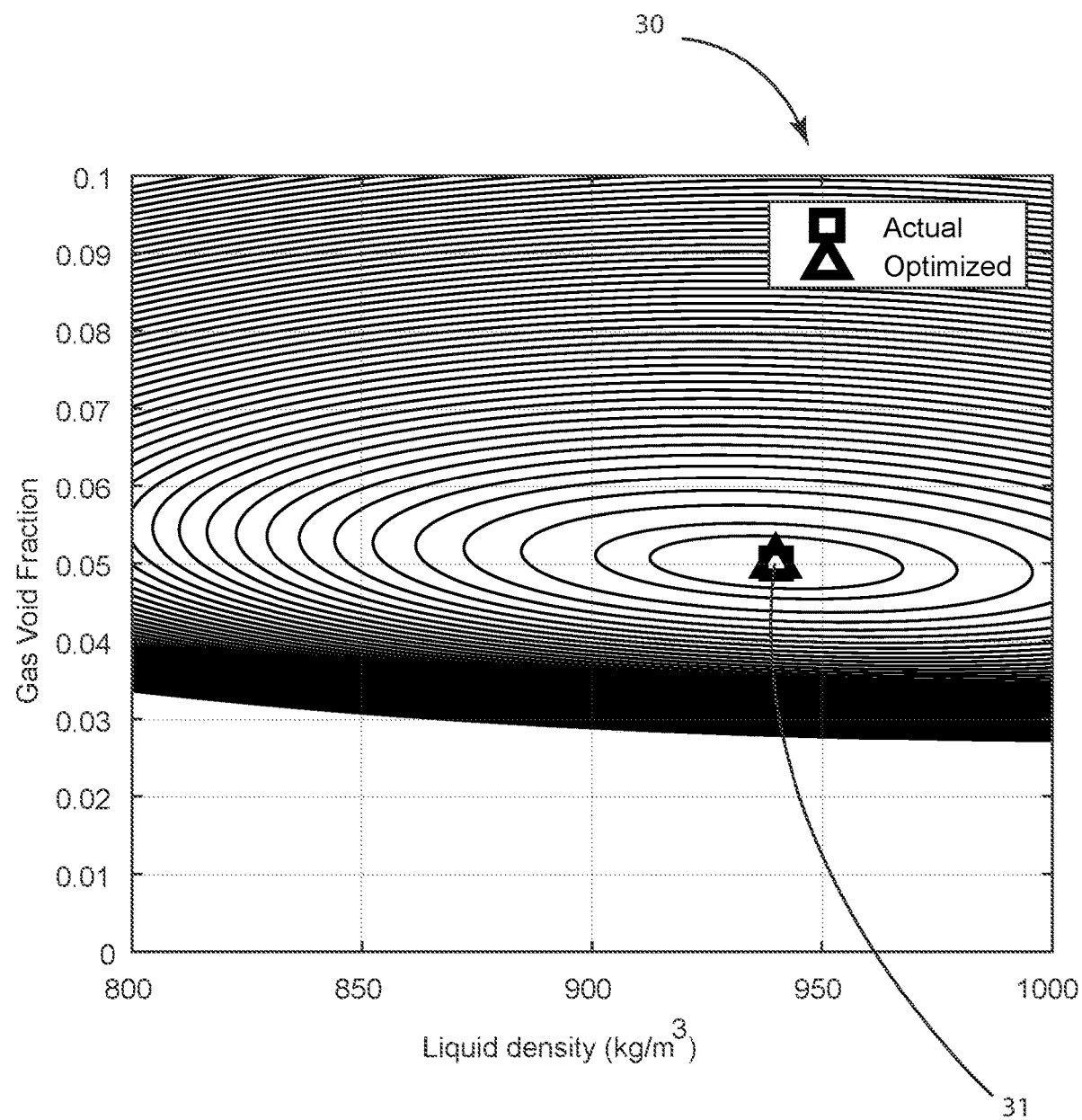
FIG. 3 graphical representation of an error function in accordance with the present disclosure.
Figure 5:
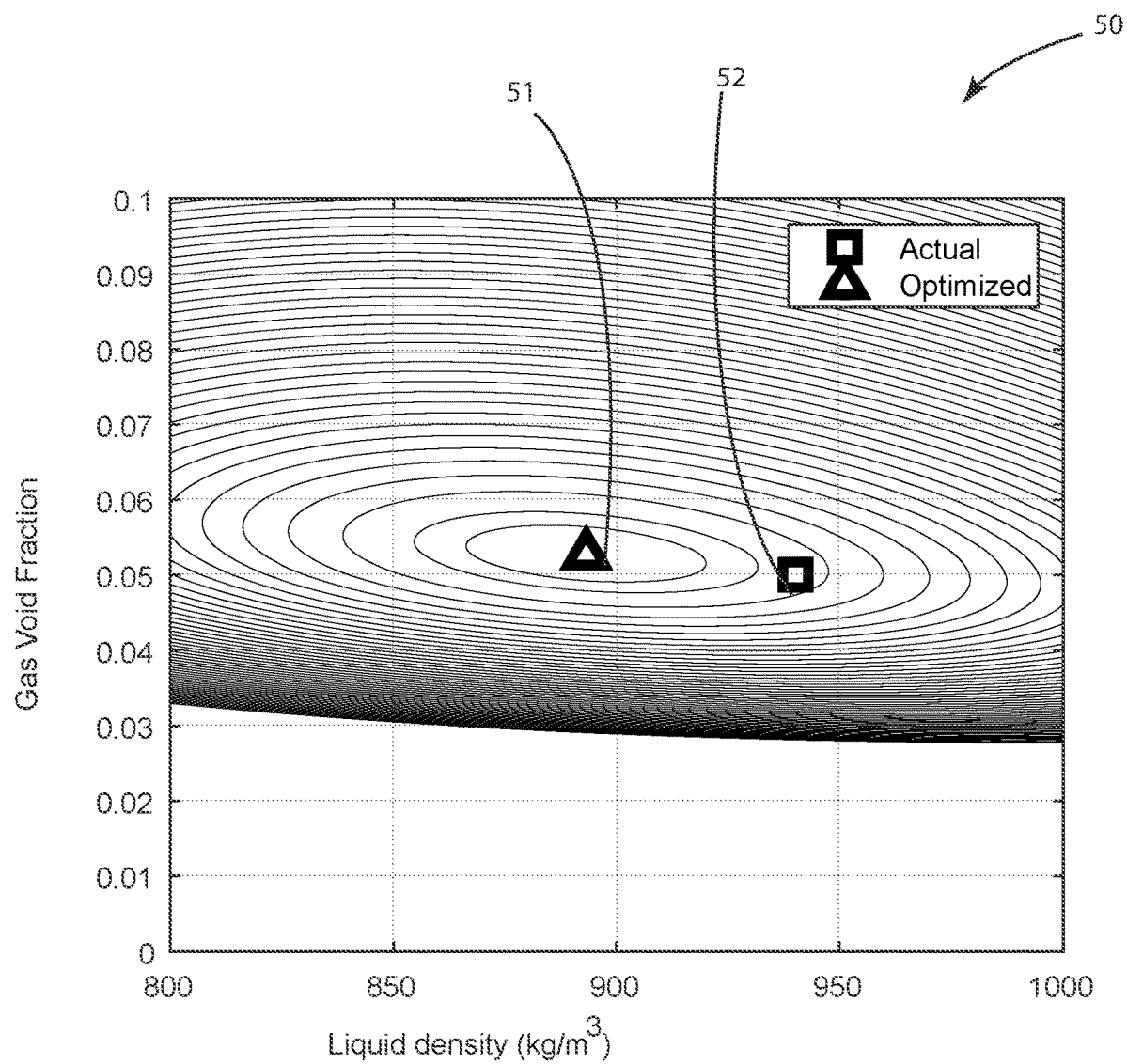
FIG. 5 is a graphical representation of an error function in accordance with the present disclosure.

Role of Decoupling Parameter in Accuracy of Liquid Density and Gas Void Fraction Referring now to FIG. 5, there is shown an error function 50 which is similar to that presented in FIG. 3, in which the simulated actual measured Coriolis density and process fluid sound speed were generated assuming a moderate amount of decoupling (i.e. $K_d=2$). However, the value for the specific decoupling parameter used to generate trial values of measured density and sound speed associated with the trial values of gas void fraction and water cut in the optimization process was assumed to represent a case with no decoupling (i.e. $K_d=1$). As shown, the optimization process finds a unique minimum; however, the optimized value 51 does not match the set point value 52. For this simulation, the optimized value for the liquid density is 5% lower than the set point values (893 kg/m^3 compared to 940 kg/m^3) and the optimized gas void fraction was 5.3% compared the set point value of 5.0%.

The example embodiment described with reference to FIG. 5, indicates the importance of the discoveries of the present disclosure in having an accurate and practical means of determining the decoupling parameter for speed of sound augmented Coriolis meters operating on bubbly liquids. For this example, assuming a water density of 1000 kg·m^3 and an oil density of 800 kg/m^3, the error due to an incorrect decoupling parameter would result in a reported watercut of 46.5%, compared to the correct watercut of 70%.

Figure 6:
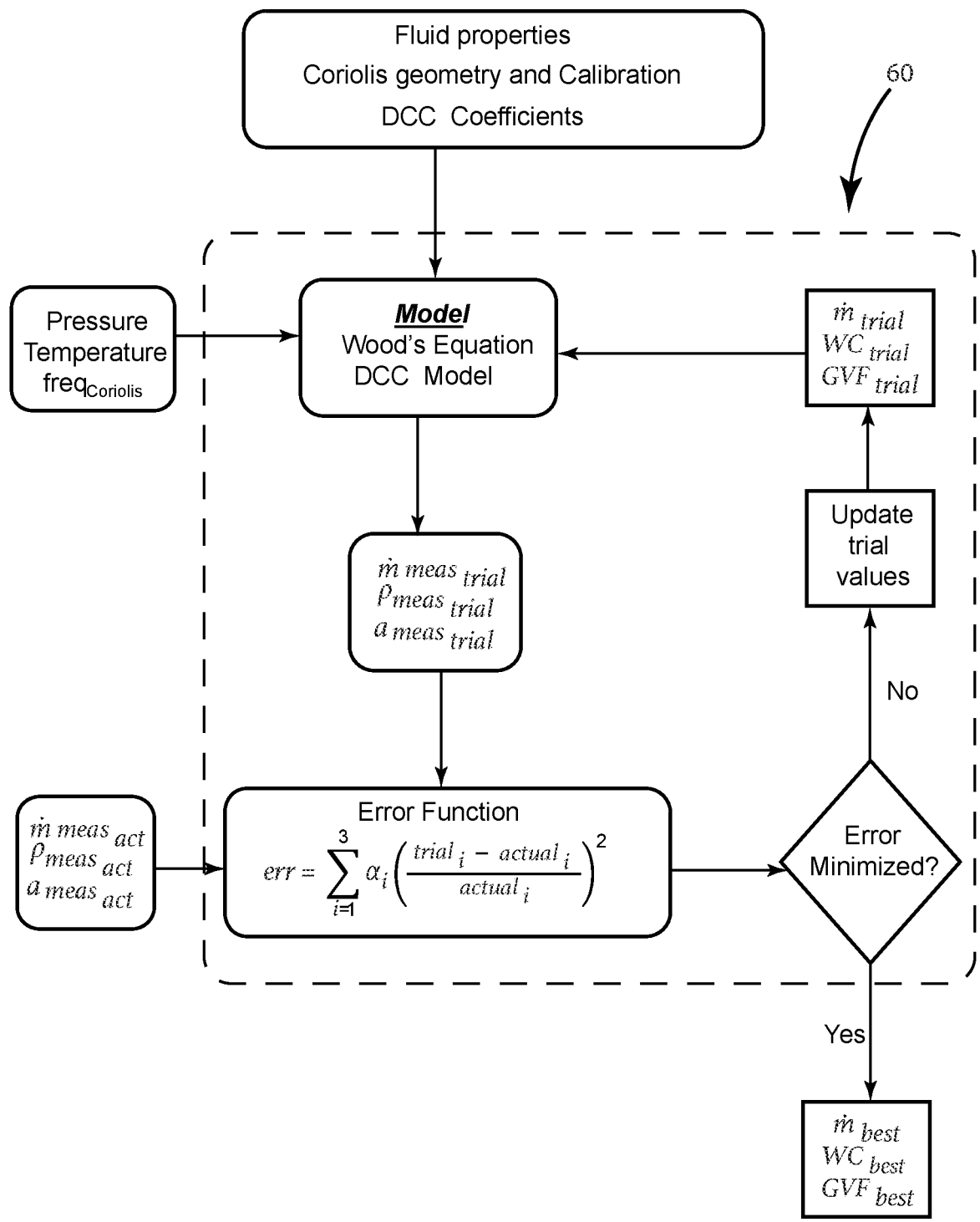
FIG. 6 is a schematic representation of an optimization process in accordance with the present disclosure.

The general approach outlined herein above can be extended to determine the mass flow as well as the watercut and gas void fraction by including the measured mass flow in the optimization procedure 60, as illustrated in FIG. 6. Optimization procedure 60 can be used to the determine mass flow, watercut, and gas void fraction utilizing the mass flow and density interpreted using a Coriolis meter calibrated on essentially incompressible and homogeneous fluid, a measured process fluid sound speed to determine the mass flow, watercut, and gas void fraction of a bubbly liquid utilizing a model that characterizes the effects of decoupling and compressibility with known decoupling and compressibility characteristics.

Methods for Determining the Decoupling Parameter

Heretofore, there has existed no practical method or apparatus for determining decoupling parameters for Coriolis flow meters operating on bubbly liquids. Some of the problems known in the prior art are addressed by using a speed of sound augmented Coriolis flow meter in accordance with the method and apparatus of the present disclosure. These methods and apparatus of the present disclosure enables the first practical, in-situ, methods for characterizing the effect of decoupling on the mass flow and density of Coriolis meters and improving the accuracy of Coriolis-based measurements on bubbly flows.

For instance, the methods and apparatus of the present disclosure include embodiments that determine estimates for decoupling parameters by measuring the reported mass flow and/or density of a process fluid with entrained gases at multiple instances over a period of time for which either the mass flow and/or density of the process fluid, is either sufficiently known, or is known to be sufficiently constant. This method is particularly advantageous for situations in which the mass flow and/or density is either known, or constant, and the gas void fraction levels are unknown and variable.

Determining Decoupling Parameter with Liquid Density Known

In an example of this particular embodiment, it has been discovered that if a liquid of known density with entrained gases is flowing through a Coriolis meter, the density decoupling parameter $K_d$ can be estimated using a least squares method to find the best fit for density decoupling parameter for a series of measurements for which, ideally, the gas void fraction is varying. Unlike Hemp's [1] prior art work which discussed the effects of decoupling for the limiting conditions of either no decoupling ($K_d=1$) or of bubbles entrained within an inviscid liquid ($K_d=3$), the discoveries disclosed herein make it possible to quantify a decoupling parameter as a real number ranging between 1 and 3 for a range of bubbly flow regimes. For each measurement instance, i, over a period of time, the models for decoupling and compressibility can be used to define an equation for the density decoupling parameter, $K_d$ in terms of known or measured quantities in accordance with the following relationship:

$$\alpha_i K_d = 1 - \frac{\rho_{measured_i}}{\rho_{liquid}} + \frac{1}{4}(f_{red_i})^2. \quad \text{(Equation 15)}$$

For N measurement instances, a least-squares estimate of the decoupling parameter is given by:

$$K_d = \frac{\sum_{i=1}^{N} \alpha_i \left(1 - \frac{\rho_{measured_i}}{\rho_{liquid}} + \frac{1}{4} + \frac{1}{4}(f_{red_i})^2\right)}{\sum_{i=1}^{N} \alpha_i^2}. \quad \text{(Equation 16)}$$

It should be noted that in Equation 16 that there needs only to be a first measured parameter and at least one additional measured parameter to solve for $K_d$. It should be appreciated by those skilled in the art that it has been demonstrated, that in certain circumstances, the sound speed of the process fluid mixture can be accurately determined and, with knowledge of, or estimates of, the parameters of the components of the mixture, the gas void fraction can be determined therefrom. Thus, measuring 1) the mixture sound speed thereby enabling a determination of an estimate of the mixture gas void fraction, and 2) determining the ratio of the measured density to the actual liquid density over one or more operating conditions provides a basis from which to estimate the density decoupling parameter $K_d$. It should be noted that in certain circumstances determining the gas void fraction from a process fluid sound speed measurement requires knowledge of the process liquid density, which in this particular example is known. It should be further noted that the known liquid density could be varying with time.

It is recognized that the decoupling parameter can vary with varying process conditions such as fluid viscosity and bubble size parameters. However, once determined, it may be reasonable to assume that the decoupling parameter $K_d$ is constant for operating conditions sufficiently similar to the operating conditions for which the decoupling parameter was determined empirically. One such example is where the liquid density varies over time, it may be reasonable to assume that the decoupling parameter remains sufficiently constant, thus providing a means to account for decoupling using an empirically determined decoupling parameter and the measured sound speed and interpreted gas void fraction. The method described above for determining the density decoupling parameter $K_d$ could be used to periodically update the estimate of the decoupling parameter, and then utilize the determined decoupling parameter to interpret a measured density and measured speed of sound in terms of the watercut and gas void fraction of a three phase mixture.

It has been discovered that a similar methodology to that of determining the density decoupling parameter $K_d$ can be applied to determine the mass flow decoupling parameter, $K_m$, from a Coriolis meter operating in a bubbly mixture. If the mass flow is known, the fractional mass flow error reported can be determined using Equation 4 and this can then be used in conjunction with the other measurements to determine an estimate for the mass flow decoupling parameter $K_m$. It is noted that the known mass flow rate could be varying with time. The decoupling parameter is characterized in accordance with the following:

$$K_m = \frac{\sum_{i=1}^{N} \frac{\alpha_i}{1-\alpha_i}\left(1 - \frac{\dot{m}_{meas_i}}{\dot{m}_{liq_i}} + \frac{\alpha_i}{1-\alpha_i} + \frac{1}{2}(f_{red_i})^2\right)}{\sum_{i=1}^{N}\left(\frac{\alpha_i}{1-\alpha_i}\right)^2}. \quad \text{(Equation 17)}$$

It is a further element of the present disclosure that density decoupling parameter, $K_d$, is a good approximation for the mass flow decoupling parameter, $K_m$, and vice versa, for instance as disclosed in the following relationship:

$$K_d \approx K_m. \quad \text{(Equation 18)}.$$

Thus, in cases where it is impractical to determine both parameters independently, or it is preferable to determine either $K_d$ or $K_m$, one parameter provides a good estimate of the other parameter. The approximate equivalence of the density decoupling parameter and the mass flow decoupling parameter is utilized in other embodiments of this disclosure.

Determining the Density Decoupling Parameter with an Unknown, but Constant Liquid Density A similar type of in-situ calibration can be performed for cases where a speed of sound augmented Coriolis meter is operating on a bubbly liquid of varying gas void fraction for which the liquid density is unknown, but sufficiently constant for periods of time over which the gas void fraction is varying. In such cases, it can be assumed that the decoupling parameter is unknown, but also essentially constant. In these cases, an error function can be defined in accordance with the model to account for the effects of decoupling and compressibility to minimize the error over $K_d$ and $\rho_{liquid}$ to concurrently determine an optimized estimate of the liquid density and the decoupling parameter. The error function is characterized in accordance with the following:

$$\text{error} \equiv \sum_{i=1}^{N}\left(\rho_{\frac{measure_i}{\rho_{liquid}}} - 1 - \frac{1}{4}(f_{red_i})^2 + K_d\alpha_i\right)^2. \quad \text{(Equation 19)}$$

With some simplifying assumptions and approximations, the above optimization of Equation 19 can be expressed as a linear least squares optimization. Assuming the measured Coriolis density is a sufficiently accurate estimate of the density of the liquid phase for the purposes of estimating the gas void fraction from the speed of sound measurement, the gas void fraction can be estimated at each measurement instance prior to determining an optimized liquid density and decoupling parameter. In this particular example, the measured Coriolis density and the speed of sound measurement are the two measured parameters used to solve for $K_d$. Then, assuming the correction terms for the errors due to decoupling and compressibility, expressed in terms of measured density, normalized by the liquid density, are small compared to unity, the liquid density at each instance in time can be expressed as:

$$\rho_{liq} = \frac{\rho_{meas_i}}{1 - K_d\alpha_i + \frac{1}{4}f_{red_i}^2} \approx \rho_{meas_i}\left(1 + K_d\alpha_i - \frac{1}{4}f_{red_i}^2\right). \quad \text{(Equation 20)}$$

The above approximation is based on a first-order Taylor series expression for the for following:

$$\frac{1}{1-\varepsilon} \cong 1 \mp \varepsilon \text{ for } \varepsilon \ll 1 \quad \text{(Equation 21)}$$

Applying this relationship for each instance in time, "i", for which the Coriolis meter reports a density measurement and a speed of sound measurement, and over a plurality of instances which the density of the liquid and the decoupling parameter are sufficiently constant, results in the following a set of linear equations in matrix form for the unknown liquid density and density decoupling parameter as follows:

$$\lfloor 1 - \rho_{meas_i}\alpha_i \rfloor \begin{Bmatrix} \rho_{liq} \\ K_d \end{Bmatrix} = \rho_{meas_i}(1 - G_d f_{red_i}^2). \quad \text{(Equation 22)}$$

For N instances in time, the equations have the form:

$$A_{NX2}X_{2X1} = b_{NX2}; \quad \text{(Equation 23)}$$

where $$A_{NX2} \equiv \lfloor 1 - \rho_{meas_i}\alpha_i \rfloor_{NX2}; \text{ and} \quad \text{(Equation 24)}$$

$$X_{2X1} \equiv \begin{Bmatrix} \rho_{liq} \\ K_d \end{Bmatrix}; \text{ and} \quad \text{(Equation 25)}$$

$$b_{NX1} \equiv \lfloor \rho_{meas_i}(1 - G_d f_{red_i}^2) \rfloor. \quad \text{(Equation 26)}$$

For two instances (N=2) with different gas void fractions, the equations can be solved directly for the liquid density and the decoupling parameter. For N>2, the set of N equations constitute a set of over-constrained linear equations. As such, the equations have a least-squares optimized solution for the "best" liquid density and the "best" decoupling parameter associated with the data from the "N" instances given by the standard form for linear least squares optimization:

$$X = (A^T A)^{-1} A^T b = \begin{Bmatrix} \rho_{liq} \\ K_d \end{Bmatrix}. \quad \text{(Equation 27)}$$

If improved accuracy is desired, the value for the liquid density, determined from a first optimization for the liquid density and decoupling parameter, can be used with the measured speed of sound for an improved estimate of gas void fraction at each instance of time and the least squares optimization can be repeated, until the value for the liquid density and decoupling parameter converge to a predefined specific tolerance. It should be noted by those skilled in the art that there are many methods to determine optimized values for the liquid density and the density decoupling parameter utilizing the methodology describe above, and the linear least squares method described is an example of one such method.

Determining Mass Decoupling Parameter with an Unknown, but Constant Mass Flow

Similarly, for cases in which the mass flow is unknown, but essentially constant, and the gas void fraction is variable, an error function can be defined and minimized as a function of the two unknown parameters, mass flow and the mass flow decoupling parameter.

$$\text{error} \equiv \sum_{i=1}^{N} \left( \frac{\dot{m}_{measure_i}}{\dot{m}_{liquid}} - 1 - G_m (f_{red_i})^2 + \frac{(K_m - 1)\alpha_i}{1 - \alpha_i} \right)^2. \quad \text{(Equation 28)}$$

With similar simplifying assumptions and approximations as those leading to Equation 27 used for determining the density decoupling parameter, an optimization of Equation 28 can be expressed as a linear least-squares optimization. Again, utilizing the measured Coriolis density as an estimate for the liquid density as first measured parameter, the gas void fraction can be estimated utilizing the speed of sound measurement as an additional measured parameter at each measurement instance. Then, if the correction terms for the error in measured mass flow over the liquid mass flow due to decoupling and compressibility are assumed to be small compared to unity, the liquid mass flow at each instance in time can be expressed as before utilizing a first order Taylor series:

$$\dot{m}_{liq} = \frac{\dot{m}_{meas_i}}{1 - (K_{\dot{m}} - 1) \frac{\alpha_i}{1 - \alpha_i} + G_m f_{red_i}^2} \approx \quad \text{(Equation 29)}$$

$$\dot{m}_{meas_i} \left( 1 + (K_m - 1) \frac{\alpha_i}{1 - \alpha_i} - G_m f_{red_i}^2 \right).$$

Applying this relationship for each instance in time, "i", occurring in a period over which the density of the liquid and the decoupling parameter is sufficiently constant, Equation 36 can be expressed as a set of linear equations for the mass flow rate and the mass flow decoupling parameter in matrix form as follows:

$$\left[ 1 - \dot{m}_{meas_i} \frac{\alpha_i}{1 - \alpha_i} \right] \begin{Bmatrix} \dot{m}_{liq} \\ K_M \end{Bmatrix} = \dot{m}_{meas_i} \left( 1 - \frac{\alpha_i}{1 - \alpha_i} - G_m f_{red_i}^2 \right). \quad \text{(Equation 30)}$$

For N instances of time, the equations have the form:

$$A_{NX2} X_{2X1} = b_{NX2}; \quad \text{(Equation 31)}$$

where $$A_{NX2} \equiv \left[ 1 - \dot{m}_{meas_i} \frac{\alpha_i}{1 - \alpha_i} \right]_{NX2}; \quad \text{(Equation 32)}$$

$$X_{2X1} = \begin{Bmatrix} \dot{m}_{liq} \\ K_{\dot{m}} \end{Bmatrix}; \text{ and} \quad \text{(Equation 33)}$$

$$b_{NX1} \equiv \left[ \dot{m}_{meas_i} \left( 1 - \frac{\alpha_i}{1 - \alpha_i} - G_m f_{red_i}^2 \right) \right]. \quad \text{(Equation 34)}$$

A least-squares optimized solution for liquid mass flow and the decoupling parameter $K_{\dot{m}}$ for the N instances is given by:

$$X = (A^T A)^{-1} A^T b = \begin{Bmatrix} \dot{m}_{liq} \\ K_{\dot{m}} \end{Bmatrix}. \quad \text{(Equation 35)}$$

Figure 7:
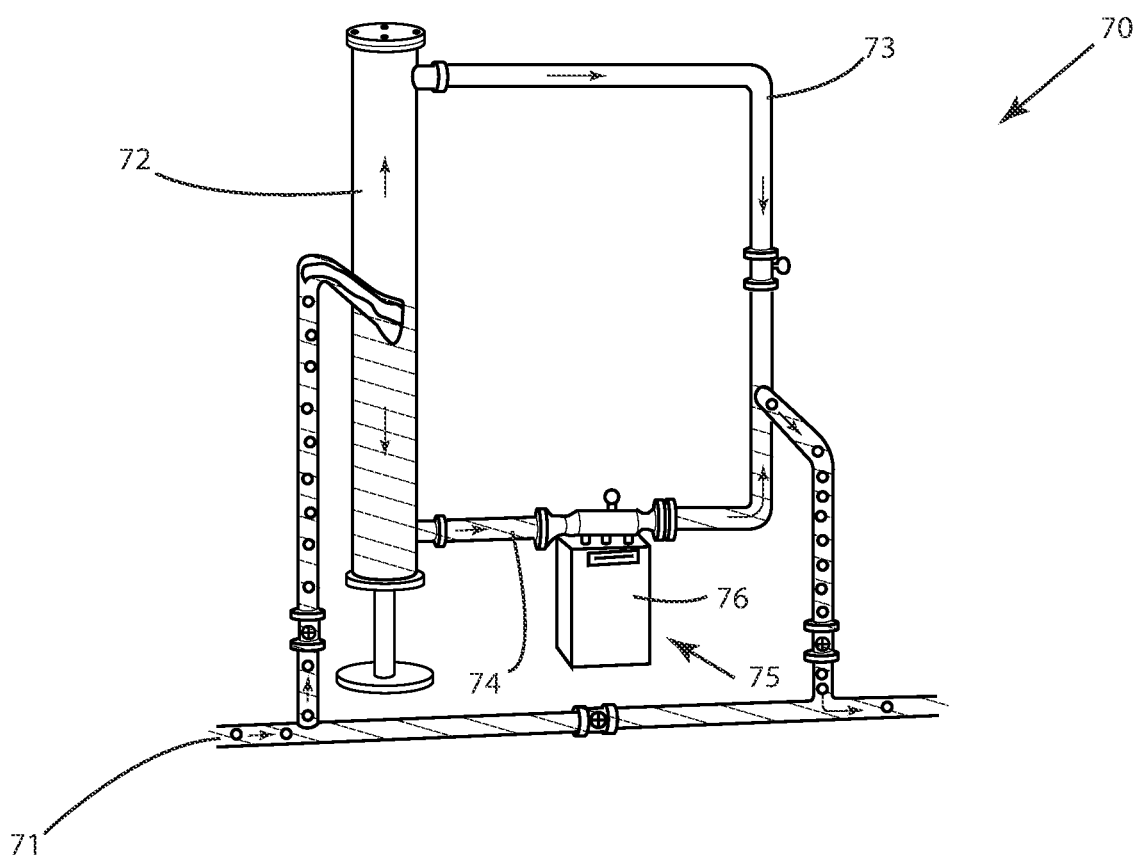
FIG. 7 is an illustration of a gas liquid cylindrical cyclonic (GLCC) separator with a speed of sound augmented Coriolis meter in accordance with the present disclosure.

Operational Examples of a Determining Density Decoupling Parameter of a Sound Speed Augmented Coriolis Flow Meter In operation, a speed of sound augmented Coriolis flow meter utilizing the decoupling parameters and optimization methods disclosed herein above can be seen with reference to FIG. 7. In an example of such an operation, there is provided herein an illustration on how this methodology can be used to improve the accuracy of Coriolis-based flow measure applications. In this particular example, a Coriolis meter is assumed to be operating on a process fluid comprised of a bubbly mixture consisting of a gas, oil and water. Example of Determining Density Decoupling Parameter Using Speed of Sound Augmented Coriolis Meter on Bubbly Liquids with Constant Liquid Density with Time Varying Gas Void Fraction FIG. 6 is a schematic representation of an optimization process in accordance with the present disclosure;

FIG. 7 shows a schematic of a common apparatus 70 configured to measure the production rates of oil and gas wells. Apparatus 70 is comprised of an inlet 71 configured to receive a process fluid from an oil and gas well head (not shown) consisting of a multiphase flow. Multiphase inlet 71 leads to a compact, two phase (gas/liquid) separator 72 that is configured to separate the liquid and gas phases of the multiphase mixture wherein the gas exits the separator through the gas outlet 73 and the liquid exits the separator through the liquid outlet 74. A speed of sound augmented Coriolis meter 75 configured to report mass flow rate and density is mounted in fluid communication with liquid outlet 74 of separator 72. A speed of sound augmented Coriolis meter 75 further includes processor 76 which includes hardware and software capable of performing the functions disclosed herein to improve the accuracy of Coriolis-based flow measure applications on bubbly flow. The flows through liquid outlet 74 and gas outlet 73 recombine and exit through multiphase outlet 77. Note that although the design intent of the separator is to eliminate all the gas from liquid outlet 74, often, relatively small, but significant, amounts of gas can "carry-under" through the liquid outlet, delivering a bubbly mixture to speed of sound augmented Coriolis meter 75. These bubbles which are entrained in the liquid, while having a relatively small in gas void fraction of typically less than ~5%, can impair the ability of this system to provide accurate net oil measurement as disclosed herein above. In such operation, speed of sound augmented Coriolis meter 75 includes a methodology to improve the accuracy of the net oil measurement in this type of application.

In an example of the operation of apparatus 70, consider a period of time over which the liquid density is constant, but the gas void fraction is varying. This particular example could resemble a common operation of a gas/liquid separator measuring the oil, water, and gas produced by an oil well. The density of an assumed gas-free liquid stream is used to determine the oil/water ratio of the liquid stream flowing in liquid outlet 74, and the density of this assumed gas-free liquid stream can often be assumed to be constant over time periods which are short compared to the time period associated with mechanisms that would cause a change in the produced oil to water ratios, such as water break through or changes in water salinity within the oil reservoir. The gas carry-under through the liquid outlet 74 of separator 72 can vary with production rates and other factors such as separator liquid level. Typically, the time scales of the variations in gas carry-under are often much shorter than variations in produced water cut or other changes that could change the density of the produced liquids. Additionally, variations in gas carry-under can be unintentional due to naturally occurring process variations, or intentionally induced by varying certain separator control parameters, such as, for example, modifying the liquid level with the separator.

As described above, this particular example is well-suited for defining a two parameter optimization procedure as described above with reference to Equations 19-27 in which the multiple data points at which the density reported by the Coriolis meter as a first measured parameter, and the measured speed of sound as an additional measured parameter (used to determine estimates of the gas void fraction within the Coriolis meter, and reduced frequency of the Coriolis measurement) are used to determine a best fit estimate of the liquid density and the density decoupling parameter.

The estimate of the liquid density is then used to determine the watercut. A measured liquid density can be related to the watercut of an oil and water mixture as follows:

$$\text{watercut} = \frac{\rho_{liq} - \rho_{oil}}{\rho_{water} - \rho_{oil}} \quad \text{(Equation 36)}$$

This estimate of the density decoupling parameter can be used to approximate the mass flow decoupling parameter, which then can be used in conjunction with the gas void fraction and measured process fluid sound speed to improve the measured mass flow, in a process such as described in FIG. 4 or FIG. 6. Then, the net oil and net water rates can be determined using one or both of the improved liquid density and/or improved mass flow measurements. It should be appreciated by those skilled in the art that the estimate of the density decoupling parameter at one watercut is likely a good approximation for the density decoupling parameter over a range of watercuts, the larger the range of watercut ratios for which the density decoupling parameter is considered sufficiently accurate influences how often the system requires recalibration.

With additional reference to, there is shown data recorded from a speed of sound augmented Coriolis meter 75 operation on the liquid outlet 74 of a separator 72 that is being supplied with a high gas volume fraction, three phase flow at constant conditions, intended to simulate constant production conditions from a high gas volume fraction oil and gas well. For a more detailed description of the test and the results, please see Gysling [14]. In this particular example, the liquid rate into the separator 72 is nominally 3005 barrels per day (BPD) of liquid at nominally 93% watercut. The data shown in includes the raw density 81 and "raw" mass flow rate 82 from speed of sound augmented Coriolis meter 75, along with process fluid pressure, temperature, and sound speed, and Coriolis drive gain for ~1000 sec duration of this data set. "Raw" describes the density and mass flow rate reported by speed of sound augmented Coriolis meter 75, as referred to as measured density and measured mass flow within this disclosure, that was based on the interpretation of a measured Coriolis frequency and measured phase lag, respectively, as interpreted by a calibration intended for a homogeneous, single phase flow. The constant reference liquid density 83 and mass flow rate 84 are also indicated. During the data point, the mass flow rate and composition of the high gas volume fraction multiphase flow into the separator 72 was held constant, and the liquid level in the separator was varied to induce changes in the amount of gas carry-under that was exiting liquid outlet 74. As shown, the raw density 81 and raw mass flow rate 82 reported by the Coriolis meter varied throughout the test point, with drive gain 85 increasing, and saturating at 100%, for a period during the test point associated with the lowest measured process-fluid speed-of-sound 86.

Figure 9:
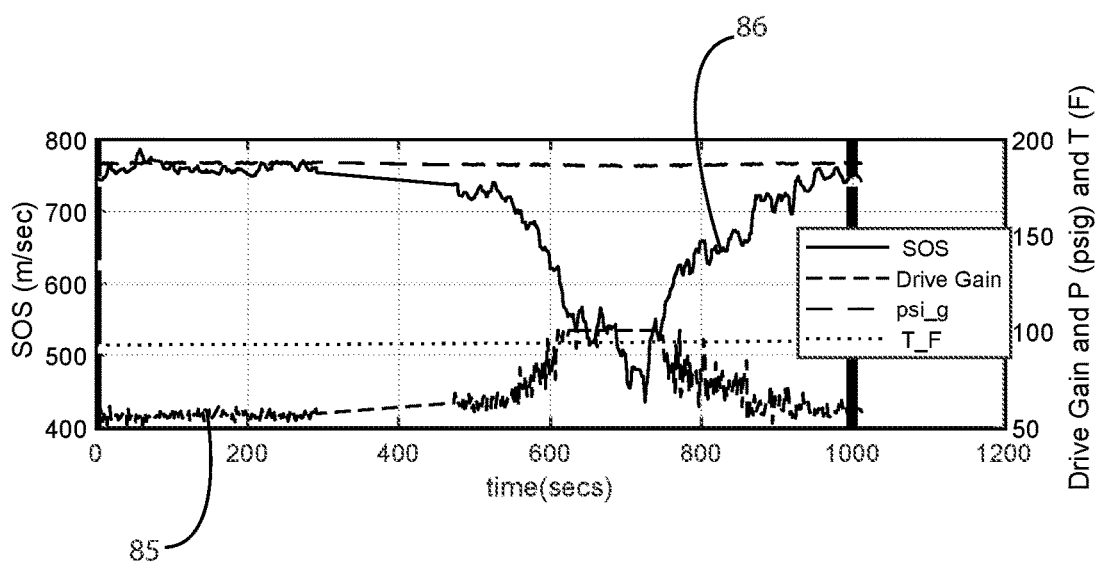
FIG. 9 is a graphical representation of data measured from a speed of sound augmented Coriolis meter in accordance with the present disclosure.

Referring now to FIG. 9 is a graphical representation of data measured from a speed of sound augmented Coriolis meter in accordance with the present disclosure; 10, there is shown a measured process-fluid speed-of-sound 91 and interpreted gas void fraction 92. Interpreted gas void fraction 92 was derived utilizing the raw density 81 as an approximation of the actual liquid density used in Wood's Equation. Also shown in the figure is the reduced frequency 93 of speed of sound augmented Coriolis meter 75. As shown, variations in the gas void fraction 92 and reduced frequency 93 track inversely with variations in process-fluid speed-of-sound 91. For this particular example, the gas void fraction 92 (GVF) was in the range of 0.2%<GVF<0.8%, and the reduced frequency 93 was in the range of $0.015 > f_{red} < 0.025$.

Figure 10:
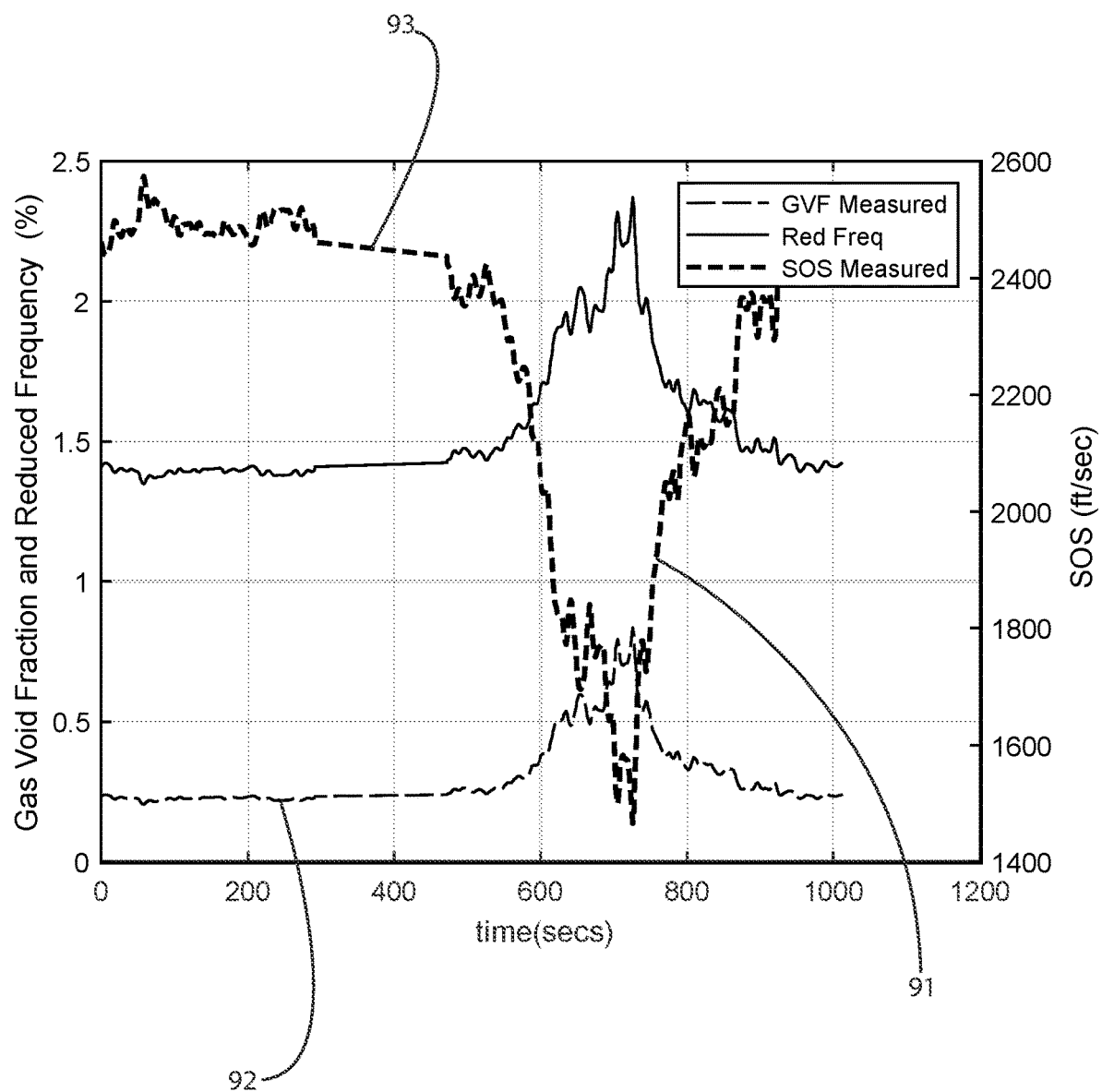
FIG. 10 is a graphical representation of data measured from a speed of sound augmented Coriolis meter in accordance with the present disclosure.

With further reference to FIG. 10 is a graphical representation of data measured from a speed of sound augmented Coriolis meter in accordance with the present disclosure; 1, there is shown raw density 101 points shown as "Reported Density" plotted as a function of gas void fraction in the figure, and the interpreted density of the liquid phase of a bubble mixture 102, also plotted as a function of gas void fraction. The density of the liquid phase of the bubble mixture 102 is interpreted by the parameterized Coriolis decoupling and compressibility model using a least-squares estimate of the decoupling parameter determined for this data set as set forth in Equations 19-27, As shown, the "raw" density 101 measured by speed of sound augmented Coriolis meter 75 over a range of gas void fractions, is well-captured by the Coriolis decoupling and compressibility model with a best-fit decoupling parameter identified to be $K_d=2.06$, well within the predicted theoretical range of $1<K_d<3$. Based on the measured gas void fraction and the identified decoupling parameter $K_d$, the Hemp model determines a constant liquid density of 979 kg/m$^3$, well-matched the reference liquid density of 980 kg/m$^3$. The least-squared fit has a coefficient of determination of $R^2$=0.981, indicating that the Coriolis decoupling and compressibility model well-captures the observed variations in measured density due to variations in gas carry-under, providing confidence that 1) the unreferenced gas carry-under is indeed accurately measured by the speed of sound augmented Coriolis meter 75 of the present disclosure; and 2) that the effects of the variations in gas carry-under on the density reported by a prior art Coriolis meter are accurately mitigated. The term unreferenced indicates that the there was no reference measurement available for the gas carry-under from the separator, noting that the multiphase flow loop facility provided oil, water, and gas reference rates into the two-phase separator 72. Provisions were made in the test to confirm no significant liquid was carried-over through the gas outlet 73 of the two-phase separator 72.

Figure 11:
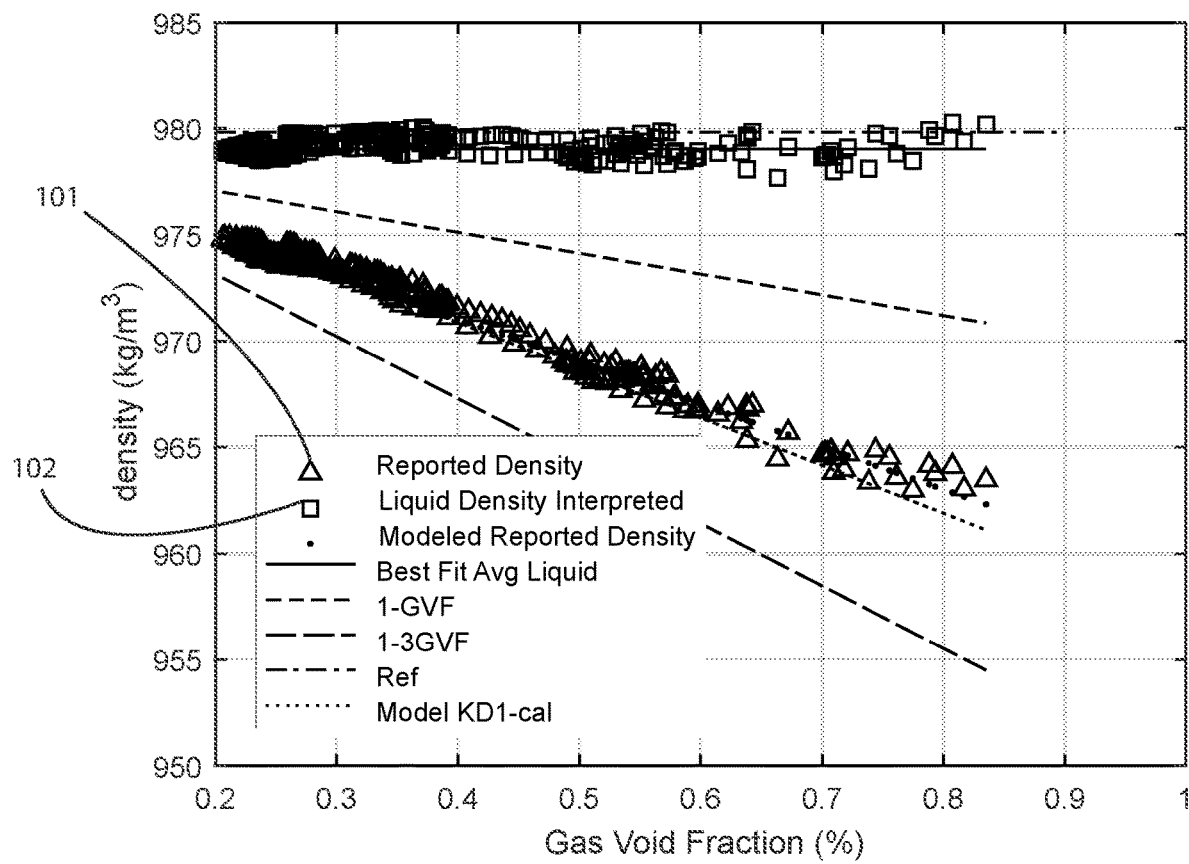
FIG. 11 is a graphical representation of data measured from a speed of sound augmented Coriolis meter in accordance with the present disclosure.

FIG. 11 is a graphical representation of data measured from a speed of sound augmented Coriolis meter in accordance with the present disclosure; 2 shows the gas carry-under, in terms of gas void fraction 111 within the liquid outlet 74, the reference watercut 112, the raw watercut 113, and the corrected watercut 114 for this particular example as a function of time. The corrected watercut 114 was determined using the liquid density, interpreted using the model to correct for Coriolis decoupling and compressibility with the optimized decoupling parameter, and the relationship between liquid density and watercut of an oil/water mixture (Equation 42). As shown, the raw watercut 113, defined as the watercut determined using the raw density 81 measurement and Equation 36, is significantly lower than the reference watercut 112, with the error in raw watercut increasing with increasing gas void fraction 111. The corrected watercut 114 interpreted utilizing the model to correct for Coriolis decoupling and compressibility is shown to be significantly more accurate compared to the reference and insensitive to variations in gas carry-under. The gas carry-under is relatively low for this particular example, in the range of 0.2%<GVF<0.8%. However, despite these low levels of gas carry-under, the gas carry-under is responsible for the majority of the error in raw watercut 113, most of which is eliminated utilizing speed of sound augmented Coriolis meter 75 of the present disclosure and the methods described herein.

Figure 12:
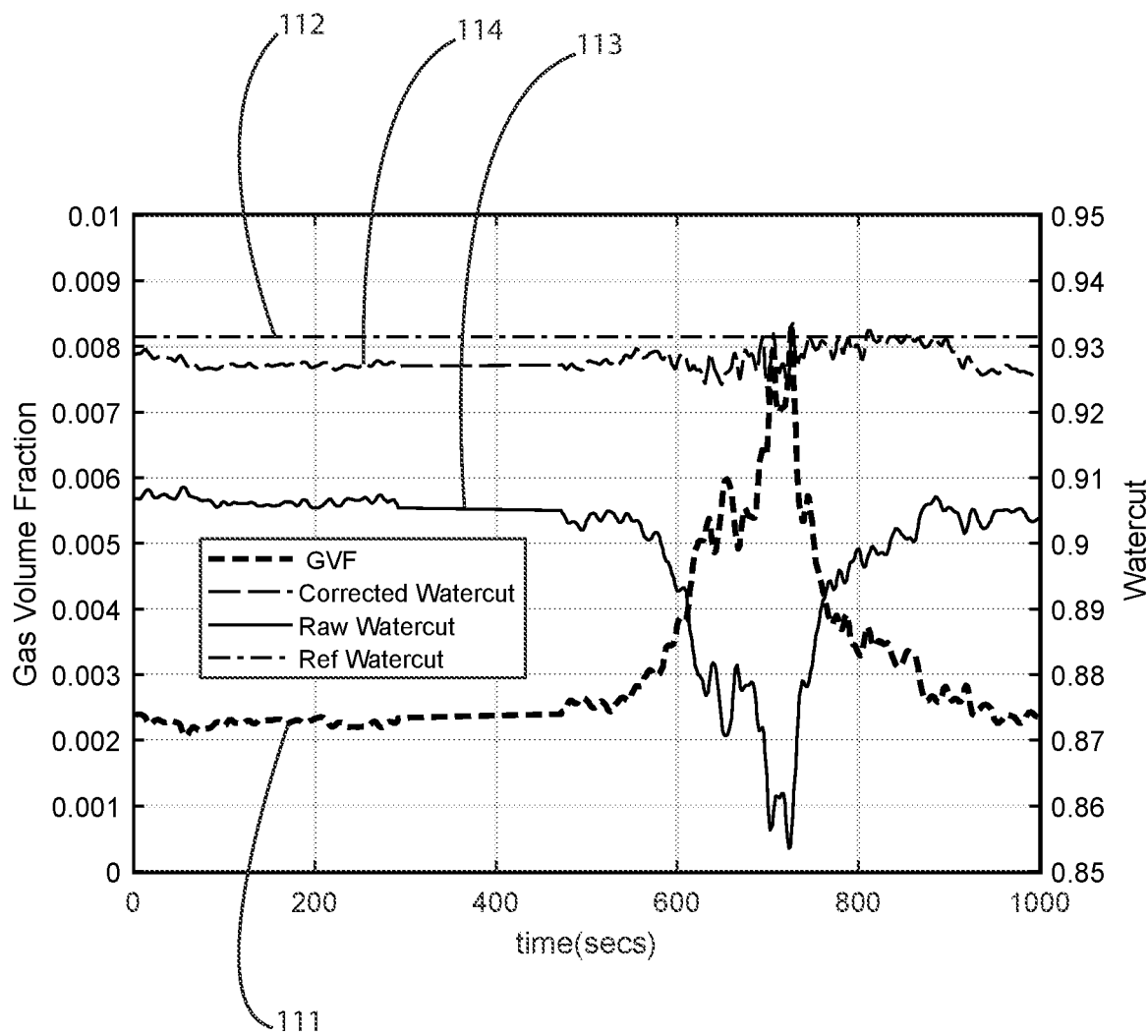
FIG. 12 is a graphical representation of data measured from a speed of sound augmented Coriolis meter in accordance with the present disclosure.
Figure 13:
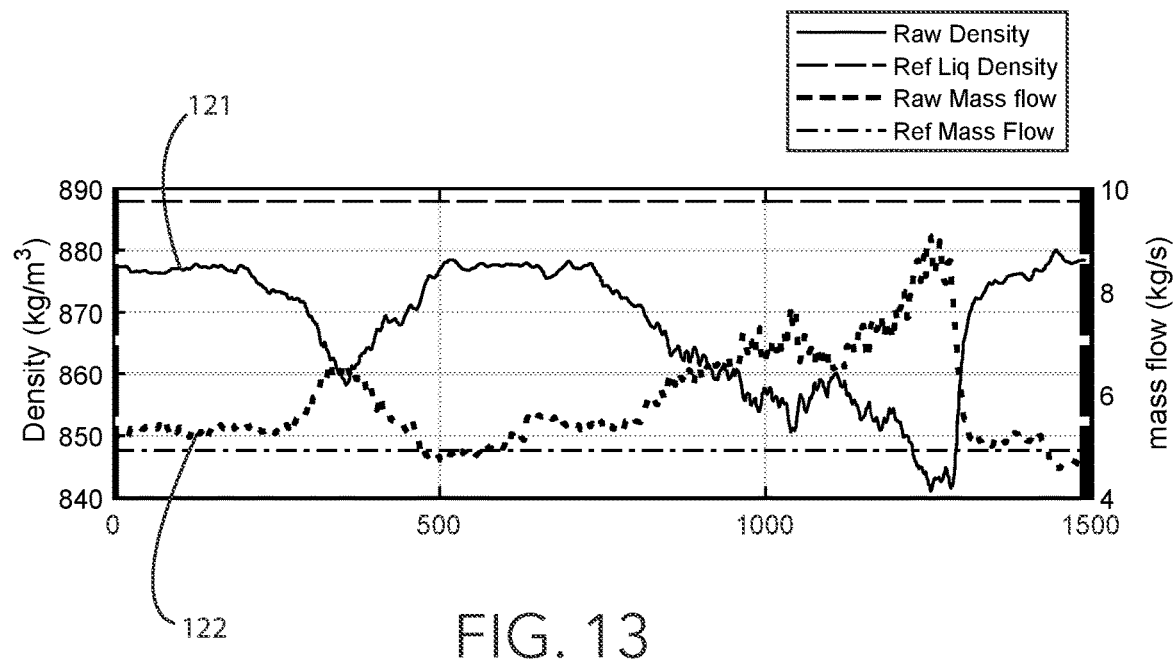
FIG. 13 is a graphical representation of data measured from a speed of sound augmented Coriolis meter in accordance with the present disclosure.
Figure 14:
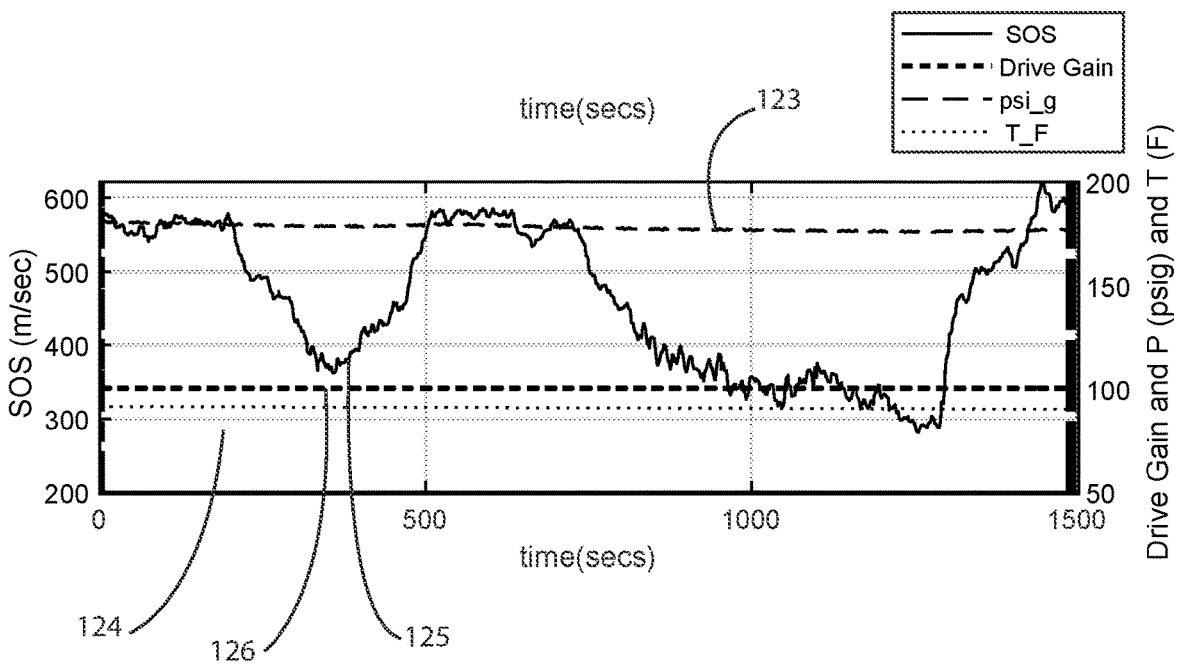
FIG. 14 is a graphical representation of data measured from a speed of sound augmented Coriolis meter in accordance with the present disclosure.

The raw data recorded for another example test point, involves a process fluid with a nominal liquid flow rate of 3005 BPD at a nominal 50% watercut and is shown with reference to FIG. 12. The raw density 121 and raw mass flow rate 122 from speed of sound augmented Coriolis meter 75 of the present disclosure were measured, along with process fluid pressure 123, temperature 124, and sound speed 125, along with Coriolis drive gain 126 for approximately 1500 secs. As with previous example above shown in, the "raw" density 121 and mass flow rate 121 reported by speed of sound augmented Coriolis meter 75 vary significantly over the test points due to varying levels of gas carry-under despite the liquid mass flow rate and watercut being held constant. Note that the Coriolis drive gain 126 is saturated at 100% for the entire data point.

Figure 15:
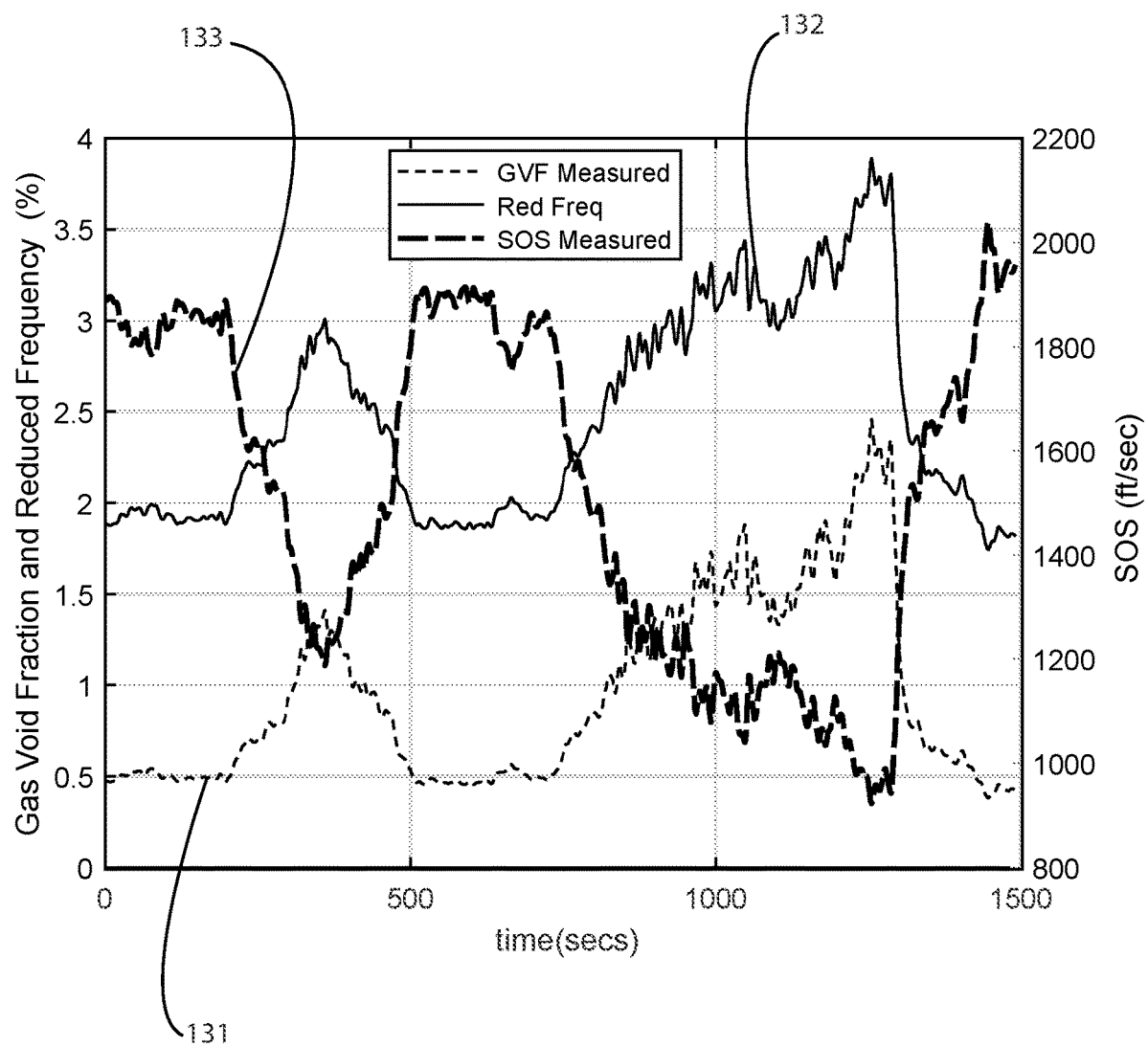
FIG. 15 is a graphical representation of data measured from a speed of sound augmented Coriolis meter in accordance with the present disclosure.

Referring next to FIG. 15, there is shown the gas void fraction 131, the reduced frequency 132 and the measured sound speed 133 of the process fluid for this particular example, comprised of 3005 BPD of liquid, 50% watercut. For this particular example, the gas carry-under (gas void fraction 131) was in the range of 0.5%<GVF<2.5%, comprising approximate three times more gas carry-under than that measured for the previously present example herein above at a lower liquid rate and higher watercut.

Figure 16:
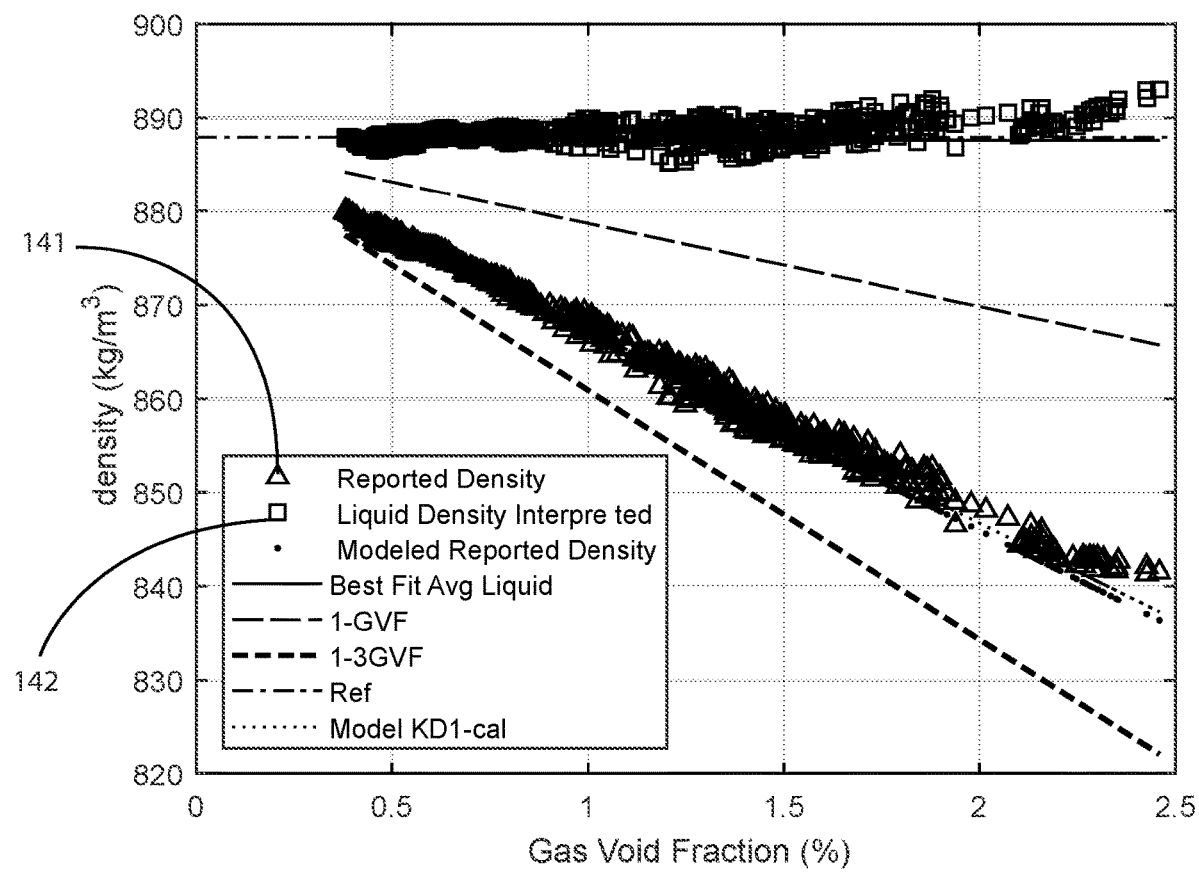
FIG. 16 is a graphical representation of data measured from a speed of sound augmented Coriolis meter in accordance with the present disclosure.

Referring next to FIG. 16, there is shown the measured density and the liquid density as interpreted using the model to correct for Coriolis decoupling and compressibility as set forth in Equations 19-27 using the best fit decoupling parameter, the measured gas void fraction and reduced frequency. As shown, the "raw" density 141 measured by speed of sound augmented Coriolis meter 75 (labeled "Reported Density" in the figure) is well-captured by the model for to correct for Coriolis decoupling and compressibility with the best-fit decoupling parameter identified and $K_d$=2.36, within the predicted theoretical range of $1<K_d<3$. Using the identified decoupling parameter, the model to correct for Coriolis decoupling and compressibility model predicts a liquid density 142 of 888 kg/m$^3$, matching the reference liquid density of 888 kg/m$^3$. The least-squared fit has an $R^2$=0.994, indicating the model to correct for effect of decoupling and compressibility on a Coriolis meter well-captures the observed variations in raw density due to variations on gas carry-under.

Figure 17:
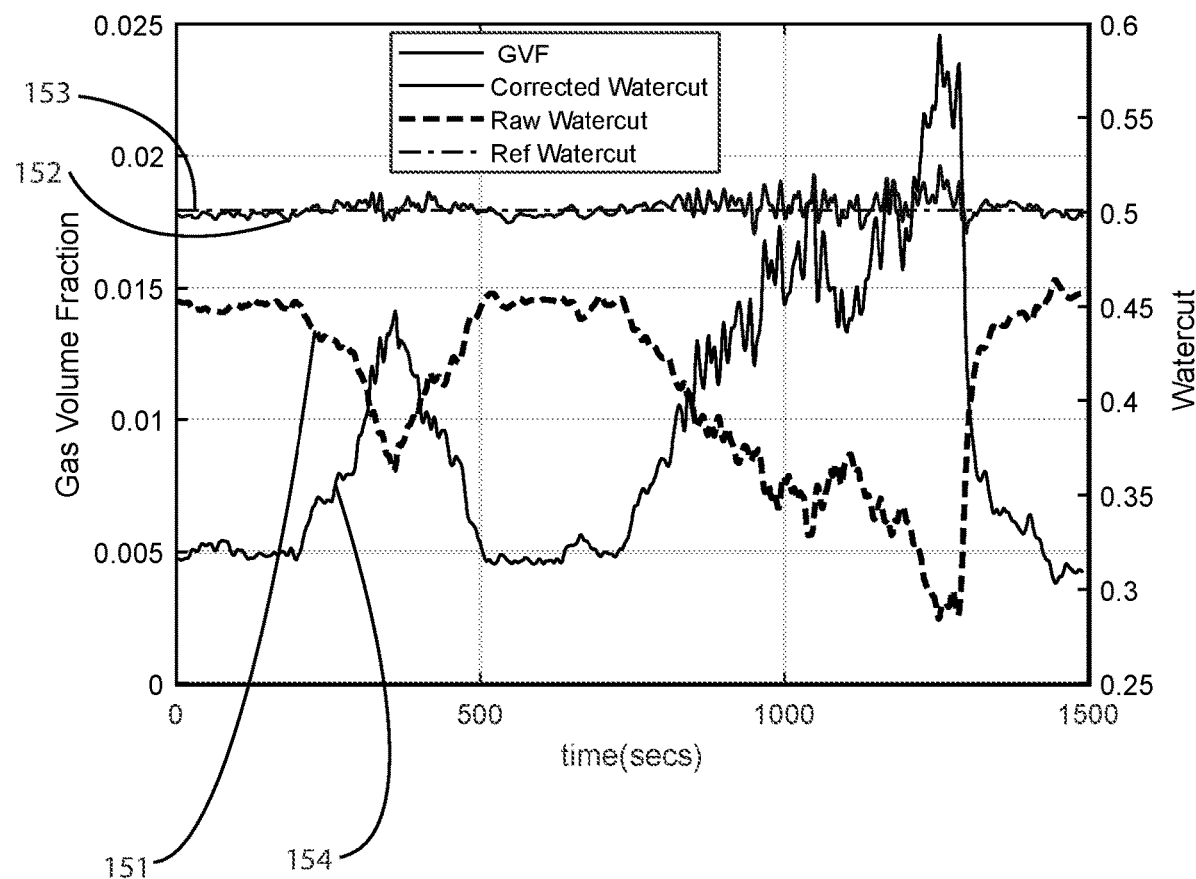
FIG. 17 is a graphical representation of data measured from a speed of sound augmented Coriolis meter in accordance with the present disclosure.

Now referring to FIG. 17, there is shown the raw watercut 151 and corrected watercut 152 measured for this particular example, wherein the process fluid comprises 3005 BPD of liquid at 50% watercut, as a function of time using the a model for the effects of decoupling and compressibility on a Coriolis meter with the optimized decoupling parameter. Similar to that shown herein above with reference to FIG. 12, as shown, the measured process fluid density, corrected utilizing a model for the effect of decoupling and compressibility on a Coriolis meter with a best-fit decoupling parameter, reports a density-based corrected watercut 152 value that matches the reference watercut 153, independent of variations in gas carry-under (gas void fraction 154) of 0.5% to 2.5%.

Figure 18:
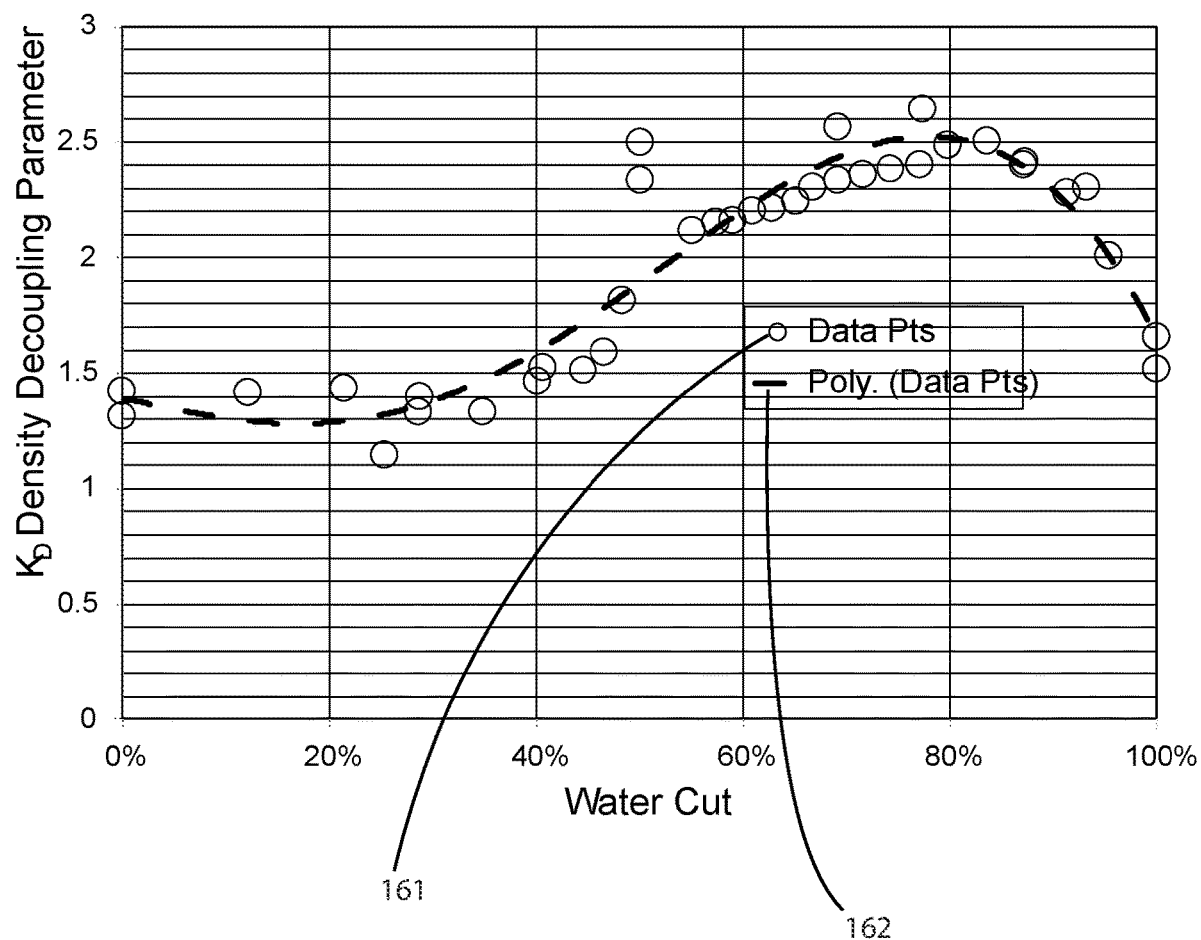
FIG. 18 is a graphical representation of the decoupling parameter of a speed of sound augmented Coriolis meter in accordance with the present disclosure.

As illustrated above, each test point for which the liquid phase watercut was held constant while the gas carry-under varied, provides a data set with which to determine a decoupling parameter, $K_d$. FIG. 18 shows a number of test points were run and with reference to FIG. 18 the value for the decoupling parameters 161 for 37 test points in which the variations in gas carry-under were sufficient to determine a density decoupling parameter are plotted versus watercut. As shown, the 37 decoupling parameters 161 exhibit a clear trend with watercut. A polynomial fit 162 of $K_d$ as a function of watercut is shown in FIG. 8, with a coefficient of determination of $R^2$=0.87, indicating that the fit is capturing much of the observed variation.

Figure 8:
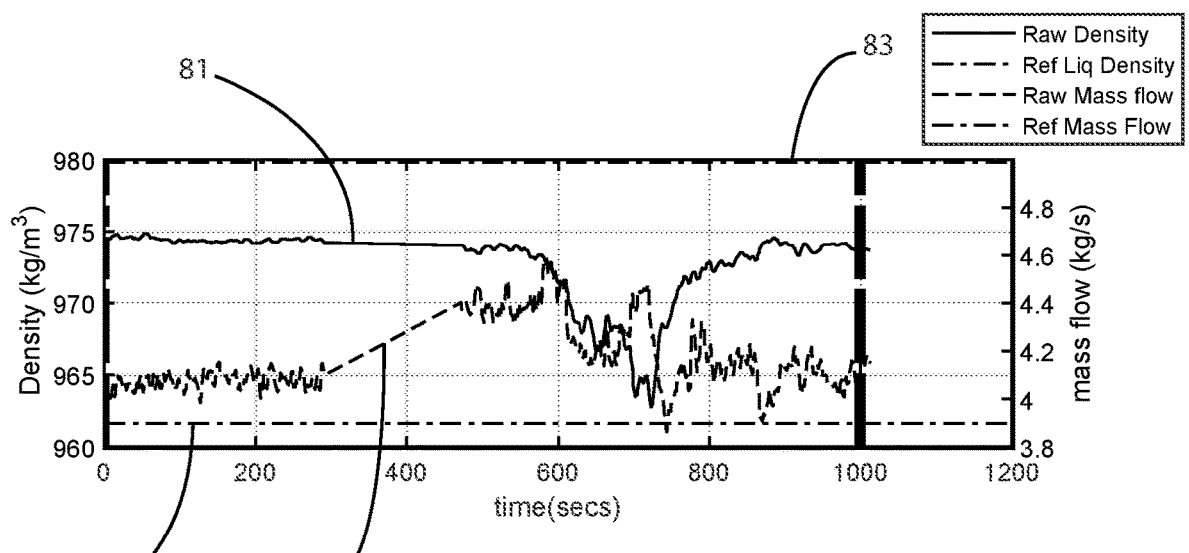
FIG. 8 is a graphical representation of data measured from a speed of sound augmented Coriolis meter in accordance with the present disclosure.

The polynomial fit 162 shown in FIG. 8, as part of the current disclosure, can serve as a calibration for the decoupling parameter as a function of watercut for speed of sound augmented Coriolis meter 75 in such operating regimes. Note that the shape of this curve will, in general, be a function of many parameters including fluid and Coriolis meter properties and is likely to be specific to the examples disclosed. The polynomial fit 162 was applied to the each of the 37 data points to determine the density decoupling parameter $K_d$ as a function of watercut.

Figure 19:
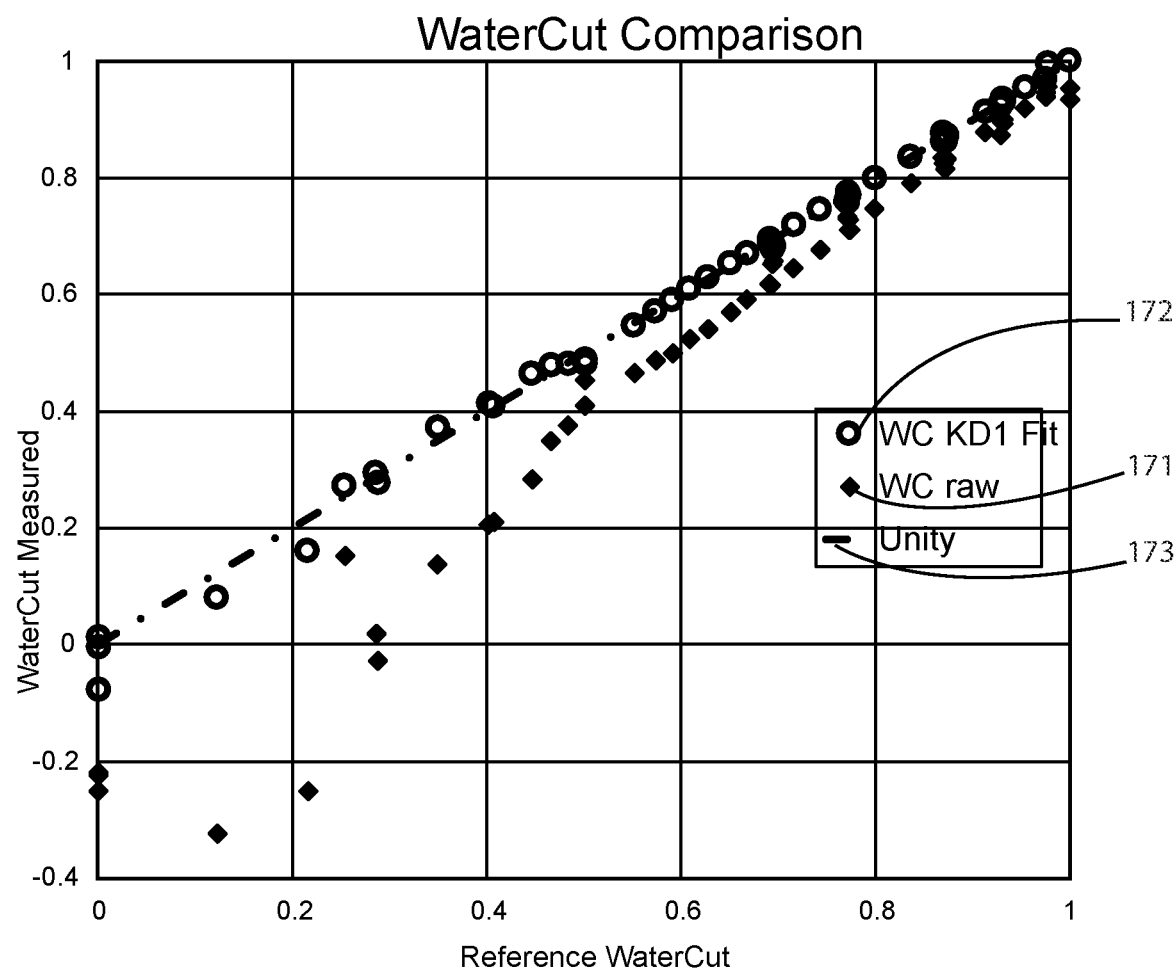
FIG. 19 is a graphical representation of watercut data measured from a speed of sound augmented Coriolis meter versus reference watercut in accordance with the present disclosure.

Referring next to FIG. 19, the resulting measured watercut 171 (labeled "WC raw" in the figure) and corrected watercut 172 (labeled "WC KD1 Fit" in the figure), averaged over time for each of the 37 test points, is plotted versus the reference watercut 173 (labeled "UNITY" in the figure) FIG. 199. As shown, the speed-of-sound augmented Coriolis meter 75 is effective in correcting the watercut errors due to variable levels of gas carry-under over a wide range of watercuts and liquid flow rates.

Figure 20:
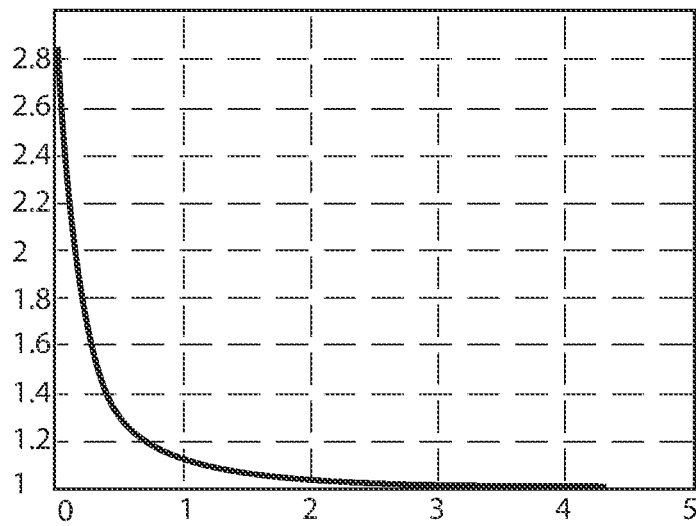
FIG. 20 is a graphical representation of the decoupling amplitude ratio as function of Inverse Stokes Parameter for a Bubble in Liquid from the prior art.
Figure 21:
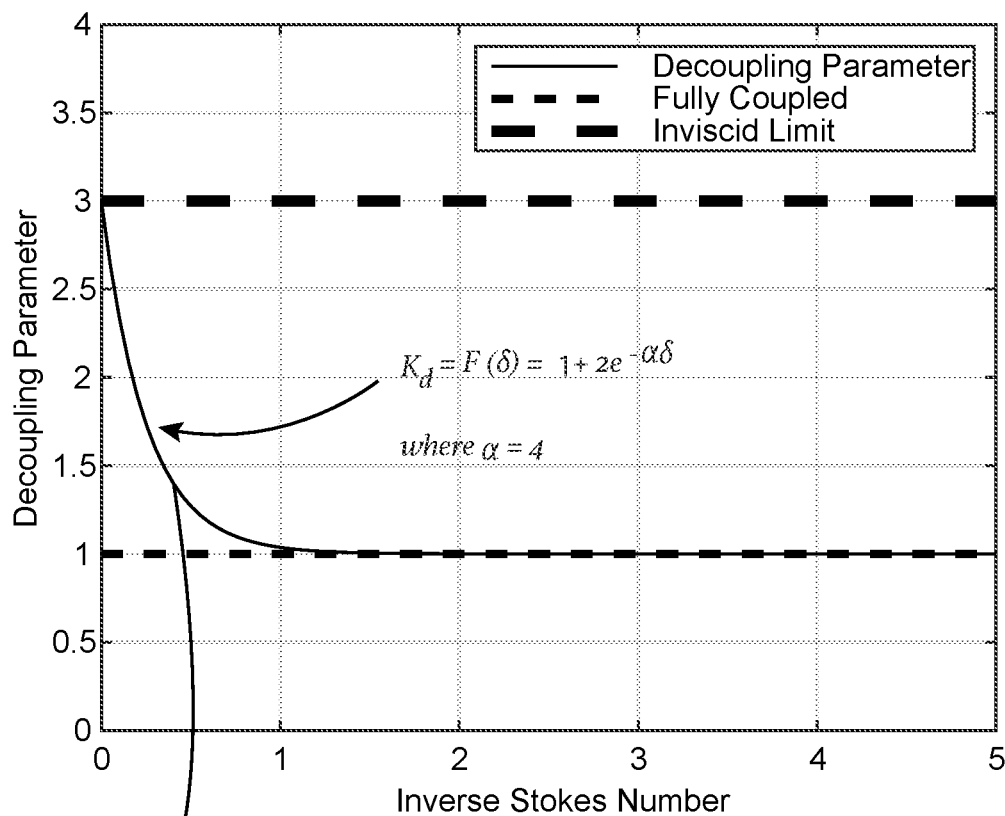
FIG. 21 is a graphical representation of the decoupling parameter expressed as a simplified function of inverse Stokes number in accordance with the present disclosure.

Another aspect of the current disclosure is that identifying the decoupling parameter also provides a means to characterize a bubble size parameter. FIG. 20 shows the decoupling amplitude ratio as function of Inverse Stokes Parameter for a bubble in liquid from Weinstein [5]. In Weinstein [5], the decoupling amplitude ratio is defined as the amplitude of a particle or bubble entrained in a fluid in a vibrating tube divided by the amplitude of the vibrating tube, and as disclosure herein, this parameter can be assumed to be functionally equivalent to the decoupling parameters, $K_d$ and $K_m$, defined herein. FIG. 21 shows a parameterized version of this these results, where the decoupling parameter 181, $K_d$ defined herein is assumed to be functionally equivalent to the decoupling ratio of Weinstein [5] as a function of inverse Stokes number. The term functional equivalent is used here to indicate, that while the physics of an oscillation of an individual bubble in a large oscillating fluid is similar to those of a distribution of bubble within a Coriolis meter, the simplified model does not represent the generally much more complex physics of an oscillatory flow within a Coriolis meter. For example, while bubble size is well-defined for the isolated bubble, bubble size is replaced by a bubble size parameter that represents a representative bubble size for a mixture with a distribution of bubbles. Also, as developed in Weinstein [5], the relationship between the fluid motion and a particle exhibits both an amplitude ratio and a phase difference, indicating that the even physics of the simplified model is not fully captured using the decoupling parameter defined within.

The inverse Stokes number of Equation 2 disclosed herein above can be expressed in terms cyclic frequency (instead of angular frequency) as $$\delta \equiv \sqrt{\frac{2v_f}{2\pi f R_{bubble}^2}}. \qquad \text{(Equation 37)}$$

Since the inverse Stokes number is a function of: 1) the either known, readily-determined or readily-estimated kinematic viscosity of the liquid $v_f$; 2) the either known or measured vibrational frequency f; and 3) a parameter representing the bubble size, determining the density decoupling parameter provides a means for determining a parameter $R_{bub}$ that is representative of the size of the entrained bubbles. Note that the size of the bubbles within a bubbly fluid with typically spans a range of actual sizes, and the bubble size parameter is a parameter indicative of a representative size of the bubbles. Bubble size can be an important parameter for a process fluid, for example, as a quality metric for products with entrained gases, such as ice cream, or other foamed products, as indicted by Zhu [12]. Additionally, it can be useful in diagnosing the performance of process equipment such as gas/liquid separators.

Figure 22:
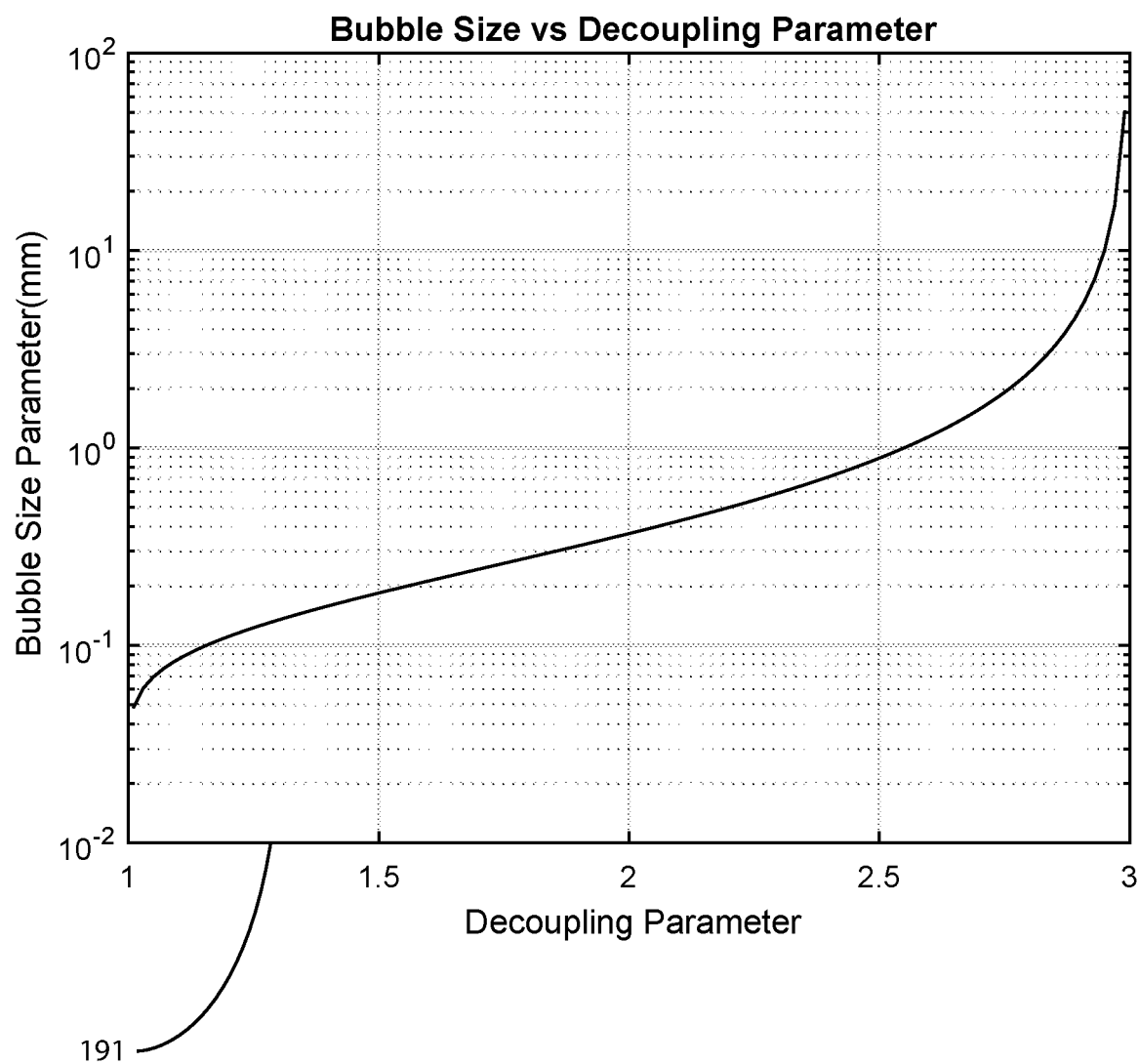
FIG. 22 is a graphical representation of bubble size parameter versus decoupling parameter from a speed of sound augmented Coriolis meter versus reference watercut in accordance with the present disclosure.

As an example of the disclosure immediately herein above relative to bubble size, FIG. 22 shows a plot 191 of bubble size parameter $R_{bub}$ versus decoupling parameter $K_d$ for a bubbly liquid within liquid properties representative of water for speed of sound augmented Coriolis meter 75 with a vibration frequency of 78 Hz. Similarly, and with reference to FIG. 23, there is shown the estimated bubble size parameter as a function of watercut. The bubble size parameter $R_{bub}$ was determined utilizing the identified decoupling parameter $K_d$, the Coriolis vibrational frequency f, the liquid density and liquid viscosity $v_f$ at each point as set forth in the following equation:

$$R_{Bub} \equiv \sqrt{\frac{2v_f}{2\pi f} \frac{-\alpha}{\ln\left(\frac{(K_d-1)}{2}\right)}}. \qquad \text{(Equation 38)}$$

Figure 23:
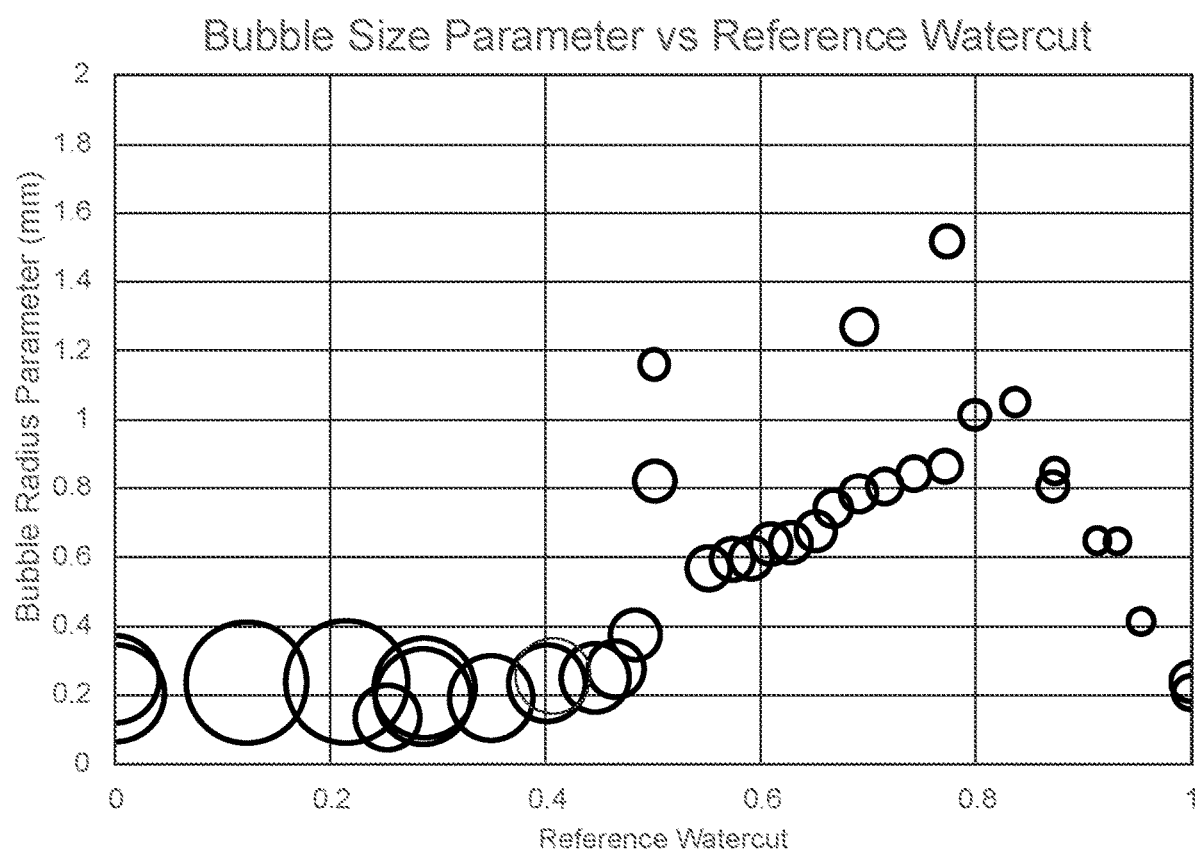
FIG. 23 is a graphical representation of bubble size parameter versus reference watercut in accordance with the present disclosure.

The relative sizes of the symbols in the graph in FIG. 23 are indicative of the time-averaged gas void fraction at each test point.

Decoupling Parameter Iterative Optimization

Other methods to determine the decoupling parameter of a Coriolis measurement involve including the decoupling parameter as an optimization parameter along with the physical parameters of the process fluid, such as mass flow, liquid phase density, and gas void fraction in a non-linear parameter optimization process. Note that the previous examples concurrently solved for a characteristic of the multiphase flow (i.e. the liquid density) and a decoupling parameter (i.e. $K_d$), utilizing a linear least squares optimization process.

Figure 24:
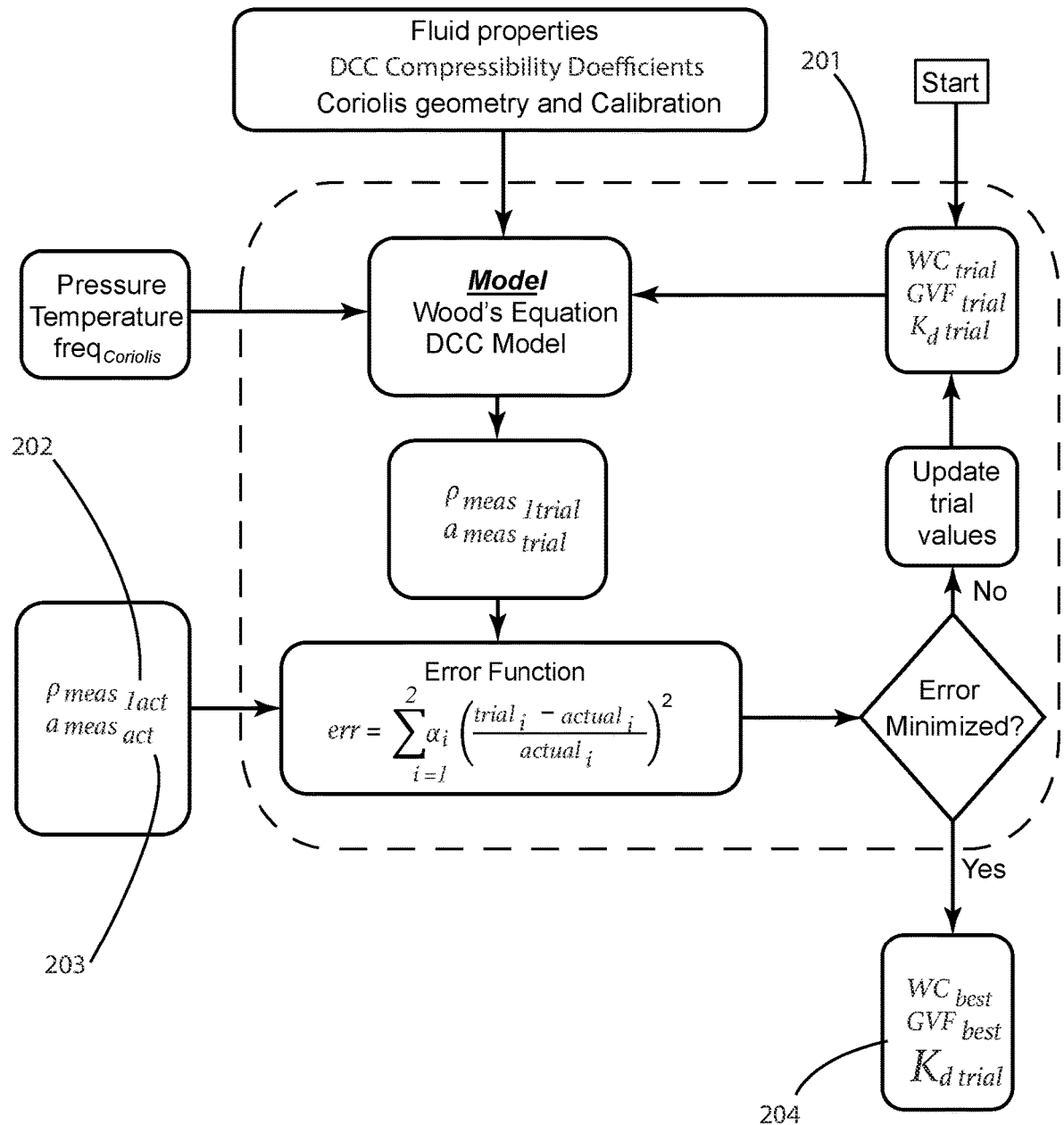
FIG. 24 is a schematic representation of an optimization process in accordance with the present disclosure.

One embodiment of this approach is shown schematically in FIG. 24 in which the density decoupling parameter, $K_d$, rather than being a known input is included in the optimization parameters, and is used as a trial parameter in optimization process 201 to determine trial values of simulated measured parameters which are compared to the actual measured parameters to form an error function.

One method to evaluate the effectiveness of the optimization process 201 illustrated in FIG. 22 is a graphical representation of bubble size parameter versus decoupling parameter from a speed of sound augmented Coriolis meter versus reference watercut in accordance with the present disclosure;

FIG. 23 is a graphical representation of bubble size parameter versus reference watercut in accordance with the present disclosure;

FIG. 4 is to perform simulations in which the mass flow, watercut, gas volume fraction and decoupling parameter are optimized using optimization process 201 based on an error function utilizing: 1) a measured density 202 as a first measured parameter; and 2) a measured speed of sound 203 as an additional measured parameter as inputs along with the additional measured parameters characterizing the Coriolis meter and components of the process fluid. As with the simulations disclosed herein above, the "measured" parameters are calculated utilizing the models developed herein, and then the error function is minimized through iterations over a range of allowable of trial multiphase flow characteristics to determine optimal multiphase flow characteristics 204.

As a means to assess the robustness of an optimization approach to determine physical characteristics of a process fluid, random noise is added to each of the simulated measured variables and these are used within an optimization procedure to determine the multiphase flow characteristics that minimize the error function in the presence of noise on the measured parameters.

Figure 25:
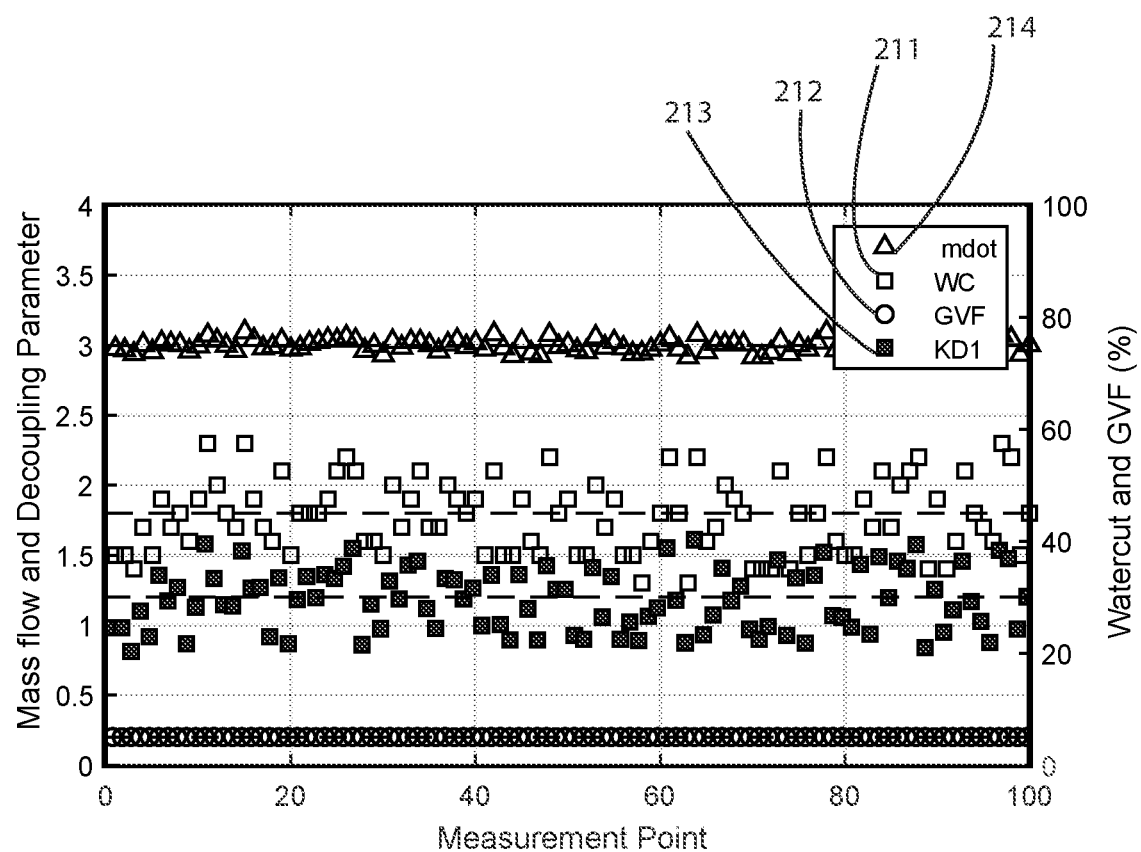
FIG. 25 is a graphical representation of optimized values for the mass flow, watercut, gas void fraction, and decoupling parameters from a speed of sound augmented Coriolis meter versus reference watercut in accordance with the present disclosure.

FIG. 25 is a graphical representation of optimized multiphase flow characteristics (i.e. the mass flow, watercut, gas void fraction, and decoupling parameters) obtained optimizing an error function based on differences in 1) measured vs trial Coriolis density and 2) measured vs trial sound speed for 100 simulations in which the simulated measured parameters, calculated to be consistent with input values for the mass flow, watercut, density, and decoupling parameters (shown with dashed lines in FIG. 25) with +/−1% maximum amplitude random noise added to each of the said simulated measured parameters. The simulations were performed for a set point with 30% watercut with 5% gas void fraction at 3.0 kg/sec mass flow. The Coriolis flow tube 352 (FIG. 71) has a diameter of 2 inches and a nominal vibrational frequency of 80 Hz. The density decoupling parameter $K_d$ and mass flow decoupling parameter $K_m$ were each 1.8. These parameters are summarized in Table 1 below:

TABLE 1

| Parameter | Value | Units |
|---|---|---|
| Mass Flow Rate | 3 | kg/sec |
| Watercut | 0.3 | |
| Gas Void Fraction | 0.05 | |
| RMS Noise | +/−0.01 | Max |
| Oil Density | 800 | kg/m^3 |
| Water Density | 1000 | kg/m^3 |
| Gas | 11.1 | kg/m^3 |
| Coriolis Freq | 80 | Hz |
| Flow Tube Dia | 2 | inches |
| Kd | 1.8 | |
| Km | 1.8 | |

Referring now to FIG. 25 there is shown the results from 100 simulations labeled as "Measurement Point" along the X-axis for multiphase flow characteristics that are determined based on an optimization process similar to optimization process 201 described herein with noise added to the simulated data. The optimization utilized equal weighting of: 1) error contributions from the simulated measured Coriolis density with noise versus a trial Coriolis density; and 2) error contributions from the simulated measured sound speed with noise versus a trial sound speed. It should be appreciated by those skilled in the art that, although only errors associated with the measured density and measured speed of sound are used in the error function, the optimization process determines an optimized watercut 211, an optimized gas void fraction 212, and an optimized decoupling parameter 213. An optimized mass flow 214 is determined utilizing the measured mass flow, and optimized gas void fraction 212, the measured reduced frequency, and optimized decoupling parameter 213. As shown, the optimization yields reasonable estimates for mass flow, water cut, gas void fraction and decoupling parameter in the presence of random noise on each of the measured variables of +/−1%. There is a relatively large standard deviation of the optimized watercut and density decoupling parameter associated with the random noise input. The mean values for of the optimized parameters in the presence of random noise closely match the input parameters. Note that the influence of noise on the optimize multiphase flow parameters used herein is intended to provide a basis for relative comparison of various embodiments of the current disclosure, and, since noise levels and measurement uncertainty and model uncertainty and required accuracy are, in general, application specific, the noise sensitivity studies are not intended to convey any assessment of the utility of any embodiment for any specific application.

Figure 26:
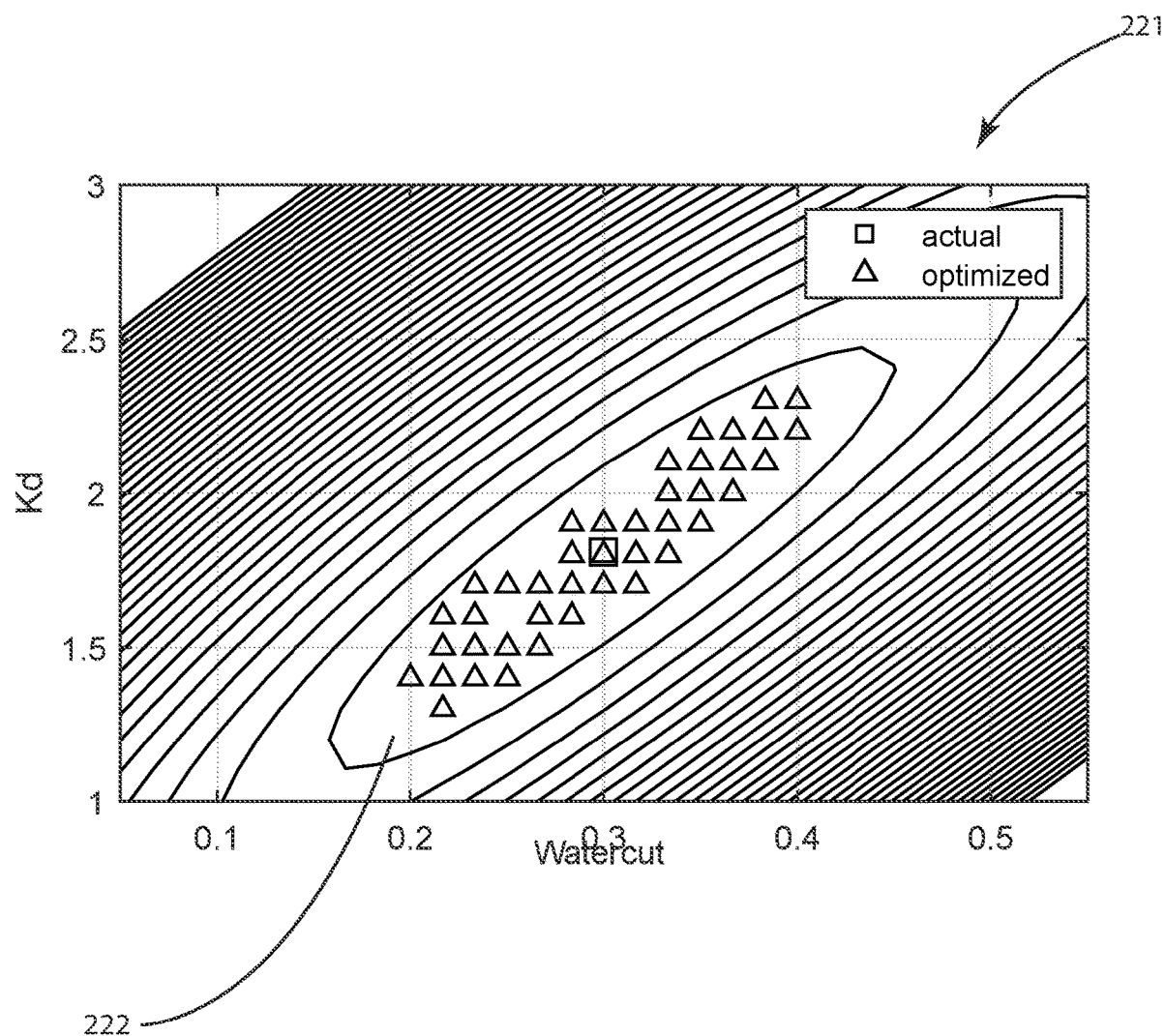
FIG. 26 is a graphical representation of an optimization function over a range of decoupling parameter versus watercut in accordance with the present disclosure.

Referring to FIG. 26, there is shown a contour plot 221 of a cross section of the error function associated with the optimization process of FIG. 25 generated utilizing the simulated measure parameters without any noise added to the measured parameters over a range of trial density decoupling parameter and trial watercuts. The contours indicate region of low error exists is around the optimized value. The optimized watercut and density decoupling parameter for the 100 points, each with random noise added to the measured values bounded to +/−1% of the measured value, are overlayed on the plot as well.

The simulation disclosed immediately herein above demonstrates the heretofore unknown enablement of speed of sound augmented Coriolis meter 75 and the methods of the present disclosure to determine multiphase flow parameters and a decoupling parameter based on an optimization involving only a measured Coriolis density and a measured sound speed. As shown, the points with the random noise on the simulated measured values fall within the low error region indicated by the contours of the contour plot 221. However, as illustrated in this simulation, this low error region 222 spans a reasonably large range of watercut and decoupling parameters, resulting in significant noise in the optimized flow parameters associated with the random noise input to the simulated measured parameters.

Figure 27:
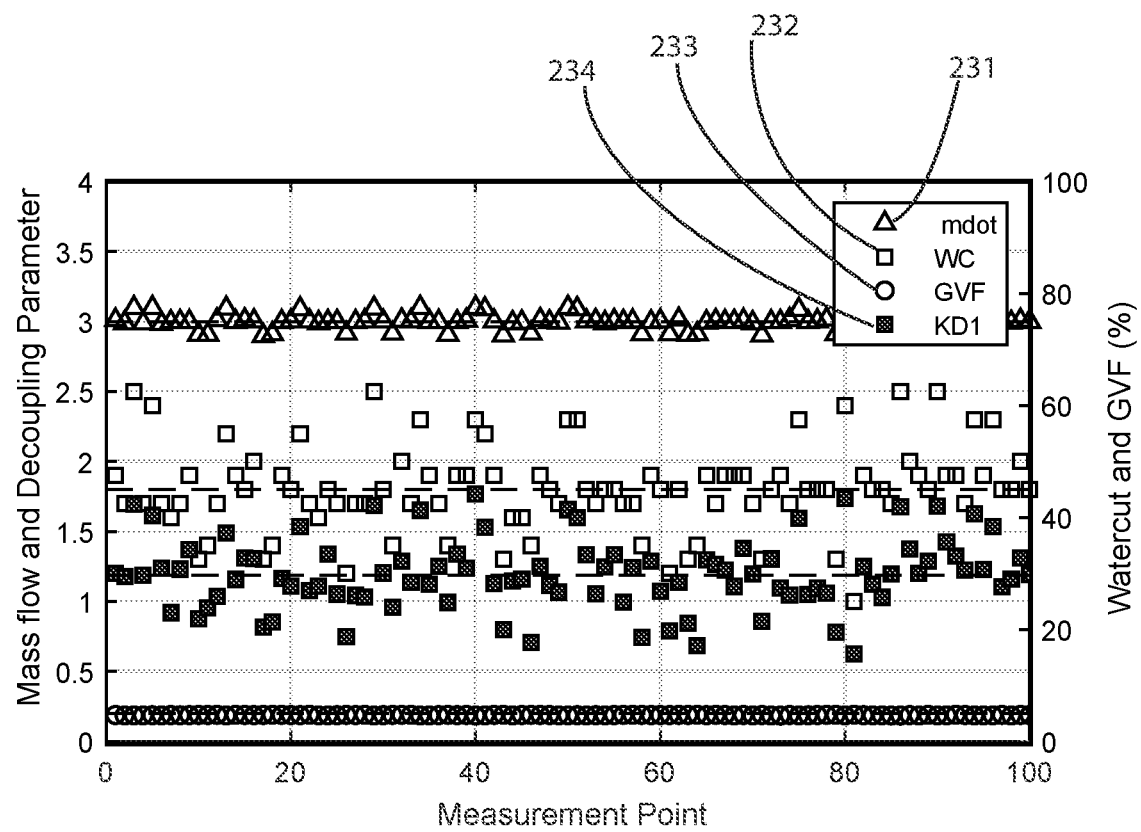
FIG. 27 is a graphical representation of optimized values for the mass flow, watercut, gas void fraction, and decoupling parameters from a speed of sound augmented Coriolis meter versus reference watercut in accordance with the present disclosure.

FIG. 27 shows the results of an optimization that is similar to that described with reference to FIG. 25, however in the results shown in FIG. 27 the optimization function included an error contribution from the difference in a measured versus trial mass flow. FIG. 27 shows values for the optimized mass flow, 231 watercut 232, gas void fraction 233, and decoupling parameter 234 based on optimizing an error function based on differences in: 1) measured Coriolis mass flow versus trial Coriolis mass flow; 2) measured Coriolis density versus trial Coriolis density; and 3) measured sound speed versus trial sound speed for 100 simulations in which the simulated measured values are based on constant input values for the mass flow, watercut, density, and decoupling parameter (shown with dashed lines on graph) with +/−1% bounded random noise added to each of the said simulated measured values.

Figure 28:
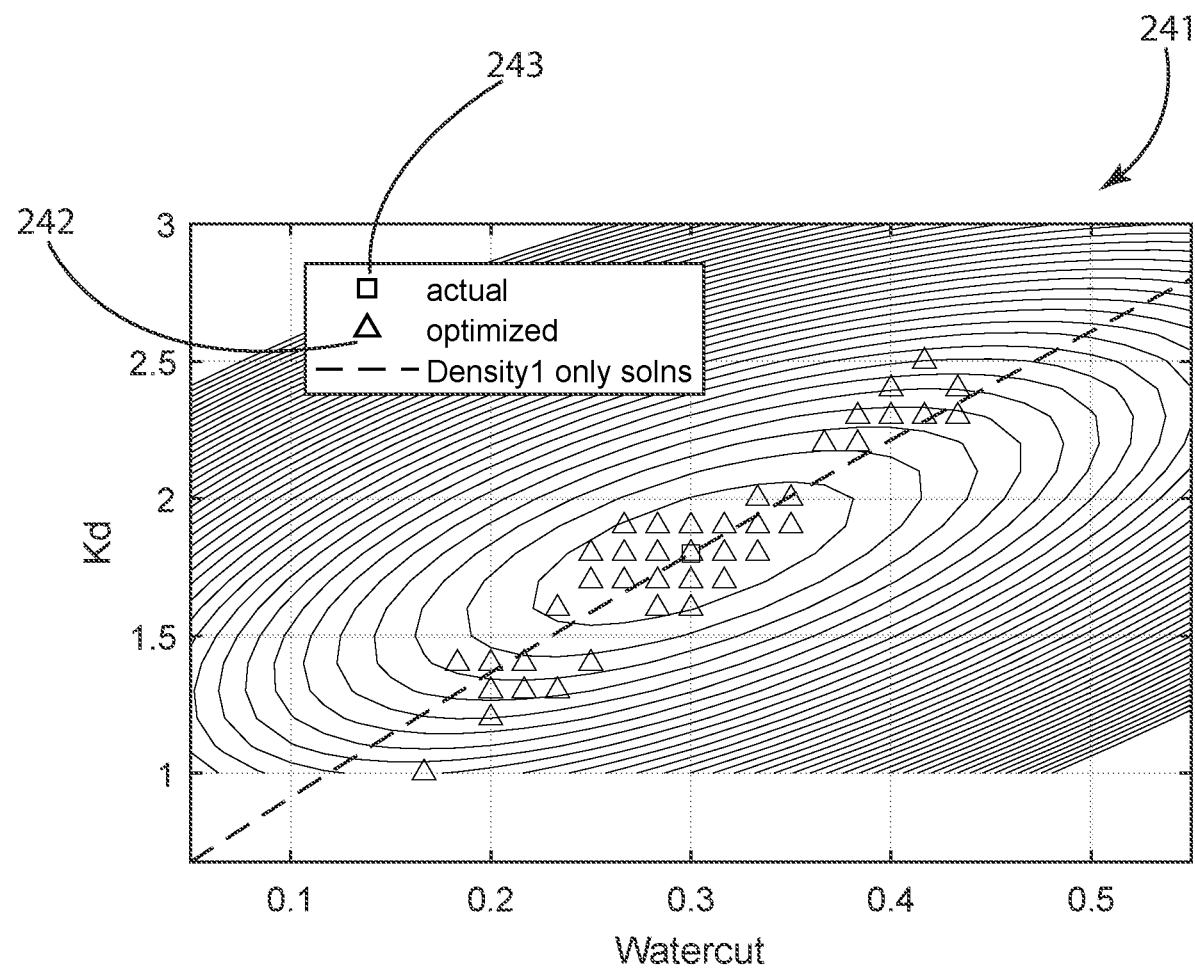
Figure 29:
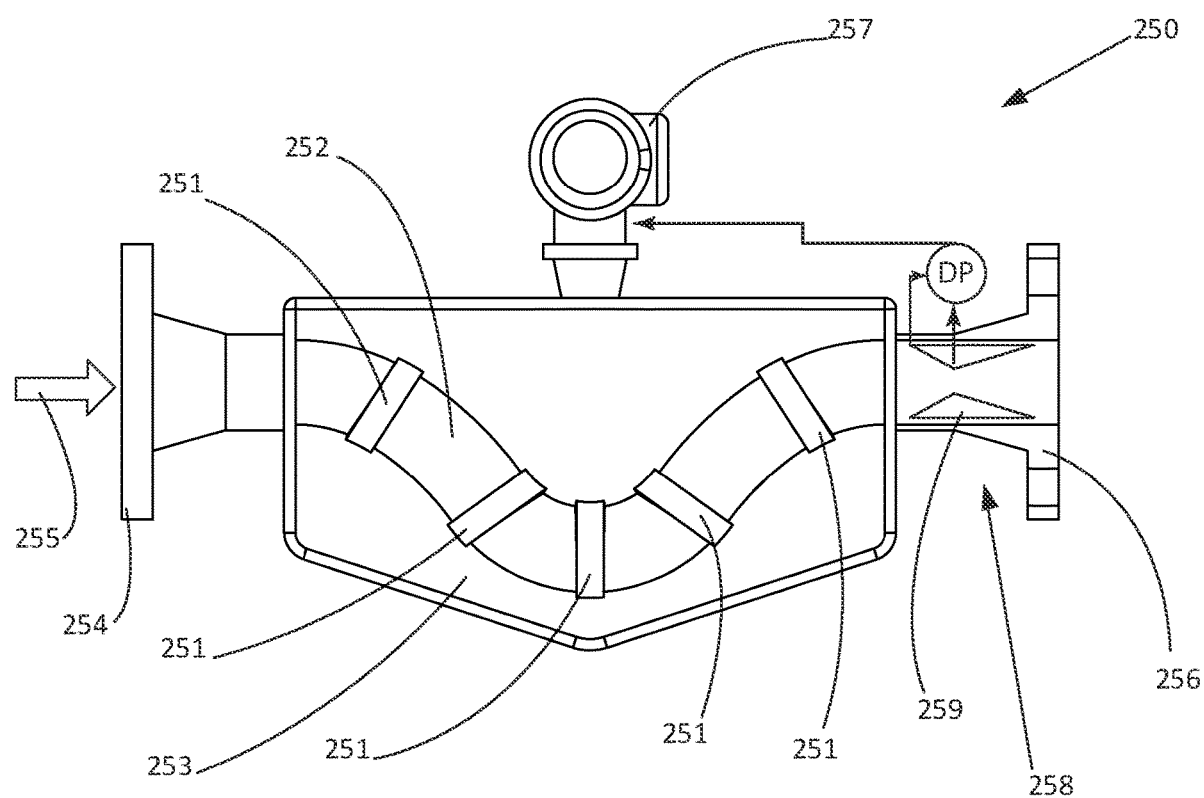
FIG. 29 is a side view of a speed of sound augmented Coriolis meter enhanced with a venturi flow meter in accordance with the present disclosure.

Referring next to FIG. 28, there is shown a cross section plot 241 of an error function constructed without no noise applied to the measurement parameters over a range of decoupling parameters, $K_d$ versus watercut with the results of the optimization for the 100 optimized points 242 based on 1) the simulated measured mass flow; 2) the simulated measured Coriolis density; and 3) the simulated measured speed of sound. The optimized points 242 are shown plotted in relation to the actual value of $K_d$ of 1.8. It should be appreciated, and as shown in FIG. 6 and FIG. 7, for this embodiment, additional information of the mass flow in the optimization function does not significantly alter the accuracy of the optimization of the multiphase flow characteristics, compared to the similar embodiment that does not include an error contribution associated with the mass flow Speed of Sound Augmented Coriolis Meter Enhanced with a Momentum-Based Differential Pressure Flow Meter The above simulations, methods and embodiments of the present disclosure demonstrate the ability to utilize a measured Coriolis density and a measured process fluid sound speed measurement to determine the liquid density (or watercut as proxy), gas void fraction, and the density decoupling parameter. However, the simulations indicate that the speed of sound augmented Coriolis meter system is relatively sensitive to noise in the measured parameters. It would be desirable to have an apparatus and method configured to measure multiphase flows that leverages a speed of sound augmented Coriolis meter that has less sensitivity to noise and/or inaccuracies in input parameters. It is an aspect of the present disclosure that such embodiments include an apparatus and method to provide accurate, robust, multiphase flow measurement utilizing Coriolis flow measurement technology. Specifically, some of these embodiments comprise the simultaneous use of speed of sound augmented Coriolis flow measurement and Venturi flow measurement technologies and the parametric models disclosed herein above to provide, accurate, and robust multiphase flow measurement. Referring to FIG. 29 there is shown an embodiment of a speed of sound augmented Coriolis meter enhanced with a momentum-based differential pressure flow meter 258. Flow meter 250 is similar to speed of sound augmented Coriolis meter 75 (FIG. 7) which comprises a bent tube Coriolis meter with an array of strain-based pressure sensors 251 attached to the flow tube 252 positioned within housing 253. The array of strain-based pressure sensors in this embodiment is configured to measure the speed of sound of the process fluid, but other methods could be utilized to determine the speed of sound of the process fluid. Flow meter 250 further includes inlet flange 254 configured to be in fluid communication with a flow 255 of process fluid and an outlet flange 256 as well as a transmitter 257. Flow meter 250 further includes a Venturi flow meter 258 positioned with its throat 259 near the outlet flange 256. It should be appreciated by those skilled in the art that Venturi flow meter 258 functions just as a Venturi flow meter of the prior art in that flow 255 exits flow tube 252 and enters the Venturi flow meter. A first pressure sensor is positioned at the inlet end of Venturi flow meter 258 proximate flow tube 252 and a second pressure sensor is positioned in the necked down throat area of the Venturi flow meter. The difference in the measure pressures between the first pressure sensor and the second pressure is a function of the momentum of the process fluid and, when calibrated, is used, in conjunction with of known or measured parameters of the fluid to provide a measurement of a flow rate of a process fluid. Transmitter 257 includes a processing unit which includes a processor (similar to processor 76 disclosed herein above with reference to FIG. 7) and it performs the standard Coriolis measurement requirements of the prior art such as to drive the flow tube 252 and measure and interpret the vibrational characteristic of the flow tube, as well as measure and interpret the output of the array of strain-based pressure sensors 251 in terms of process-fluid speed of sound, and to measure and interpret the differential pressure across the Venturi. Transmitter 257 includes hardware and software capable of performing the algorithms described herein to provide accurate and robust measurement of measurement of single and multiphase flows as will be described in more detail herein below. Embodiments also include prior art Coriolis meters that are retrofitted to include the methods disclosed herein to include a sound speed meter to provide a measured multiphase process fluid speed of sound measurement to correct the prior art meters for the decoupling effects of an inhomogeneous multiphase process fluid including those have bubbly flow and particles.

The method and apparatus of flow meter 250 approach utilizes four primary measured parameters: 1) the mass flow reported by a Coriolis meter calibrated for homogeneous fluids with low compressibility; 2) the density reported by a Coriolis meter calibrated for homogeneous fluids with low compressibility; 3) process fluid sound speed representative of the sub-bubble-resonant speed of sound from the array of strain-based pressure sensors 251 in for which the wavelength of the sound is long compared the characteristic length of fluid inhomogeneities; and 4) a differential pressure measurement across a flow area change such as Venturi flow meter 258.

Figure 30:
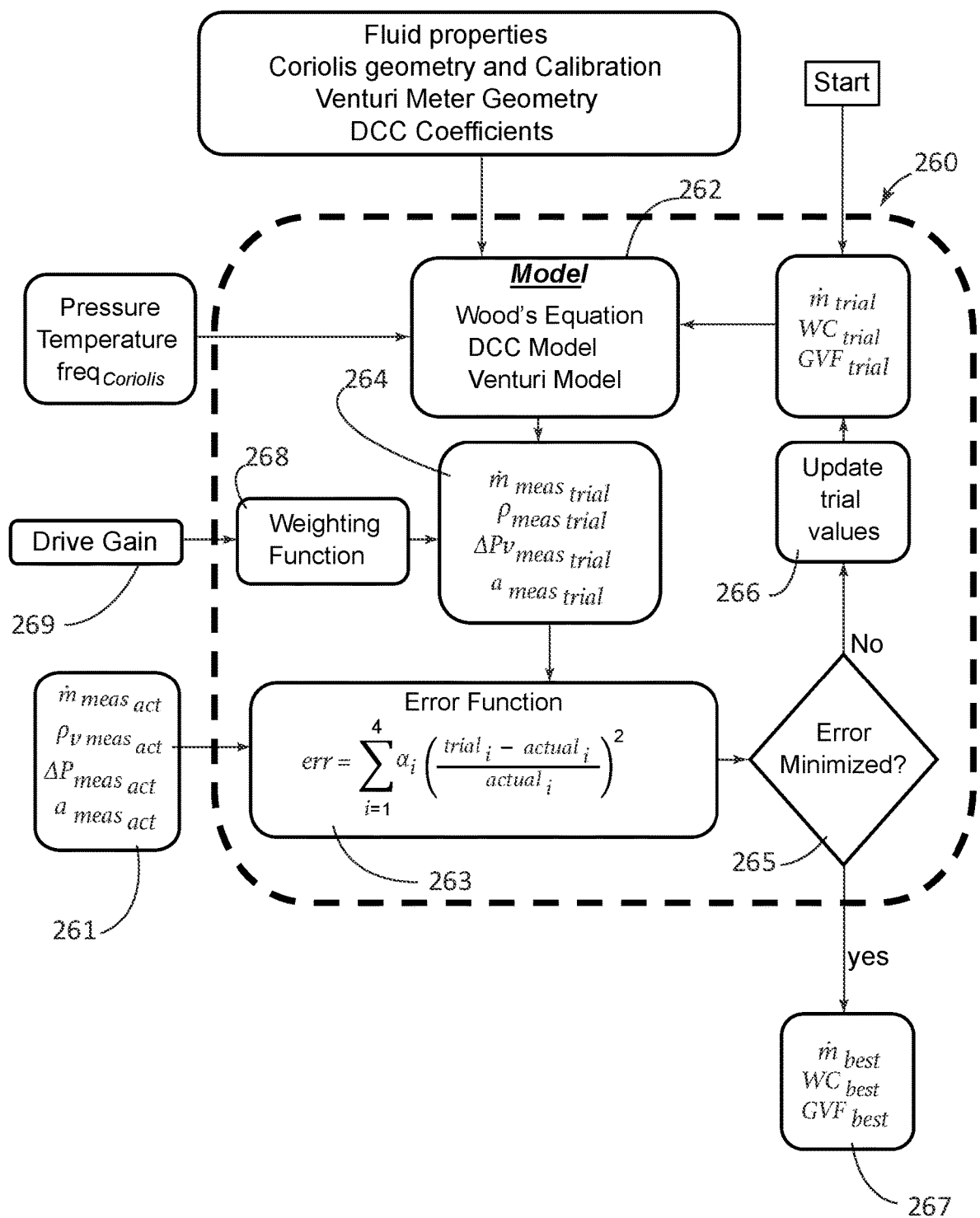
FIG. 30 is a schematic representation of an optimization process for a speed of sound augmented Coriolis meter enhanced with a venturi flow meter in accordance with the present disclosure.

Flow meter 250 uses an approach shown schematically in FIG. 30, including optimization process 260, which utilizes process fluid component information in the form of measured parameters 261, such as process fluid sound speed and densities of the components, and other information combined with a reduced order simulation model 262 to simulate the described process fluid measurements based on trial values of characteristics of a three phase flow. In this particular embodiment, the trial measurements parameters are process fluid mass flow, watercut of the liquid, and gas void fraction. The three components of the flow, oil, water and gas, are assumed to be well-mixed, with each phase, or components, flowing at nominally the same flow velocity.

The simulation model 262 simulates process fluid measurements associated with each trial set of mass flow, watercut, and gas void fraction. These simulated measurements for each trial flow condition are compared to the actual process measurement measured parameters 261 within error function 263 which comprises a positive-definite error function. The error function 263 contains a set of weighting functions 268 that weight errors contributions associated with each of the four measured parameters 261 and simulated parameters 264. The value of the error function is evaluated at step 265 to determine if it is minimized within a tolerance, and if the error is not determined to be minimized, the trial values are updated at step 266 and the process is repeated until the error is minimized. The values of mass flow, watercut, and gas void fraction that result in the minimum error function are reported as the mass flow, watercut, and gas void fraction at step 267.

The values of the weighting function 268 can be updated based on available information. For example, for periods in which the drive gain 269 of the Coriolis is low, indicating limited multiphase conditions, the weighting of the Coriolis mass flow can be increased, and the weighting on the Venturi differential pressure can be decreased. Conversely, when the drive gain 269 is elevated, more relative weighting can be placed on the Venturi.

In single phase flows, and multiphase flows with limited gas void fraction and limited inhomogeneities within the fluid, a Coriolis density and mass flow measurements are typically highly accurate and stable. Under these conditions, indicated by the diagnostics like the drive gain and the process fluid sound speed, the Coriolis meter can be utilized to periodically calibrate the Venturi based flow measurement, accounting for well-known issues such a drift in the differential pressure measurement to improve the overall accuracy and reliability of the Venturi augmented, speed of sound augmented, Coriolis meter.

Simulation Model for Venturi Enhanced Flow Meter

As described above, the process involves using trial values to specify a three phase flow, in this case, assuming the flow is a well-mixed flow of oil, water, and gas, along with information on the fluid properties and the geometry of the Coriolis and Venturi meter, and the decoupling and compressibility parameters in the Coriolis model, to simulate the four measured parameters: Coriolis reported mass flow, Coriolis reported density, differential pressure across a Venturi, and the process fluid sound speed. The simulation model 262 utilizes a model for the effects of decoupling and compressibility on Coriolis mass flow and density, Wood's Equation to related process fluid sound speed to process parameters, and a model of the flow through the Venturi, to simulate the four measured parameters based on trial input values for mass flow, watercut, and gas void fraction. Given the trial watercut and gas void fraction, along with the fluid properties, Wood's Equation can be used to simulate the measured process fluid sound speed.

It is known that the pressure drop from the inlet of a Venturi to the throat of a Venturi can be derived to first order using Bernoulli's principle. Other formulations can be used for higher accuracy, but for purposes of this disclosure, the following equation is used:

$$\Delta P_V = \frac{1}{2}(AR^2 - 1)\frac{\dot{m}_{mix}^2}{\rho_{mix} A_{in}^2}. \quad \text{(Equation 39)}$$

Where AR is the area ratio of the inlet over the throat area, and $A_{in}$ is the area of the inlet to the Venturi.

Optimization of a Venturi Enhanced Flow Meter

In one embodiment of this disclosure, the measured parameters are compared with the parameters simulated for a set of trial flow characteristics. As illustrated in FIG. 30, error function 263 utilized here in is a weighted sum of the square of a normalized difference between measured and simulated parameters and is given as follows:

$$err_1 = \\ \alpha_1\left(\frac{\dot{m}_{meas_{trial}} - \dot{m}_{meas_{actual}}}{\dot{m}_{meas_{actual}}}\right)^2 + \alpha_2\left(\frac{\rho_{meas_{trial}} - \rho_{meas_{actual}}}{\rho_{meas_{actual}}}\right)^2 + \\ \alpha_3\left(\frac{\Delta Pv_{meas_{trial}} - \Delta Pv_{meas_{actual}}}{\Delta Pv_{meas_{actual}}}\right)^2 + \\ \alpha_4\left(\frac{a_{meas_{trial}} - a_{meas_{actual}}}{a_{meas_{actual}}}\right)^2. \quad \text{(Equation 40)}$$

Simulation Results of a Venturi Enhanced Flow Meter

Figure 31:
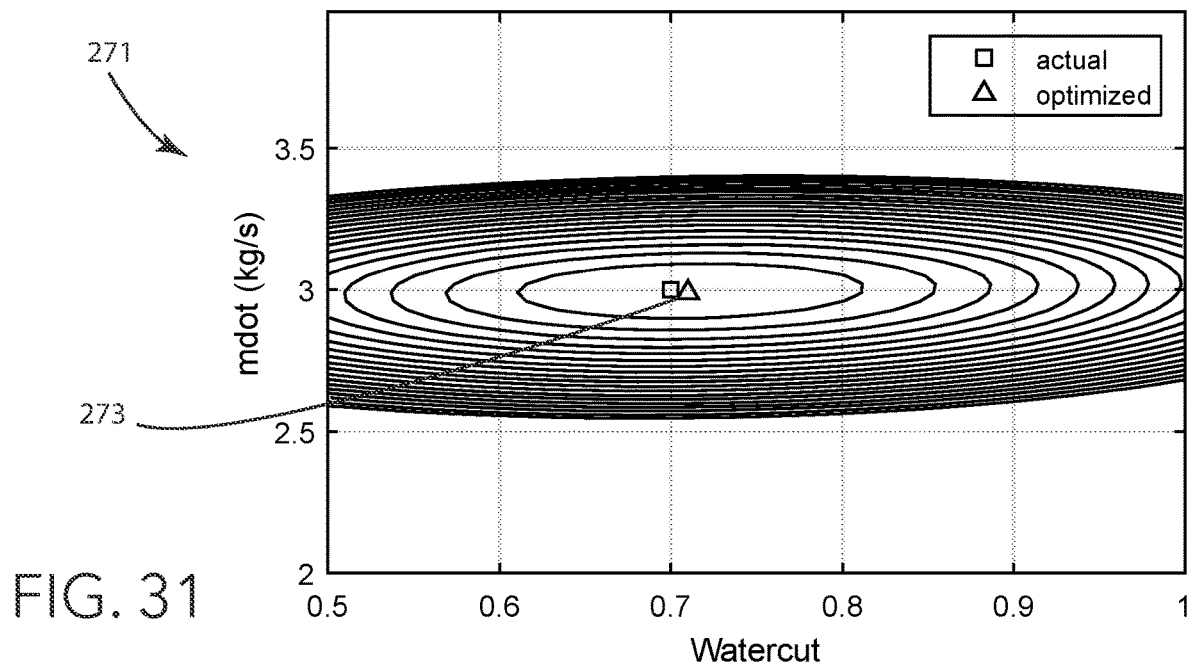
FIG. 31 is a graphical representation of an error function for a three-phase flow simulation of a speed of sound augmented Coriolis meter enhanced with a Venturi meter in accordance with the present disclosure.
Figure 32:
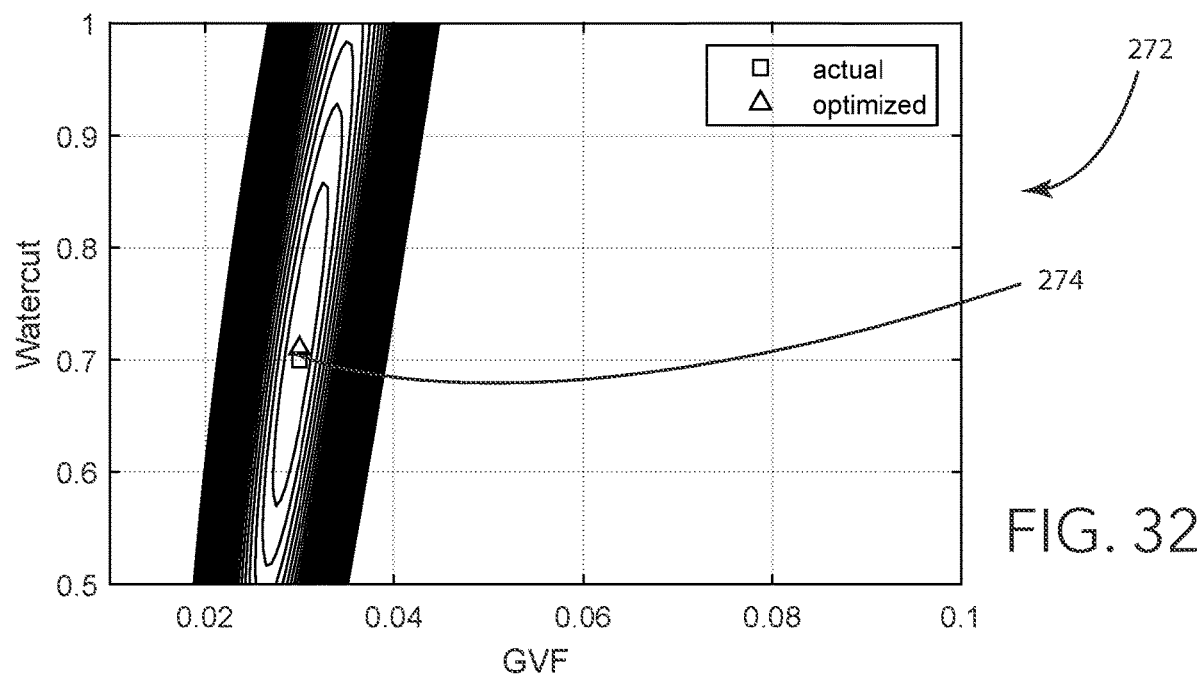
FIG. 32 is a graphical representation of an error function for a three-phase flow simulation of a speed of sound augmented Coriolis meter enhanced with a Venturi meter in accordance with the present disclosure.

Referring now to FIG. 31, there is shown contour plots of the error function for a simulated three phase measurement with mass flow versus watercut in plot 271 and water cut versus gas volume fraction in plot 272 in FIG. 32. The error function 263 was optimized by utilizing the models described above to calculate "measured" process parameters including Coriolis reported mass flow, Coriolis reported density, differential pressure across Venturi flow meter 258, and process fluid speed of sound from a SONAR array of strain based pressure sensors 251 for an input flow condition of 3.0 kg/sec mass flow, 70% watercut, with 3% gas void fraction. The density of the oil, water, and gas phases is 930 kg/m^3, 1000 kg/m^3, and 11.1 kg/m^3, respectively. In addition, 0.5% max amplitude random noise was added to each of the four simulated measured values resulting in simulated actual measured values of 2.92 kg/sec and 894 kg/m^3 from the Coriolis meter, 0.26 psi pressure differential from Venturi meter 258, and a process fluid sound speed of 256 m/sec reported from the SONAR array of strain based pressure sensors 251. The error functions were calculated using the simulated measured values with noise. The Coriolis model used in the simulation had a tube vibration frequency of 78 Hz, 2 in diameter flow tube 252, and decoupling parameters of $K_d$=2.0 and $K_m$=2.0, with compressibility parameters of $G_d$=0.25 and $G_m$=0.5. The area ratio from the inlet to the throat of the Venturi was 3.0, and the inlet of the Venturi had a diameter of 3.0 inches. The weights in weighting function 268 for this simulation were as follows: 1 for the Coriolis mass flow, 100 for the Coriolis density, 1 for the differential pressure across the Venturi, and 1 for the speed of sound measurement. The contours show a smooth surface, with the optimized result closely matching the input flow conditions, with the difference between the input and optimized values are related to the noise imposed on the simulated "actual" measured values at points 273 and 274.

Figure 33:
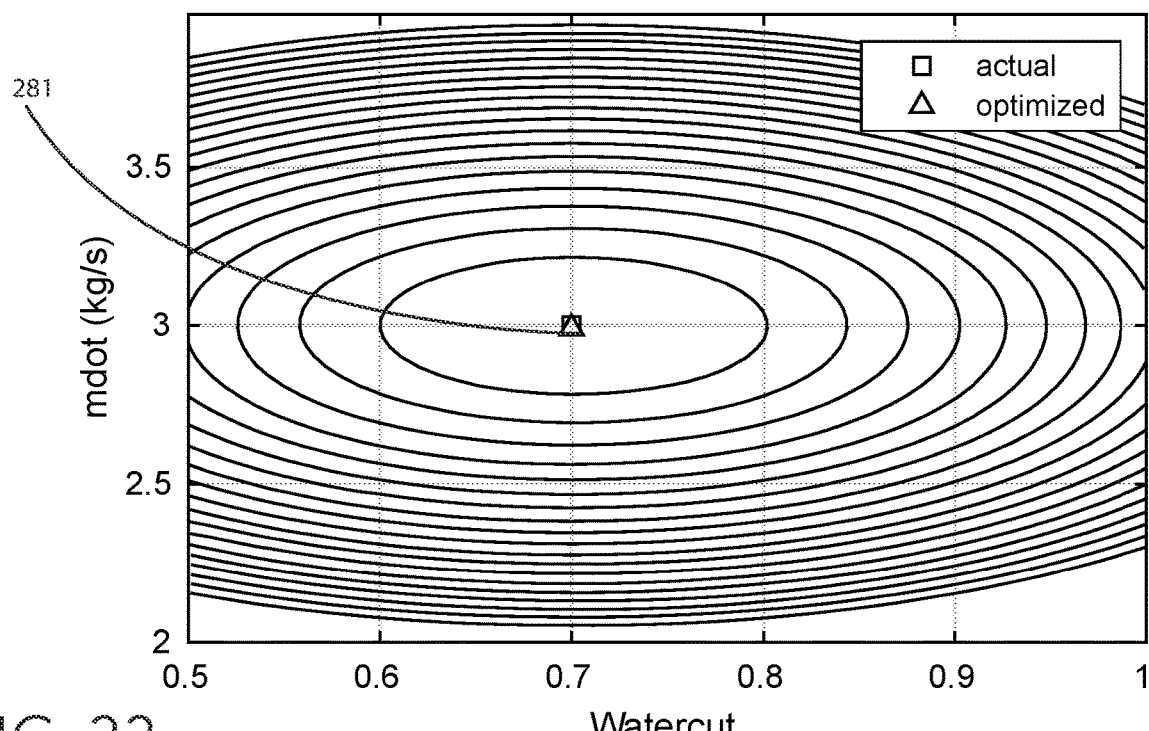
FIG. 33 is a graphical representation of an error function for a three-phase flow simulation of a speed of sound augmented Coriolis meter enhanced with a Venturi meter in accordance with the present disclosure.
Figure 34:
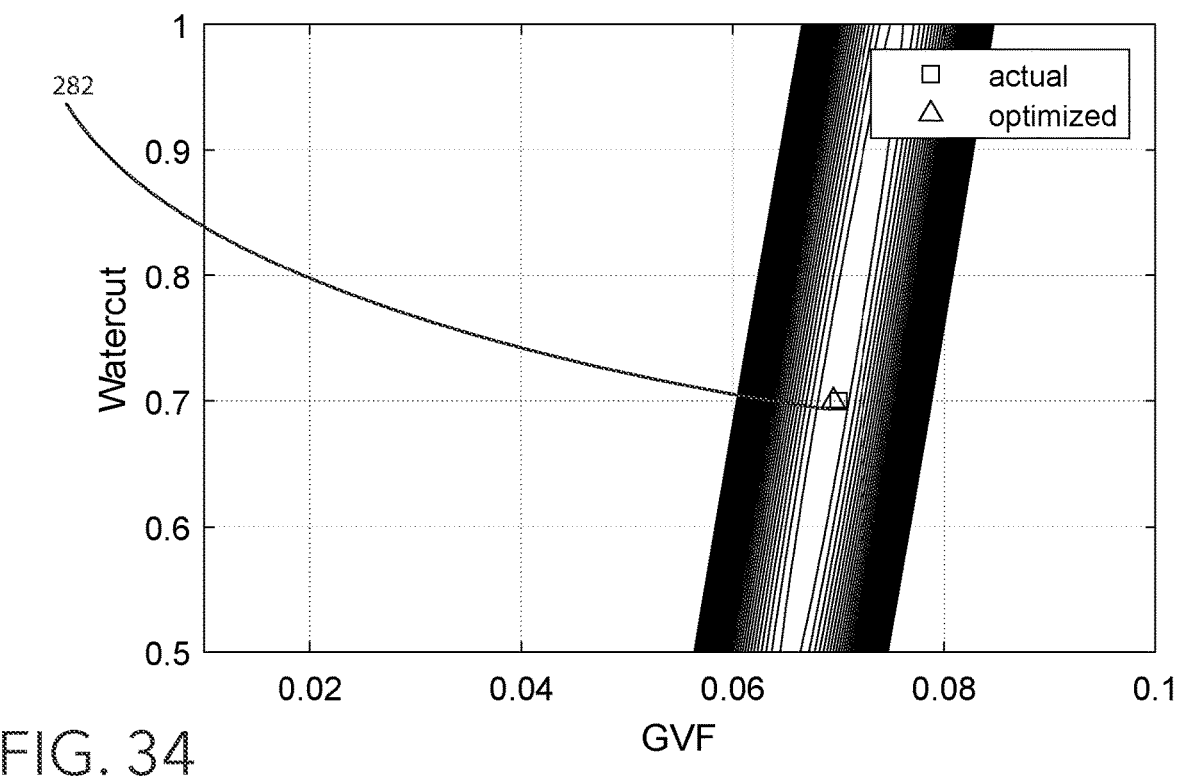
FIG. 34 is a graphical representation of an error function for a three-phase flow simulation of a speed of sound augmented Coriolis meter enhanced with a Venturi meter in accordance with the present disclosure.

As disclosed herein, the flow measurement system of a speed of sound augmented Coriolis meter enhanced with a Venturi flow meter has some degree of redundancy. FIG. 33 shows a similar simulation to that shown in FIG. 31, however for the simulation of FIG. 33, the Venturi weighting function was set to zero. The error function is smooth and exhibits a single minimum value 281, 282. As shown, and as would be expected, the speed sound augmented Coriolis meter is capable of accurately determining, albeit less accurately than when enhanced with a Venturi flow meter, the three-phase flow without input from the Venturi meter.

Thus, it has been discovered that the Venturi enhanced meter 250, using the optimization process 260, provides redundant information when the speed of sound augmented Coriolis meter is operating accurately, such as a point that would be indicated by low drive gain values. For these points, the measurement from the speed-of-sound augmented Coriolis meter, optimized with the weighting function 268 on the venturi error set to zero, could be used to calibrate the Venturi meter during normal operation.

A primary advantage of the Venturi enhanced sound speed augmented Coriolis meter 250 and the methodology disclosed herein above, as compare to the prior art, becomes evident for cases in which a prior art Coriolis mass flow measurement is impaired. For this case, which would often be indicated by elevated drive gain signals and/or elevated gas void fractions, the weighting of the Coriolis mass flow measurement can be reduced within weighting function 268, or set to zero, and the system would continue to accurately measure three phase flow 255. Additionally, the weight on the Coriolis mass flow measurement could be reduced within weighting function 268 if there were excessive uncertainty in the mass flow decoupling and/or compressibility coefficients.

Figure 35:
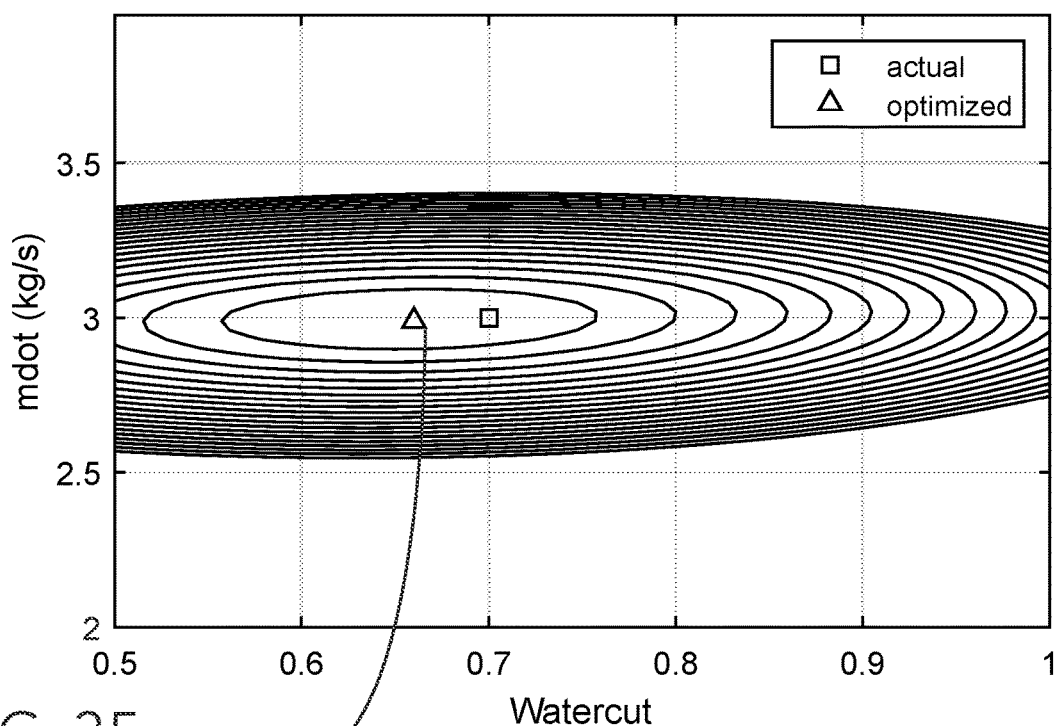
FIG. 35 is a graphical representation of an error function for a three-phase flow simulation of a speed of sound augmented Coriolis meter enhanced with a Venturi meter in accordance with the present disclosure.
Figure 36:
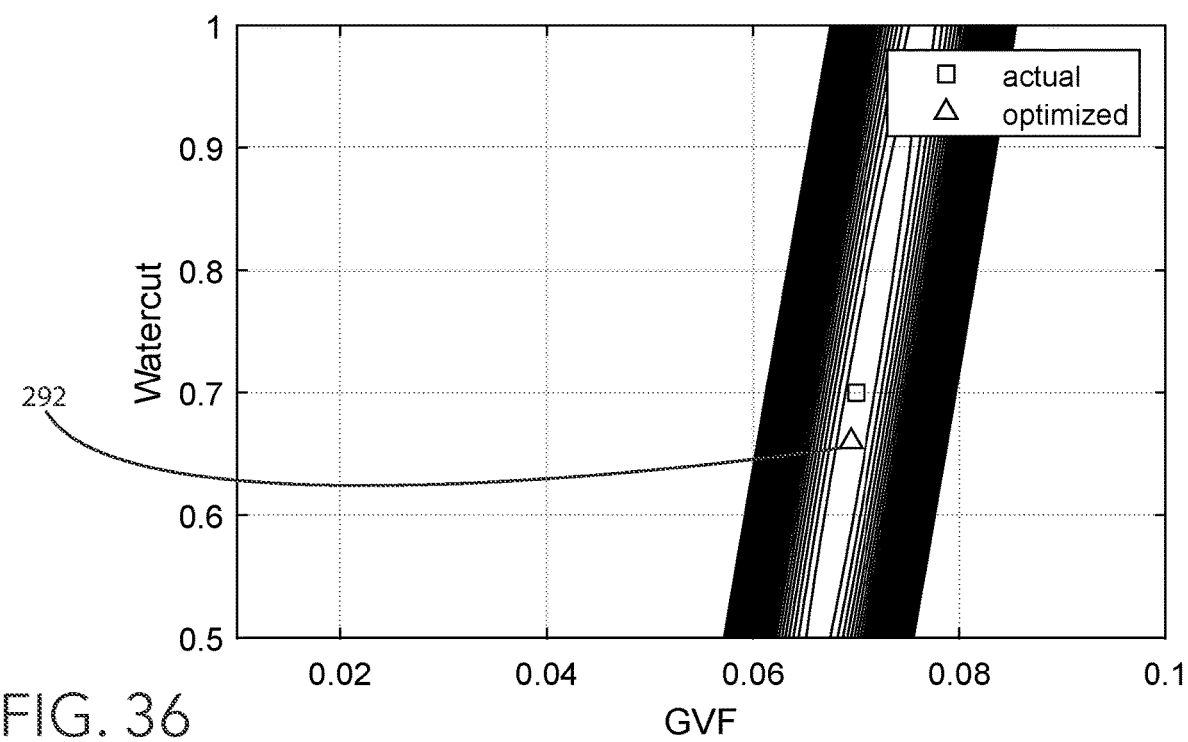
FIG. 36 is a graphical representation of an error function for a three-phase flow simulation of a speed of sound augmented Coriolis meter enhanced with a Venturi meter in accordance with the present disclosure.

Referring next to FIGS. 35-36, there is shown contour plots of the error function for a simulation similar to that described in FIG. 31, but with increased gas void fraction from 3% to 7%, and with the weighting function 268 for the mass flow of the Coriolis meter set to zero, simulating a condition for which the Coriolis mass flow measurement was impaired. As shown, even with the 0.5% maximum random noise on the simulated measurements, the error function is smooth and exhibits a single minimum value 291, 292.

It should be appreciated by those skilled in the art that the embodiment of the Venturi model in this disclosure is but an example and represents the broad class of differential pressure flow measurements devices and includes orifice plates, and any other controlled area change devices for which the differential pressure can be measures and related the momentum of the process fluid without departing from the scope of the present disclosure. Venturi meters are often utilized for flow measurement due to their high differential pressure from the inlet to the throat, but low overall total pressure loss with most of the pressure drop through the throat being recovered in the diffusing section downstream of the throat resulting in a relatively low overall pressure loss.

In addition to the advantages associated with making a differential pressure measurement, the acceleration of a flow through the throat of the Venturi, or other differential pressure-based flow measurement device, can serve as a source for acoustic noise with the piping system and thereby serves to improve the ability of any passive-listening-based speed of sound measurement by the array of strain-based pressure sensors 251, particularly in low acoustic noise environments. Additionally, if the differential pressure device is located upstream of the flow tube 252, the differential pressure meter can serve to increase the homogeneity of a multiphase flow, reducing bubble size and thereby reducing the effects of decoupling.

Decoupling Parameter $K_d$, $K_m$ Optimization with a Venturi Enhanced Speed of Sound Augmented Coriolis Meter Another advantage of augmenting a speed of sound Coriolis meter with a momentum-based differential pressure flow measurement is that the differential pressure measurement enables an improved determination of the decoupling parameters $K_d$ and/or $K_m$ of the Coriolis flow meter. The optimization process 260 developed above assumed that the decoupling parameter was known. While this indeed may be the case for some applications, and, notwithstanding other embodiments of this disclosure described elsewhere in this disclosure, providing a sufficiently accurate, yet practical means for determining the mass flow decoupling characteristics and the density decoupling characteristics can still present a practical challenge in applying Coriolis meters to multiphase flows.

The measured differential pressure from a Venturi meter can be expressed as a function mass flow and density measured by a Coriolis meter, the gas volume fraction, the reduced frequency, and the decoupling parameter for mass flow, $K_m$, and density, $K_d$, and the compressibility parameter for mass flow and density, $G_m$ and $G_d$ $$\Delta P_V = \frac{1}{2}(AR^2 - 1)\frac{\dot{m}_{mix}^2}{\rho_{mix}A_{in}^2} \quad \text{(Equation 41)}$$

$$\dot{m}_{mix} = \frac{\dot{m}_{meas}}{\left(1 - \frac{(K_m - 1)}{1 - \varphi_g}\varphi_g + G_m(f_{red})^2\right)} \quad \text{(Equation 42)}$$

$$\rho_{mix} = (1 - \varphi_g)\rho_{liq} = (1 - \varphi_g)\frac{\rho_{meas}}{\left(1 - k_d\varphi_g + G_d(f_{red})^2\right)} \approx \quad \text{(Equation 43)}$$

$$\frac{\rho_{meas}}{1 - \frac{(k_d - 1)}{1 - \varphi_g}\varphi_g + G_d(f_{red})^2}$$

For illustration purposes and assuming the density and mass flow decoupling parameters are equivalent, $K_d = K_m$, the pressure differential from upstream of the Venturi to the throat can be expressed in terms of the measured mass flow and density from the Coriolis meter corrected for the effects of decoupling and compressibility as follows:

$$\Delta P_V = \frac{1}{2}(AR^2 - 1)\frac{\dot{m}_{mix}^2}{\rho_{mix}A_{in}^2} \approx \quad \text{(Equation 44)}$$

$$\frac{1}{2}(AR^2 1)\frac{\dot{m}_{meas}^2}{\rho_{meas}A_{in}^2}\left(\frac{1 - \frac{(K_d - 1)}{1 - \varphi_g}\varphi_g + G_d(f_{red})^2}{\left(1 - \frac{(K_d - 1)}{1 - \varphi_g}\varphi_g + G_m(f_{red})^2\right)^2}\right)$$

Thus, as set forth in Equation 44, and for a given set of measured parameters, a calculated differential pressure based on measured mass flow and density from the Coriolis meter, corrected for decoupling and compressibility effects, and the geometry of the differential pressure device, can be expressed as a function of the decoupling parameters.

Figure 37:
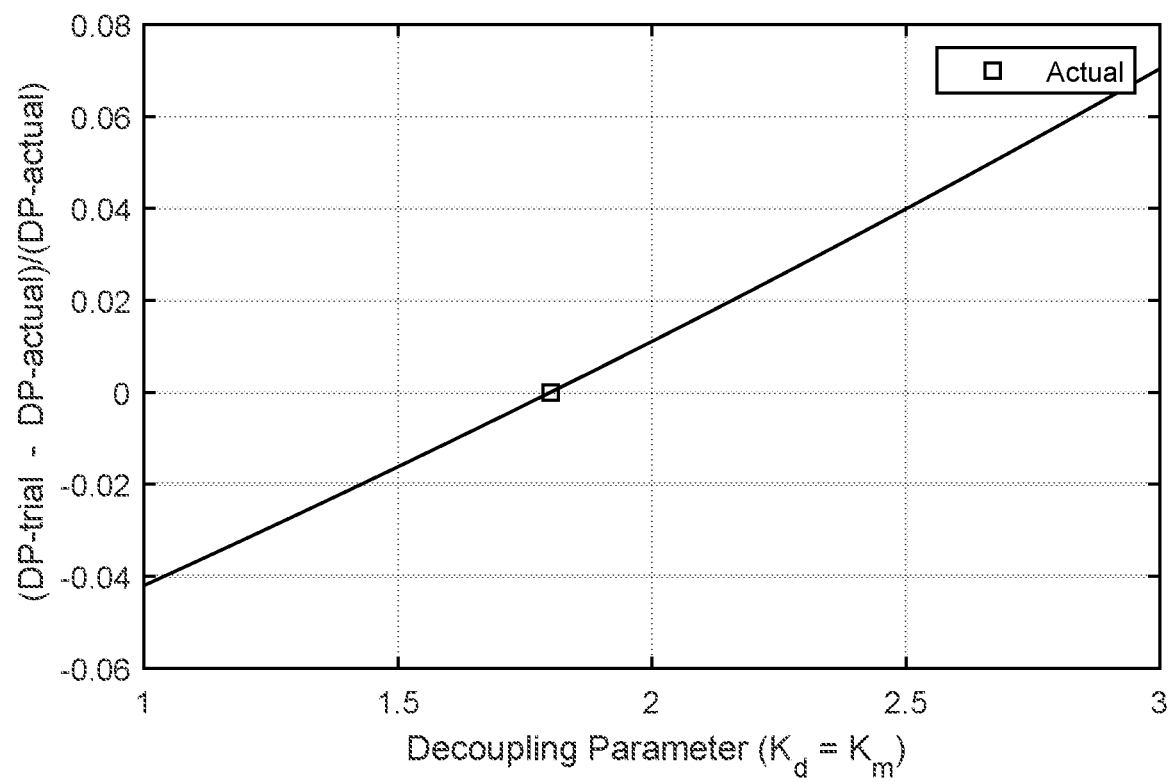
FIG. 37 is a graphical representation of the decoupling parameter of a speed of sound augmented Coriolis meter enhanced with a Venturi meter in accordance with the present disclosure.

FIG. 37 shows the trial simulated differential pressure minus the actual simulated pressure across a Venturi flow meter normalized by the actual simulated pressure as a function of a trial decoupling parameter where the density decoupling parameter $K_d$ and the mass flow decoupling parameter $K_m$ are assumed to be equal and the compressibility parameters $G_d$ and $G_m$ are assumed to be known. As shown in FIG. 25, a comparison of the predicted and actual differential pressure, divided by the actual pressure difference, across a Venturi flow meter can provide an effective means to determine the decoupling parameters, $K_d$ and $K_m$, of a speed of sound augmented Coriolis meter enhanced with differential flow meter device.

Figure 38:
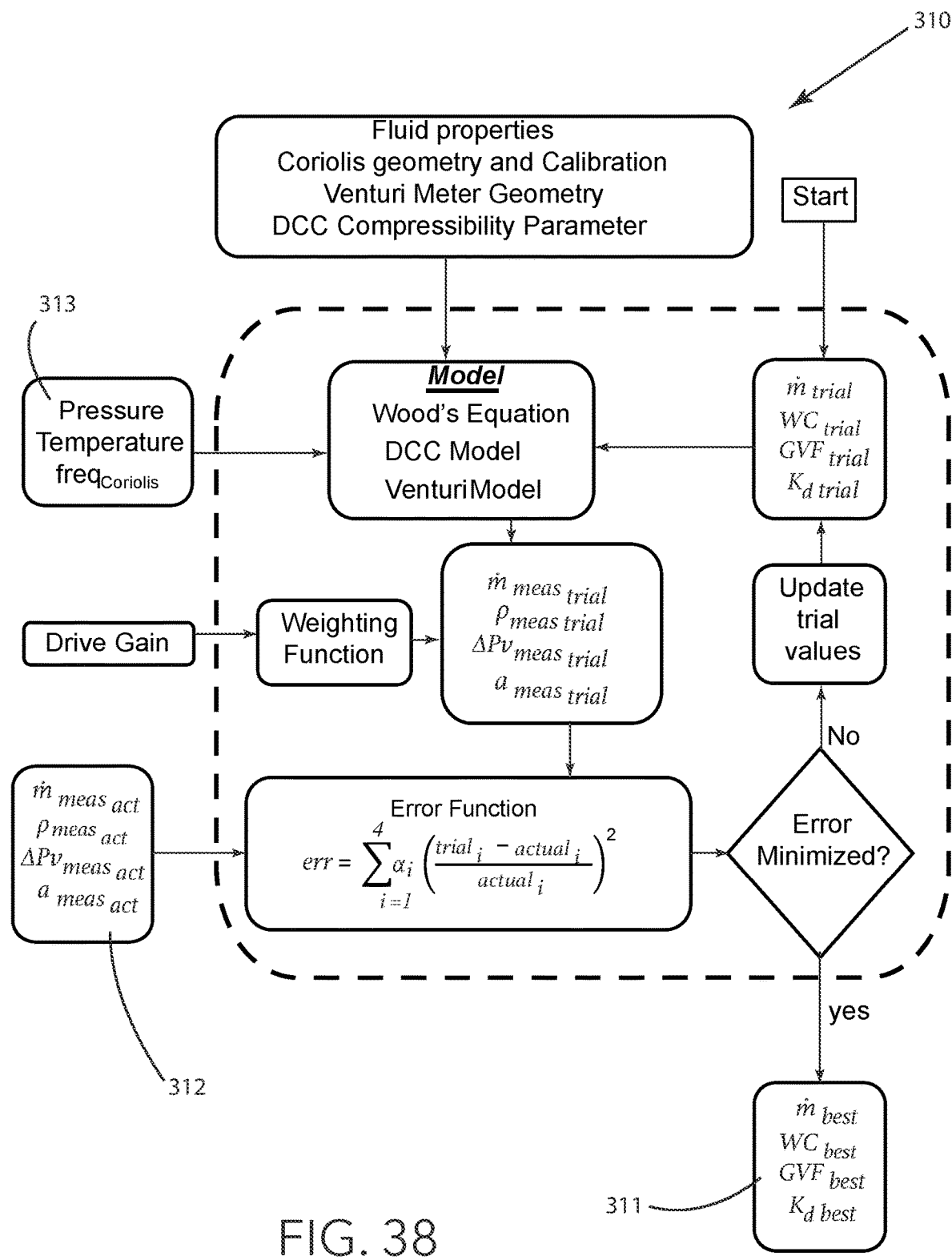
FIG. 38 is a schematic representation of an optimization process in accordance with the present disclosure.

FIG. 38 shows a schematic representation of an optimization procedure 310 to determine the mass flow, the watercut, and the gas void fraction, and decoupling parameter 311 of a bubbly, three phase mixture utilizing: 1) the mass flow reported by a Coriolis meter calibrated for a single-phase flow; 2) the density reported by a Coriolis meter calibrated for a single-phase flow; 3) a process fluid speed-of-sound measurement reported by a SONAR based flowmeter; and 4) a momentum-based differential flow measurement reported by a Venturi flowmeter as inputs 312. Optimization procedure 310 also uses the pressure and temperature and frequency of the Coriolis meter as inputs 313. The optimization procedure 310 is similar to the optimization procedure for which the decoupling parameters are assumed to be known, however in this approach, the decoupling parameters are unknown, but the mass flow and density decoupling parameters are assumed to be equal, or have a known relationship, and are solved-for in an optimization procedure that optimizes mass flow, water cut, gas void fraction, and the decoupling parameter.

Figure 39:
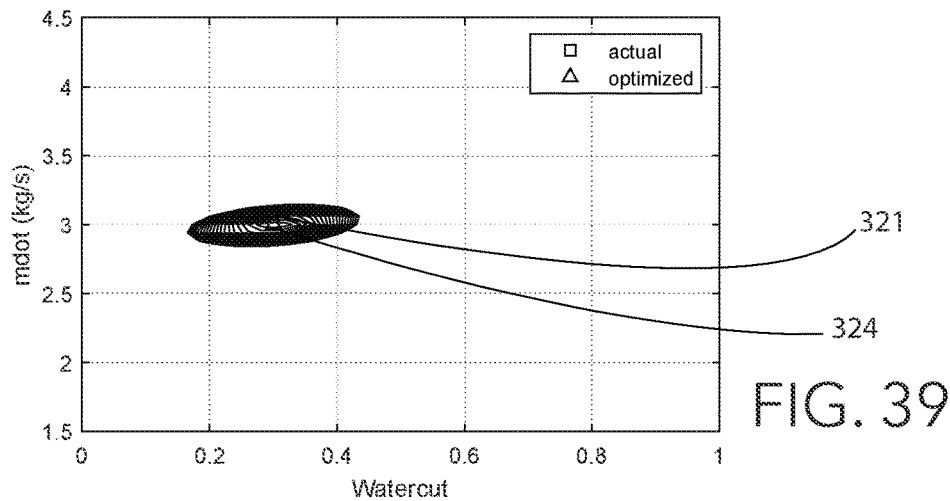
FIG. 39 is a graphical representation of an error function for an optimization to determine mass flow and watercut for a speed of sound augmented Coriolis meter enhanced with a momentum-based differential pressure measurement in accordance with the present disclosure.
Figure 40:
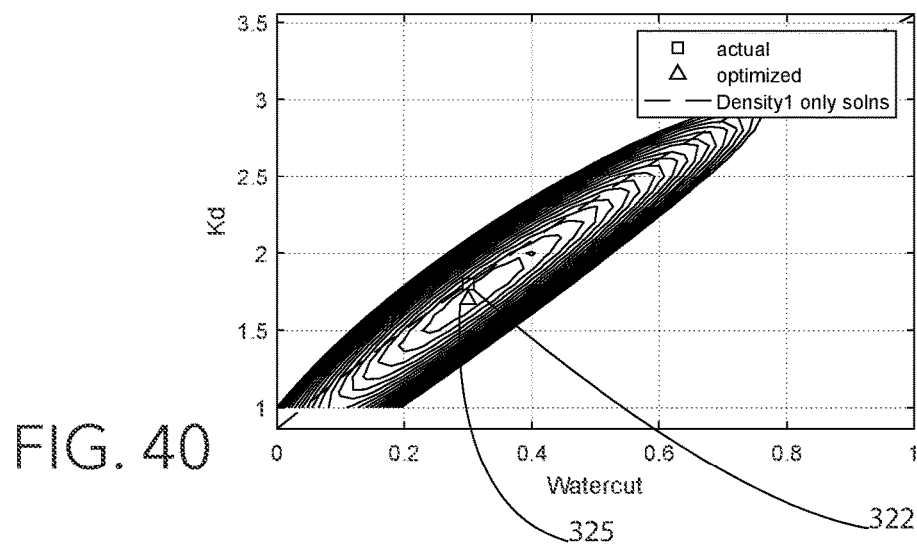
FIG. 40 is a graphical representation of an error function for an optimization to determine mass flow and gas void fraction for a speed of sound augmented Coriolis meter enhanced with a momentum-based differential pressure measurement in accordance with the present disclosure.
Figure 41:
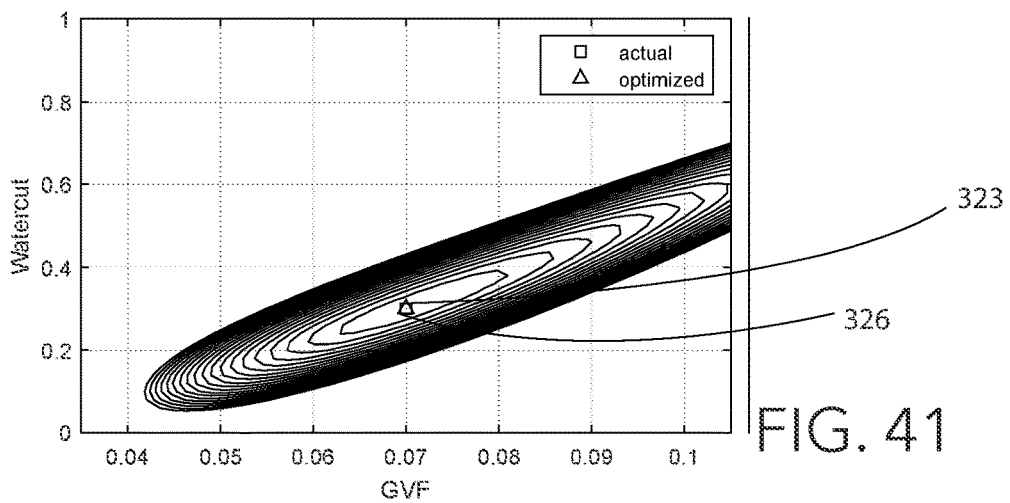
FIG. 41 is a graphical representation of an error function for an optimization to determine watercut and decoupling parameters for a speed of sound augmented Coriolis meter enhanced with a momentum-based differential pressure measurement in accordance with the present disclosure.

FIGS. 39-41 show three views of an error function for an optimization to determine mass flow, watercut, gas void fraction, and decoupling parameters for a speed of sound augmented Coriolis meter enhanced with a momentum-based differential pressure measurement with noise added to the data showing unique minimum values 321, 322, 323 close to the actual values 324, 325, 326 respectively. As shown, a speed of sound augmented Coriolis meter enhanced with differential flow meter device can uniquely determine the decoupling parameter for the Coriolis meter within optimization process, eliminating any need to pre-specify a specific decoupling parameter. It should be appreciated by those skilled in the art that identifying the decoupling parameter based on measurement from a single instance of time not only reduces the amount of calibration information required to accurately characterize bubbly fluids.

Inventively, identifying $K_d$, leads to identifying the Inverse Stokes Number, which, for known liquid properties and vibrational frequency, provides a determination of the bubble size, as shown in Equation 38. Bubble size measurement can be an important process control parameter that can indicate, among other things, product quality and/or operational characteristics of process equipment such as separators.

Figure 42:
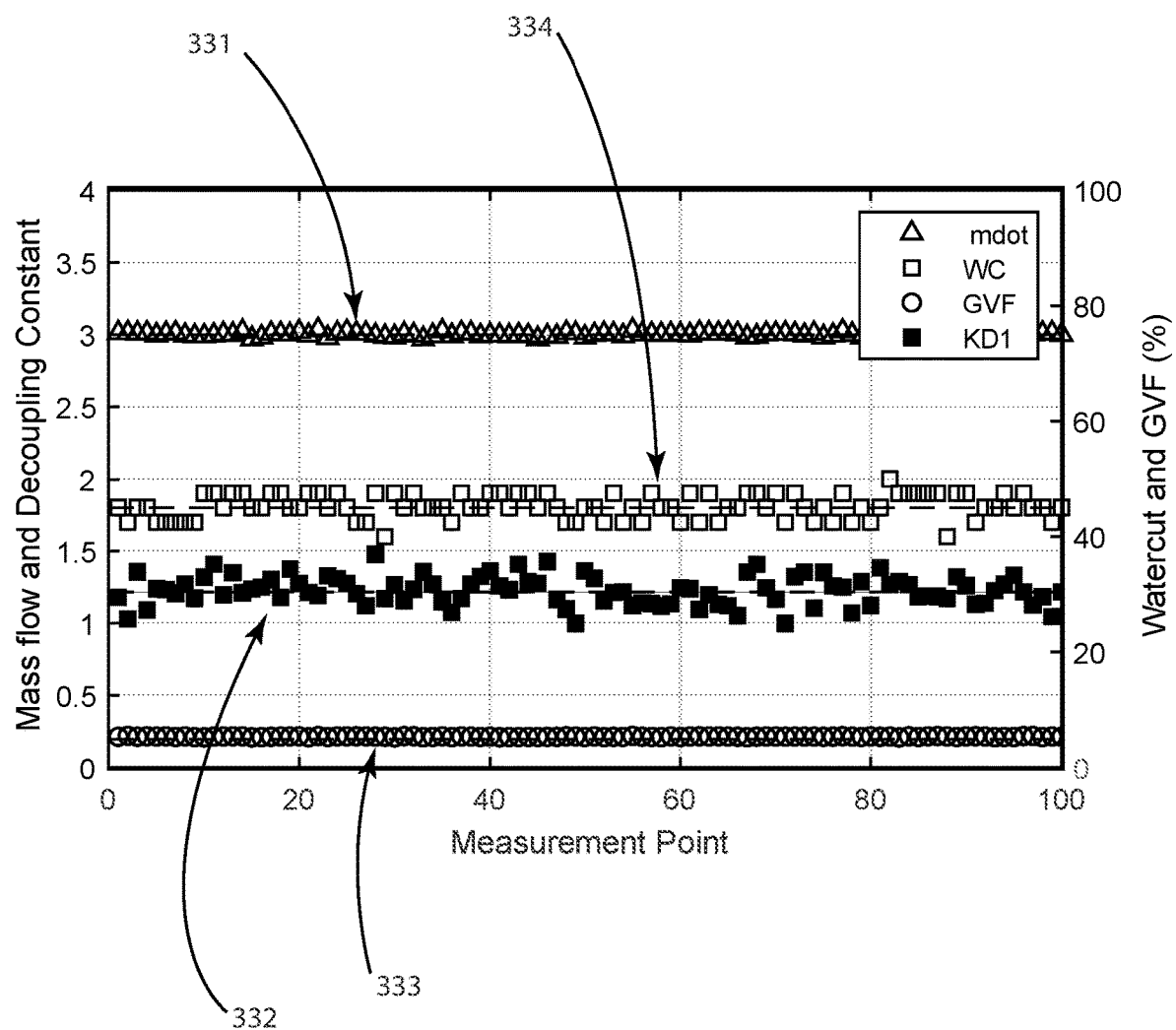
FIG. 42 is a graphical representation of optimized values for the mass flow, watercut, gas void fraction, and decoupling parameters in accordance with the present disclosure.

FIG. 42 shows the optimized values for the mass flow 331, watercut 332, gas void fraction 333, and decoupling parameters 334 based on optimizing an error function 263 (FIG. 30) based on differences in: 1) measured versus trial Coriolis Mass flow; 2) measured versus trial Coriolis density; 3) measured versus trial sound speed; and 4) the measured versus trial differential pressure across a Venturi. The optimized values shown represent 100 simulations in which the simulated measured values are based on constant input values for the mass flow, watercut, density, and decoupling parameters (shown with dashed lines on graph and partially obscured by the data points) with +/−1% bounded random noise added to each of the said simulated measured values.

Figure 43:
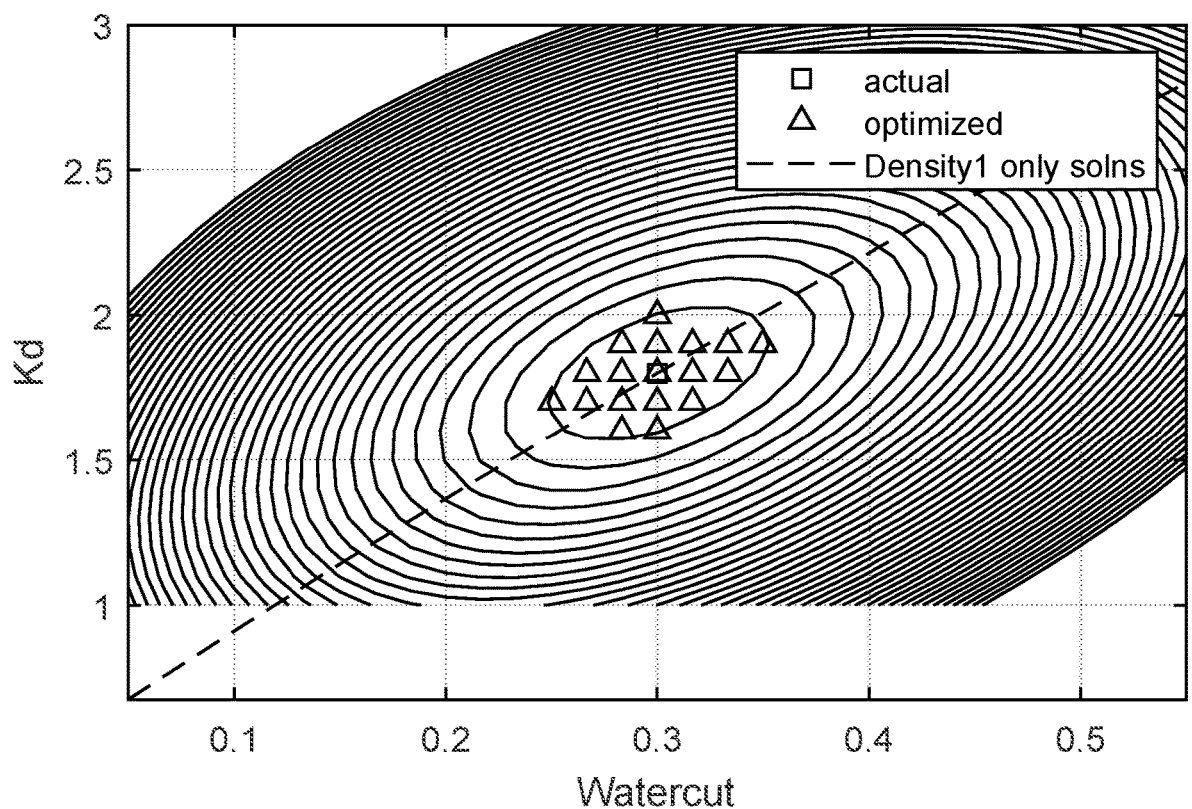

FIG. 43 is a graphical representation showing a cross section of a "zero noise" error function of optimization procedure 310 (FIG. 38) over a range of decoupling parameters $K_d$ versus watercut with the results of the optimization for the 100 points shown in FIG. 42 optimized based on: 1) the simulated measured mass flow; 2) the simulated measured Coriolis density; 3) the simulated measured speed of sound; and 4) the simulated versus measured Venturi meter as inputs.

As indicated by the results shown in FIG. 42 and FIG. 43, the additional parameter provided by a Venturi meter improved the ability of the speed of sound augmented Coriolis meter to accurately determine the three phase flow characteristics and the decoupling parameters compared to an optimization based on sound speed and density for which results are shown in FIGS. 25 and 26, and an optimization based on sound speed, density, and mass flow, for which results are shown in FIGS. 27 and 28.

It should be noted that adding a momentum-based flow meter to a speed of sound augmented Coriolis can significantly improve the ability to measure the characteristics of a process fluid flow. Referring to Table 2 below, it shows a comparison of the standard deviation of three approaches, the first being a speed of sound augmented Coriolis meter only reporting density of the process fluid. The second being a speed of sound augmented Coriolis meter reporting density and mass flow of the process fluid. The third being a speed of sound augmented Coriolis meter reporting density and mass flow of the process fluid enhanced with a Venturi meter reporting momentum based differential pressure measurement. It is shown that there is a significant improvement in the ability to accurately determine mass flow, watercut, and the decoupling parameter with the inclusion of a differential pressure based flow meter in the optimization process.

TABLE 2

| Measured Vs Trial parameters used in optimization | Standard Deviation | | | |
|---|---|---|---|---|
| | Mass Flow (%) | Water Cut (%) | Gas Void Fraction | Decoupling Parameter |
| Density, SOS | 1.3% | 5% | 0.0% | 0.25 |
| Mass Flow, Density, SOS | 1.7% | 7% | 0.0% | 0.31 |
| Mass Flow, Density, SOS, Venturi | 0.3% | 3% | 0.1% | 0.09 |

Dual Frequency Speed of Sound Augmented Coriolis Meter

It is known that flow information can be discerned from the vibration of one or more vibratory modes of a Coriolis flow tubes. Measuring the vibratory frequency of more than one mode of a fluid conveying flow tube has been utilized improve the interpretation of Coriolis operating in multiphase flows Zhu [11]. Interpreting a second vibratory mode is accomplished with essentially the same flow tube and other instrumentation with similar electronics as those utilized to drive and interpret measured parameters from a single vibratory mode. As such, developing a method to utilize information from the first measured parameter (first vibratory mode) with information from additional measured parameters (i.e. additional vibratory modes) can have advantage over other methods. For example, adding a second vibratory frequency can be achieved without an increase of the pressure drop across the Coriolis meter, such as that incurred with a differential pressure (DP) device, and without adding any additional hardware to a Coriolis flow tube, such as strain-based pressure sensors to measure a speed of sound.

Models developed herein for the effect of decoupling and compressibility on the relationship between the measured density, based on interpreting the resonate frequency, and the liquid density of a bubbly mixture can be expressed for each vibrational mode of a Coriolis meter capable of measuring the frequency of two vibratory modes, in which the frequency of each mode is calibrated in terms of the density of homogeneous fluid operating a low, or known, reduced frequency as follows:

$$\frac{\rho_{meas_1}}{\rho_{liq}} = 1 - K_d(\delta_{f=f_1})\alpha + G_{d_1}(f_{red_1})^2 \qquad \text{(Equation 45)}$$

for the first mode of vibration and $$\frac{\rho_{meas_2}}{\rho_{liq}} = 1 - K_d(\delta_{f=f_2})\alpha + G_{d_2}(f_{red_2})^2 \qquad \text{(Equation 46)}$$

for the second mode of vibration.

In one embodiment, the two modes of vibration are associated with the same flow tubes, or pair of flow tubes, each vibrational mode involves the same process fluid. Thus, the gas void fraction, process fluid sound speed, and liquid density are the same for each measured vibrational mode. As disclosed herein before, the decoupling parameter is assumed to be a function of the inverse Stokes parameter. As part of the present disclosure, and without loss of generality, it is also assumed that the density compressibility constants are known and are equal to $G_{d_1}=G_{d_2}=\frac{1}{4}$, noting that the compressibility parameters of a Coriolis meter can be determined independently of any real time operation on multiphase flows, for example, in a laboratory test specifically designed to characterize the effects of compressibility on a specific Coriolis meter or a specific Coriolis flow tube design As indicated by in FIG. 1 and FIG. 18, in general, the decoupling characteristics of bubbly fluid within a vibrating tube are a function of several parameters, include the vibrational frequency. However, for a fluid conveying tube vibrating at two frequencies, the fluid properties and bubble size parameters are the same for each vibrational frequency, and the ratio of the inverse Stokes numbers at the two vibrational frequencies can be related as follows.

$$\delta_1 = \sqrt{\frac{2v_f}{2\pi f_1 R_{bubble}^2}} \quad \text{for frequency 1; and} \qquad \text{(Equation 47)}$$

$$\delta_2 = \sqrt{\frac{2v_f}{2\pi f_2 R_{bubble}^2}} \quad \text{for frequency 2.} \qquad \text{(Equation 48)}$$

Thus, the relationship between the ratio of the inverse Stokes numbers and the ratio of the two frequencies is given as follows:

$$\frac{\delta_2}{\delta_1} = \sqrt{\frac{f_1}{f_2}} \qquad \text{(Equation 49)}$$

Assuming the decoupling parameter for each frequency is governed by the same functional relationship with the inverse Stokes number, density decoupling parameter at the two vibrational modes can be expressed as follows.

$$K_{d_1} = F(\delta) = 1 + 2e^{-\alpha\delta_1} = 1 + 2e^{-\alpha\sqrt{\frac{2v_f}{2\pi f_1 R_{bubble}^2}}} \quad \text{(Equation 50)}$$

for the first frequency; and $$K_{d_2} = F(\delta) = 1 + 2e^{-\alpha\delta_2} = 1 + 2e^{-\alpha\sqrt{\frac{2v_f}{2\pi f_2 R_{bubble}^2}}} \quad \text{(Equation 51)}$$

for the second frequency.

Figure 44:
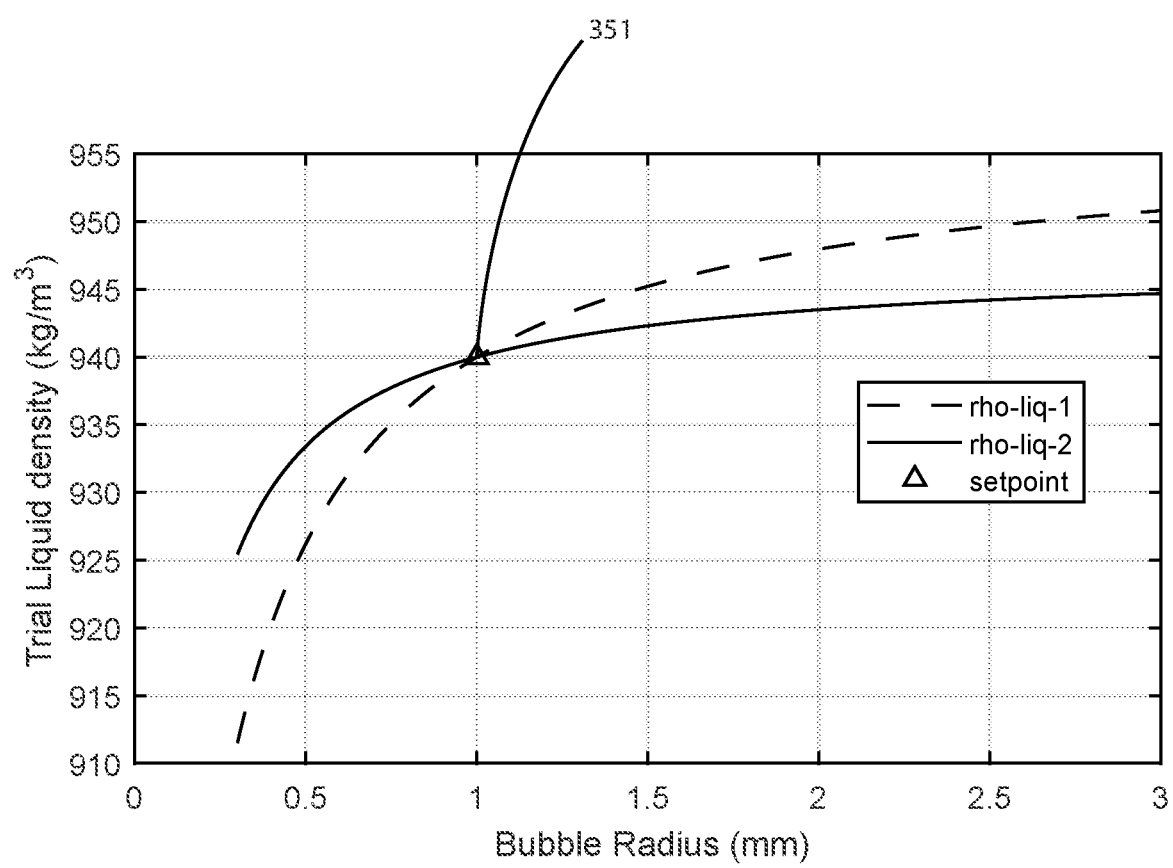
FIG. 44 is a graphical representation of a bubble size parameter for a dual frequency Coriolis meter in accordance with the present disclosure.

An advantage of utilizing a speed of sound augmented, dual frequency Coriolis meter to simultaneously characterize parameters of a multiphase flow and the decoupling characteristics is illustrated in FIG. 44. FIG. 44 shows an example of liquid density interpreted at two frequencies for a simulation representative of a dual frequency Coriolis meter operating in an environment having a process fluid comprising a bubbly liquid with relatively high decoupling with parameters. The parameters used to generate FIG. 44 are as follows: first mode vibrational frequency=200 Hz, second mode vibration frequency=1200 Hz, liquid density=940 kg/m^3, gas void fraction=0.05, mixture density=894 kg/m^3, speed of sound of mixture=205 m/sec, liquid viscosity=0.001 Pa-sec, a bubble size parameter of $R_{bubble}$=1 mm, $K_{d_1}$=2.696, and $K_{d_2}$=2.87, with a measured density of 813 kg/m^3 for mode 1, and a measured density of 810 kg/m^3 for mode 2. In FIG. 44, the bubble size parameter is varied over a range of bubble size parameters and the interpreted liquid density, based on the constant simulated "measured" densities at each of the two frequencies of the dual frequency Coriolis meter, is shown as a function of trial bubble size parameter. In this example, the interpreted liquid density associated with each of the two frequencies matches at a single value 351 of the bubble size parameter, and single value of the liquid density. The set point liquid density and bubble size parameter used to generate the simulated measurement is indicated on the plot at a single value 351, coinciding with the intersection of the two trial estimates of the liquid density based on the interpretation of the two measured densities from the dual frequency Coriolis meter.

Figure 45:
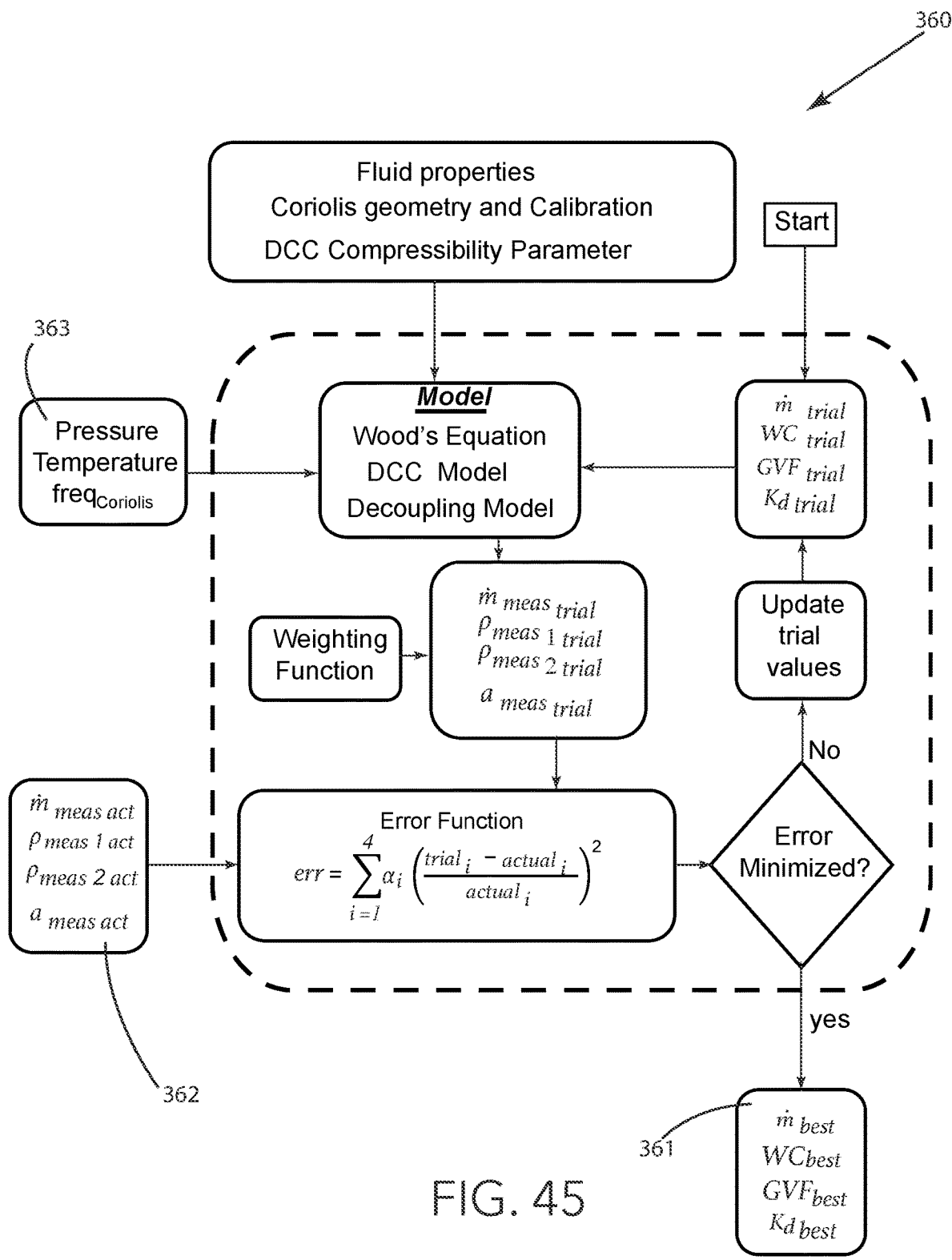
FIG. 45 is a schematic representation of an optimization process in accordance with the present disclosure.

Referring now to FIG. 45, the figure shows a schematic representation of an optimization procedure 360 to determine the mass flow, the watercut, and the gas void fraction 611 of a bubbly, three phase mixture utilizing: 1) the mass flow reported by a dual frequency Coriolis meter calibrated for a single-phase flow; 2) the density reported by a first frequency of a dual frequency Coriolis meter calibrated for a single-phase flow; 3) the density reported by a second frequency of a dual frequency Coriolis meter calibrated for a single-phase flow; and 4) a process fluid speed-of-sound measurement; as inputs 362. Optimization procedure 360 also uses the pressure and temperature of the process fluid and both frequencies of the dual frequency Coriolis meter as inputs 363. The density decoupling parameters associated with the two frequencies are assumed to be related as described in Equations 43-45. The optimization procedure 360 is similar to the optimization procedure for which the mass flow and density decoupling parameters are assumed to be known, however in this approach, the mass flow decoupling parameter and the density decoupling parameters at a first frequency are assumed to unknown, but equal, or have a known relationship, and are solved-for in an optimization procedure that optimizes mass flow, water cut, gas void fraction, and the decoupling parameter. Note, Kd in FIG. 45 refers to the density decoupling parameter associated with the first vibratory mode of the dual frequency Coriolis meter.

Figure 46:
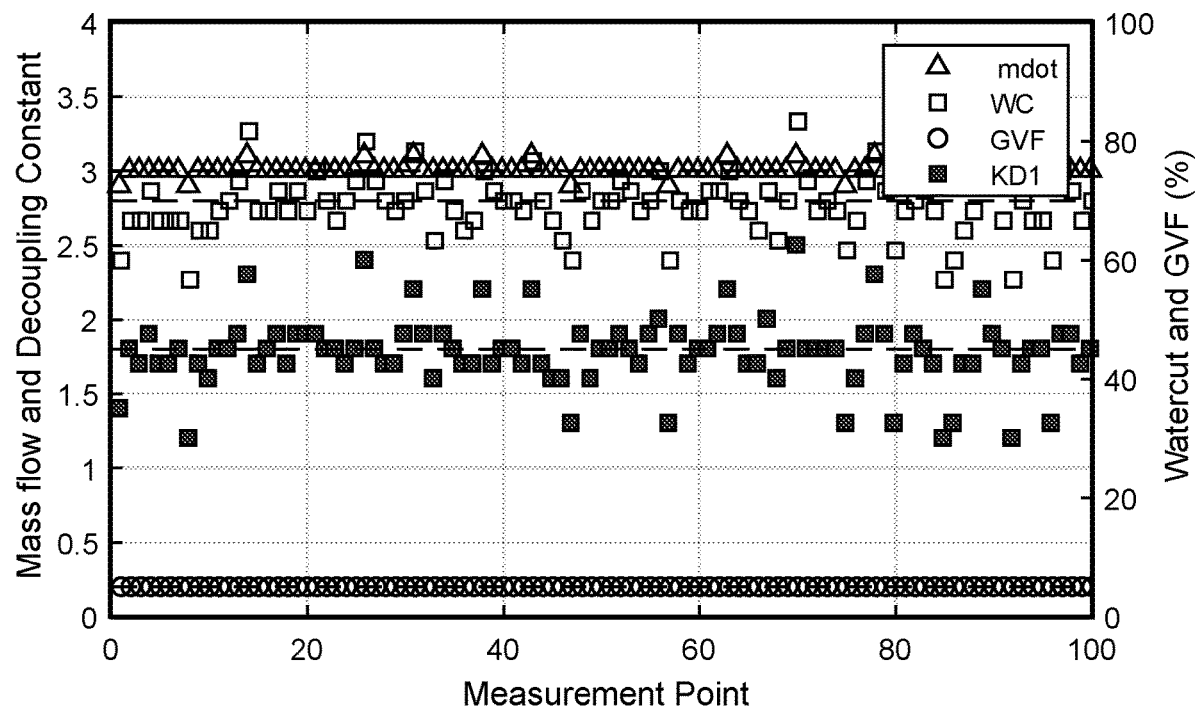
FIG. 46 is a graphical representation of optimized values for the mass flow, watercut, gas void fraction, and decoupling parameters in accordance with the present disclosure.

Referring to FIG. 46, it shows the results of a simulation to assess a relative effectiveness of this approach. For the simulation, simulated measured values were used for: 1) the measured density at a first frequency; 2) the measured density at a second frequency; 3) the measured speed of sound of the process fluid; and 4) the measured mass flow. The simulated measured values were calculated utilizing a model for the effects of decoupling and compressibility on Coriolis meters and Wood's Equation. Values for these simulated measured parameters were then compared to trial values calculated using said models to define an error function. The error function was then minimized over a range of process fluid mass flow, water cut, gas void fraction, and decoupling parameter using the methods that have been disclosed in more detail herein before. The optimization process was repeated for 100 instances, with random noise of up to +/−1% added to the simulated measured value for each instance. As shown, the dual frequency speed of sound augmented Coriolis meter is capable of determining the mass flow, watercut, gas void fraction, and decoupling parameter of a multiphase flow based on the optimization algorithm described.

Figure 47:
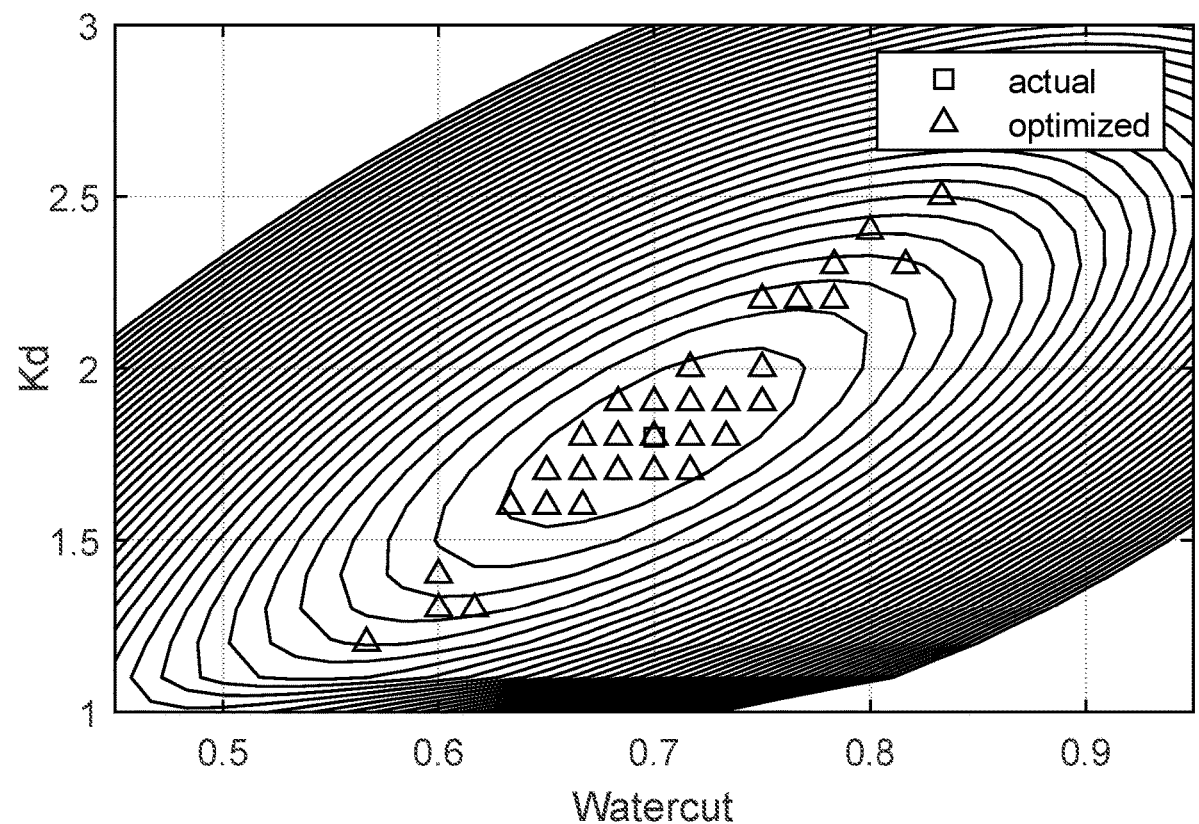
FIG. 47 is a graphical representation of an error plot for a simulation in accordance with the present disclosure.

FIG. 47 shows the same simulated results at FIG. 46, with the optimized values for a first frequency decoupling parameter and watercut plotted on error contours generated using values for the measured parameters without noise for an optimization based on 1) a Coriolis density measurements at a first frequencies, 2) a Coriolis density measurement at a second frequency, 3) a process fluid sound speed, and 4) a Coriolis mass flow measurement at a first frequency for 100 cases. A 1% max amplitude random noise was applied to each of the four measured parameters. It should be appreciated by those skilled in the art that the weighting terms in the error functions can be adjusted improve the results of the optimization to reflect, for example, comparatively higher weighting on comparisons of measured and modelled parameters with higher confidence. It should be further appreciated that the mass flow measured from a dual frequency, speed of sound augmented Coriolis meter at each of the two frequencies could also be used within an error function optimization to provide a means for determining flow parameters. As shown, the optimized solution with noise fall within the low error regions of the first frequency decoupling parameter versus watercut error contours, showing that the approach is sensitive to noise, and indicating that, in some situations, a system that is less sensitive to noise may be desirable.

Figure 48:
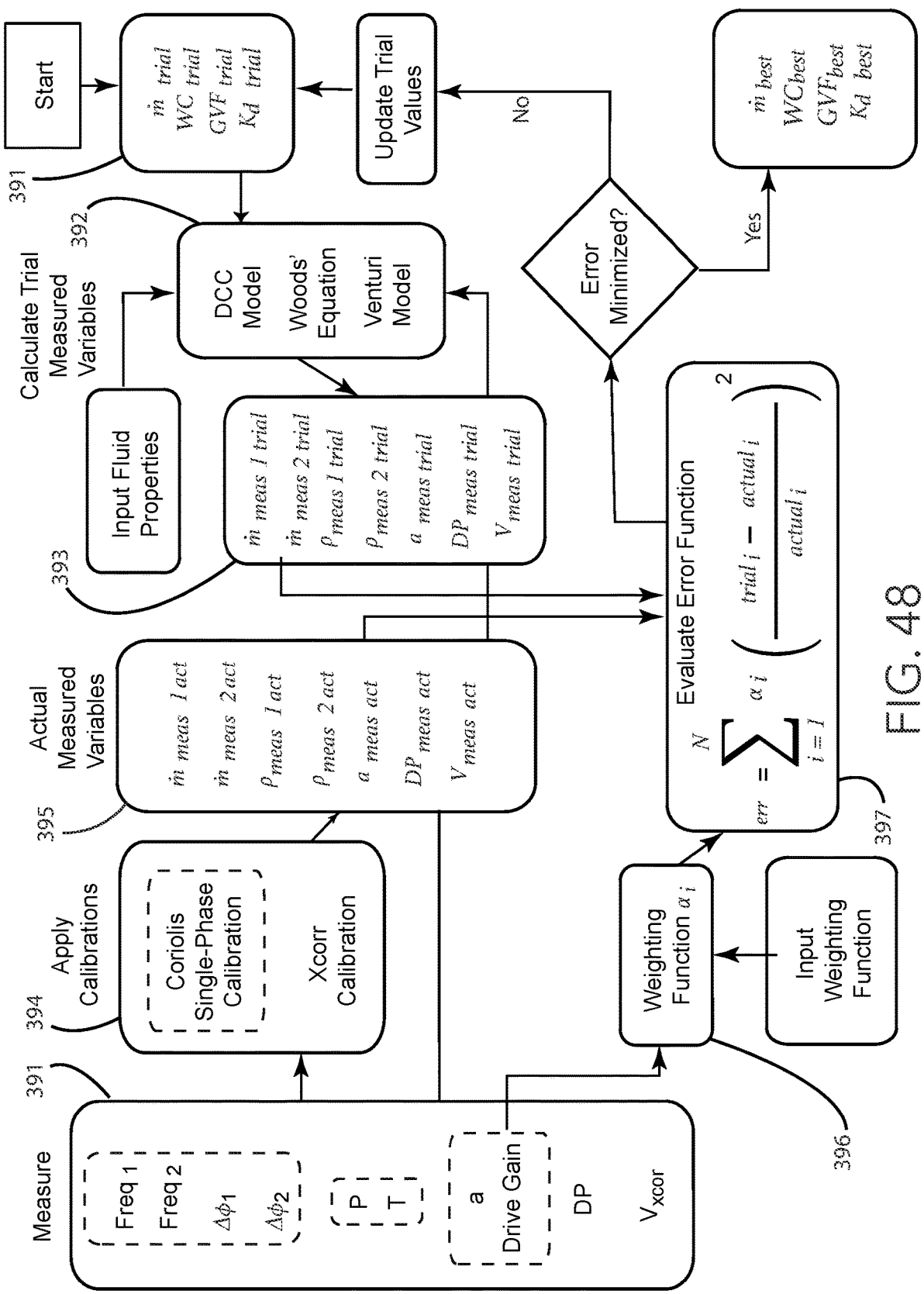
FIG. 48 is a schematic representation of an in-situ decoupling method to simultaneously determine multiphase flow characteristic and decoupling characteristics of a speed of sound augmented Coriolis meter in accordance with the present disclosure.

Generalized Multiparameter Augmented Coriolis Meter with Decoupling Characterization FIG. 48 shows a schematic diagram of a robust and novel real time method 390 to simultaneously determine multiphase flow characteristic and decoupling characteristics of a speed of sound augmented Coriolis meter utilizing analytical models for the effect of decoupling and compressibility on augmented Coriolis meter being informed by a range of measurements 391. In addition to a temperature and pressure of the process fluid, the measured parameters include one of more of the following: 1) a Coriolis mass flow at a first frequency; 2) a Coriolis mass flow at a second frequency; 3)

a Coriolis density at the first frequency; 4) a Coriolis density at the second frequency; 5) a process fluid sound speed; 6) a differential pressure from a momentum based differential pressure measurement; and 7) a process fluid velocity from a cross correlation meter.

Real time method 390 starts with inputting trial values for mass flow, watercut, gas void fraction and density decoupling parameter (at a first frequency) 391 into appropriate analytical models 392 along with the temperature and pressure of the process fluid (if available) and known fluid properties to calculate a set of trial measured variables 393. Depending on which of the range of measured parameters 395 that is available, some of the measurements would be calibrated at step 394 to output the calibrated actual measured parameters at step 395. Drive gain(s) from the Coriolis meter can be used to determine weighting function 396. Other weighting factors can be applied by a user as described herein above. The actual measured parameters and the trial measured parameters are utilized as input to the weighted error function 397 and an algorithm is executed to minimize the to determine the multiphase flow characteristic and decoupling characteristics of a Coriolis meter. If the error function is below a predetermine value the values for mass flow, watercut, gas void fraction and density decoupling parameter are output to the user at step 398. If the error is not sufficiently minimized, the trial values are updated at step 399 and the method is repeated.

Dual Frequency Coriolis Meter Augmented with a Decoupling and Compressibility Model It has been discovered that the models disclosed herein above can be utilized to interpret the parameters measured by a prior art dual frequency Coriolis meter (i.e. density reported at the two frequencies as interpreted by a calibration developed for essentially homogeneous and incompressible single phase flows) in terms of the physical characteristics (i.e. the mass flow, the density, the gas void fraction, and, bubble size through its relationship with a decoupling parameter) of a bubbly process fluid being conveyed through the flow tubes of the dual frequency Coriolis meter without the addition of other measurements such as a sound speed meter. In this particular embodiment, and in terms of that disclosed herein above, the first measure parameter is a measured Coriolis density reported at a first frequency and the additional parameter is a measured Coriolis density reported at a second frequency.

An embodiment of the disclosure utilizes the models disclosed herein to calculate trial measured parameters (i.e. a trial measured density at a first frequency, and a trial measured density at a second frequency) for use in an optimization process that minimizes the difference between trial and measured values. Trial measured densities at a first frequency and at a second frequency can be calculated based of a trial liquid density, a trial decoupling parameter, a trial measured frequency, and a trial measured sound speed as follows:

$$\rho_{meas1_{trial}} = \rho_{liq_{trial}}\left(1 - K_{d1_{trial}}\alpha + G_{d_1}\left(\frac{2\pi f_{1_{trial}}\frac{D}{2}}{a_{mix_{trial}}}\right)^2\right) \quad \text{(Equation 52)}$$

$$\rho_{meas2_{trial}} = \rho_{liq_{trial}}\left(1 - K_{d2_{trial}}\alpha + G_{d_1}\left(\frac{2\pi f_{2_{trial}}\frac{D}{2}}{a_{mix_{trial}}}\right)^2\right) \quad \text{(Equation 53)}$$

An error function at instance in time, "i", can be defined as the sum of the squares of the difference in trial measured density and the actual measured density, normalized by the actual measured density, at each frequency as follows:

$$\text{Error}_i = \alpha_1\left(\frac{\rho_{meas1_i} - \rho_{actual1_i}}{\rho_{actual1_i}}\right)^2 + \alpha_2\left(\frac{\rho_{meas2_i} - \rho_{actual2_i}}{\rho_{actual2_i}}\right)^2 \quad \text{(Equation 54)}$$

For each instance in which the measured density at each frequency is available, the error function above can be minimized over a range of allowable values for watercut, gas void fraction and decoupling parameter. In accordance with the present disclosure, the process involves calculating trial measured parameters (i.e. density at the two frequencies $\rho_{meas1_{trial}}$, $\rho_{meas2_{trial}}$) as a function of trial physical characteristics of the bubbly fluid (i.e. watercut, gas void fraction and, if unknown, a decoupling parameter). In Equations 52, 53 the decoupling parameters can be viewed as a proxy for the inverse Stokes number, a non-dimensional parameter calculated based on physical characteristics of the bubbly mixture as will be described in more detail herein after. The process further involves comparing these trial measured parameters to the two actual measured parameters using, for example, the error function of Equation 54 herein above. The trial physical characteristics are adjusted to minimize the error function over a range of allowable physical characteristics to determine optimized values for each of the physical characteristics.

The density decoupling parameters $K_{d1_{trial}}$, $K_{d2_{trial}}$ can be defined as a function an inverse Stokes number, in which the frequency for a given mode of vibration is known, and the kinematic viscosity is either known or estimated. In most applications, the bubble size parameter is unknown. The relationship between the decoupling parameter, the fluid kinematic viscosity, the frequency of oscillation, and the bubble size parameter for the two frequencies can be expressed as follows:

$$K_{d_1} = F(\delta) = 1 + 2e^{-\alpha\delta_1} = 1 + 2e^{-\alpha\sqrt{\frac{2v_f}{2\pi f_1 R_{bubble}^2}}} \quad \text{(Equation 55)}$$

$$K_{d_2} = F(\delta) = 1 + 2e^{-\alpha\delta_2} = 1 + 2e^{-\alpha\sqrt{\frac{2v_f}{2\pi f_2 R_{bubble}^2}}} \quad \text{(Equation 56)}$$

Based on the relationships expressed in Equations 55, 56, the decoupling parameter can be viewed as a proxy for the inverse Stokes number, a non-dimensional parameter calculated based on physical characteristics of a bubbly mixture in a vibrating tube, thus the decoupling parameter can be viewed as a proxy for a physical characteristic of a bubbly mixture within a vibrating tube.

Since the fluid parameters and bubble size are the same for the two modes of vibration, the ratio of the inverse Stokes numbers at the two frequencies is equal to the inverse of the square root of the two frequencies as set forth in Equation 49 herein above.

Using the low order parametric expression for the density decoupling parameter as a function of inverse Stokes number (Equation 55 and 56) results in the following relationship for $K_{d_2}$ in terms $K_{d_1}$ and the frequency ratio of the vibrational modes:

$$K_{d_2} = 2\left(\frac{K_{d_1} - 1}{2}\right)\sqrt{\frac{f_1}{f_2}} + 1 \quad \text{(Equation 57)}$$

Figure 49:
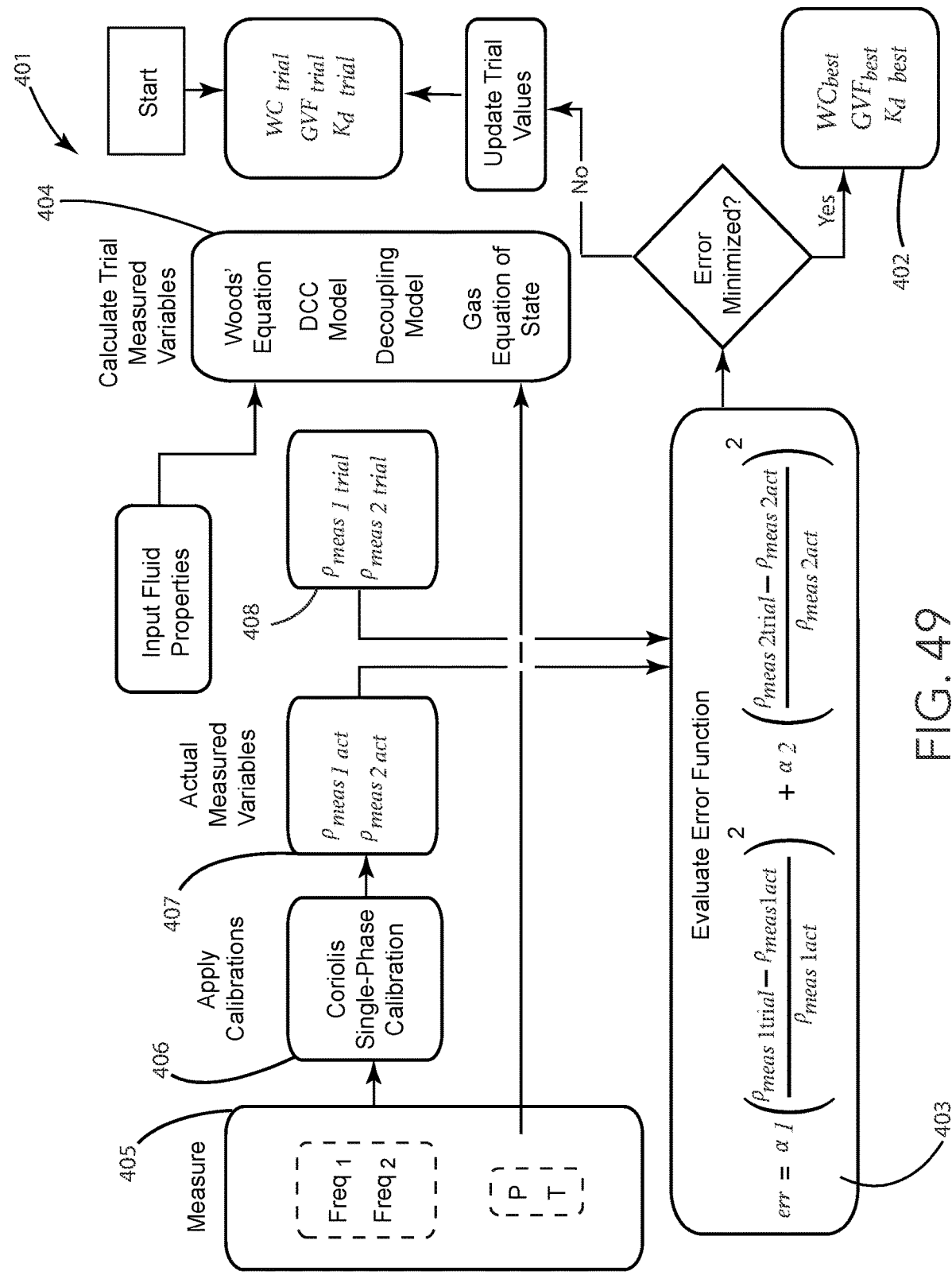
FIG. 49 is a schematic representation of an optimization process in accordance with the present disclosure.

Referring now to FIG. 49, there is shown a schematic of an optimization procedure 401 to determine watercut, gas void fraction, and the decoupling parameters as output 402 of a bubbly process fluid mixture utilizing, among other things, the relationships disclosed herein above with relation to Equations 52-57. The optimization characteristics of watercut, gas void fraction, and a decoupling parameter associated with one of two vibrational frequencies, are iteratively updated until the error function 403 is minimized. The optimization procedure 401 utilizes the density and sound speeds of the oil, water, and gas components, as input to various models at step 404, disclosed herein above such as Wood's Equation, a model for the effects of decoupling and compressibility on the density measurement of a Coriolis meter, gas equation of state and a model linking the decoupling parameter at one frequency to the decoupling parameter at another frequency for the same fluid associated with the vibration of two modes of the same fluid-conveying flow tube. Optimization procedure 401 utilizes the measured parameters of the vibrational frequencies at two modes, and the temperature and pressure of the process fluid 405. Normal calibrations appropriate for single phase fluids with negligible or low reduced frequencies 406 are applied to the measured vibrational frequencies to determine the actual measured densities at the two frequencies and these are used as input into error function 403. Note, in cases where the reduced frequency of a single phase fluids used for calibration is not negligible, the effect of compressibility can be removed using methods known to those skilled in the art. Such functions as those disclosed with respect to FIG. 49 and Equations 52-57 can be performed using software and hardware residing in a processor or processors of a dual frequency Coriolis meter. Embodiments also include prior art dual frequency Coriolis meters that are retrofitted to include the methods disclosed herein to correct the prior art meters for the decoupling effects of inhomogeneous process fluids including those have bubbly flow and particles.

Figure 50:
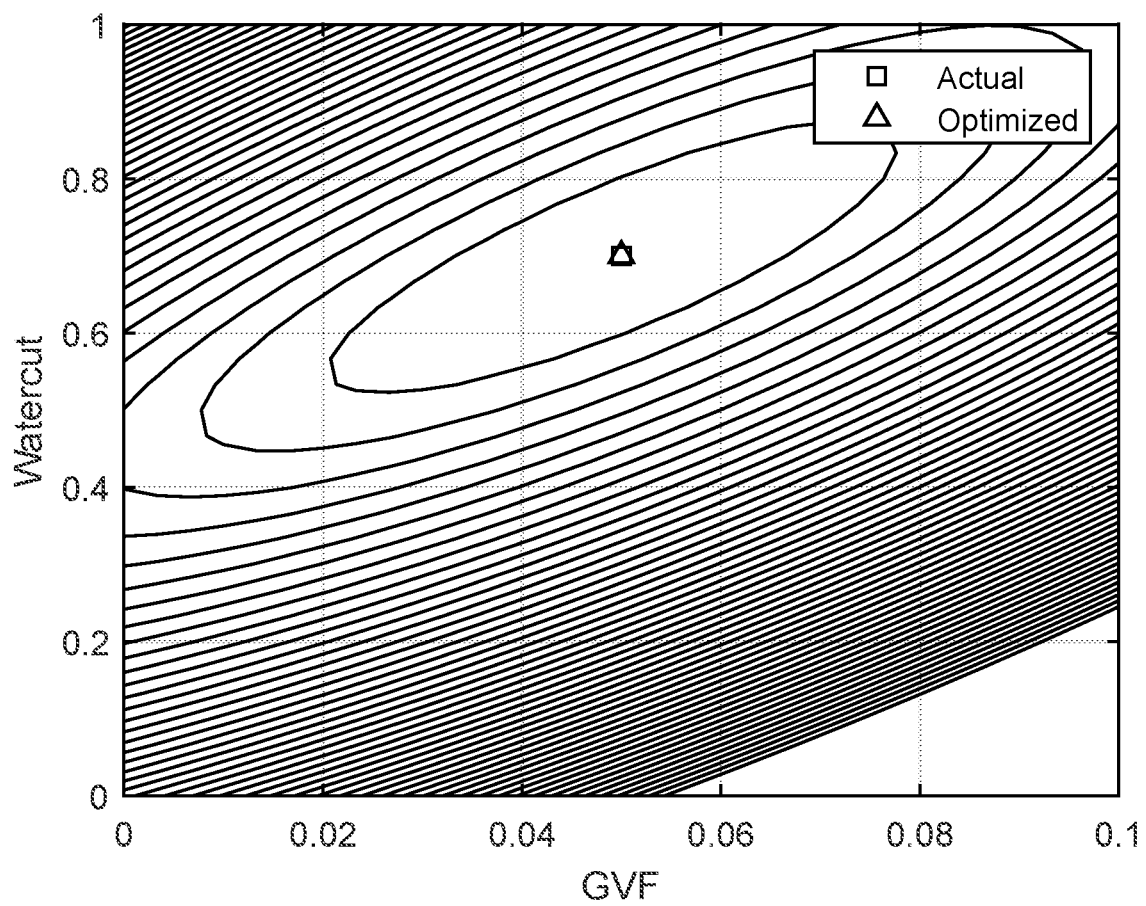
FIG. 50 is a graphical representation of an error plot for a simulation in accordance with the present disclosure.

Now referring to FIGS. 50 and 50 there are shown examples of error contours for a dual frequency Coriolis meter that is enhanced with the optimization procedure 401 of FIG. 49. The parameters of the simulation that were used with optimization procedure 401 are given in Table 3 with the gas void fraction set to 1%. No noise was applied to the optimization and the results of the optimization of the error function over watercut, gas void fraction, and first frequency decoupling parameter matched the input values for the watercut, gas void fraction, and decoupling parameter. This demonstrates that a dual frequency Coriolis meter can uniquely identify the watercut and gas void fraction and decoupling parameter based on measurements at one instance in time.

FIG. 50 shows the contours of the error function as a function of watercut and gas void fraction constructed utilizing the correct, optimized value for the first frequency decoupling parameter. As shown, utilizing that correct value for the decoupling, a dual frequency Coriolis meter can uniquely determine the watercut and gas void fraction of a mixture.

TABLE 3

| Parameter | Value | Units |
| --- | --- | --- |
| Mass Flow Rate | 3 | kg/sec |
| Watercut | 0.7 | |
| Gas Void Fraction | variable | |
| Oil Density | 800 | kg/m^3 |

TABLE 3-continued

| Parameter | Value | Units |
| --- | --- | --- |
| Water Density | 1000 | kg/m^3 |
| Gas Density | 11.1 | kg/m^3 |
| Water SoS | 1500 | m/s |
| Oil SoS | 1200 | m/s |
| MW Gas | 20 | kg/mole |
| polytropic index | 1.3 | |
| Water Viscosity | 0.001 | Pa-sec |
| Oil Viscosity | 0.002 | Pa-sec |
| Coriolis Freq 1 | 166 | Hz |
| Coriolis Freq 2 | 828 | Hz |
| Flow Tube Dia | 2 | inches |
| Kd1 (f = f1) | 1.8 | |
| Kd2 (f = f2) | 2.33 | |

Figure 51:
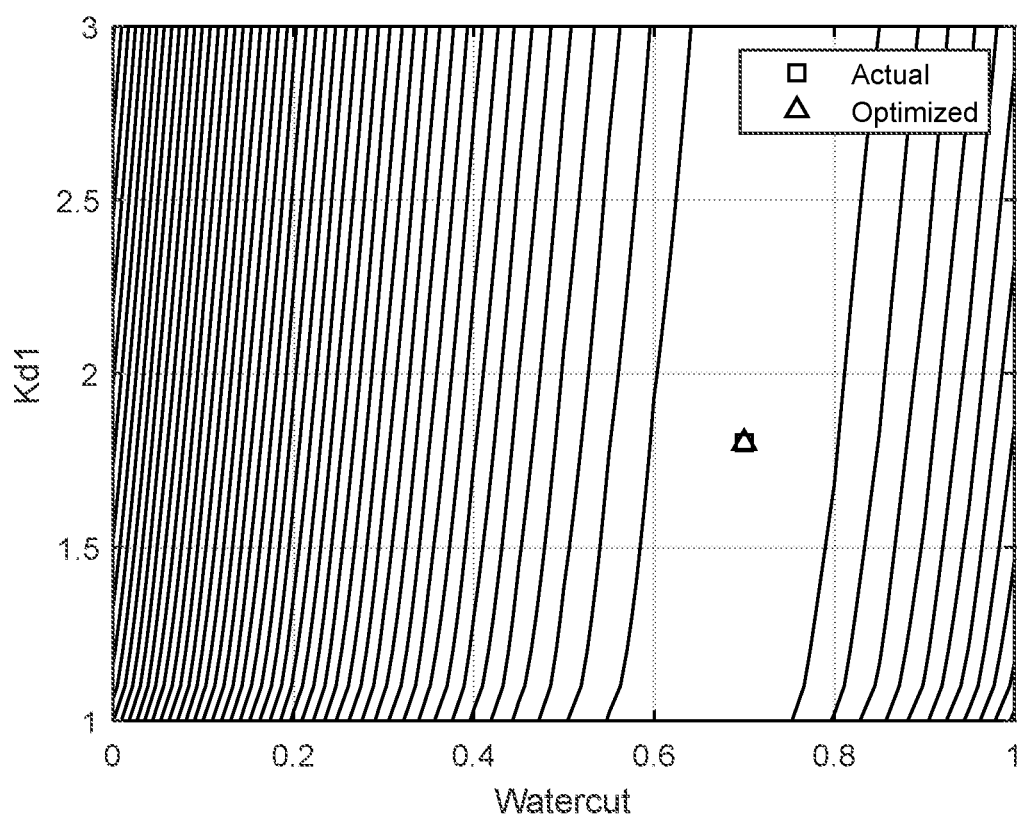
FIG. 51 is a graphical representation of an error function for a three-phase flow simulation of a dual frequency Coriolis meter enhanced with a decoupling model in accordance with the present disclosure.
Figure 52:
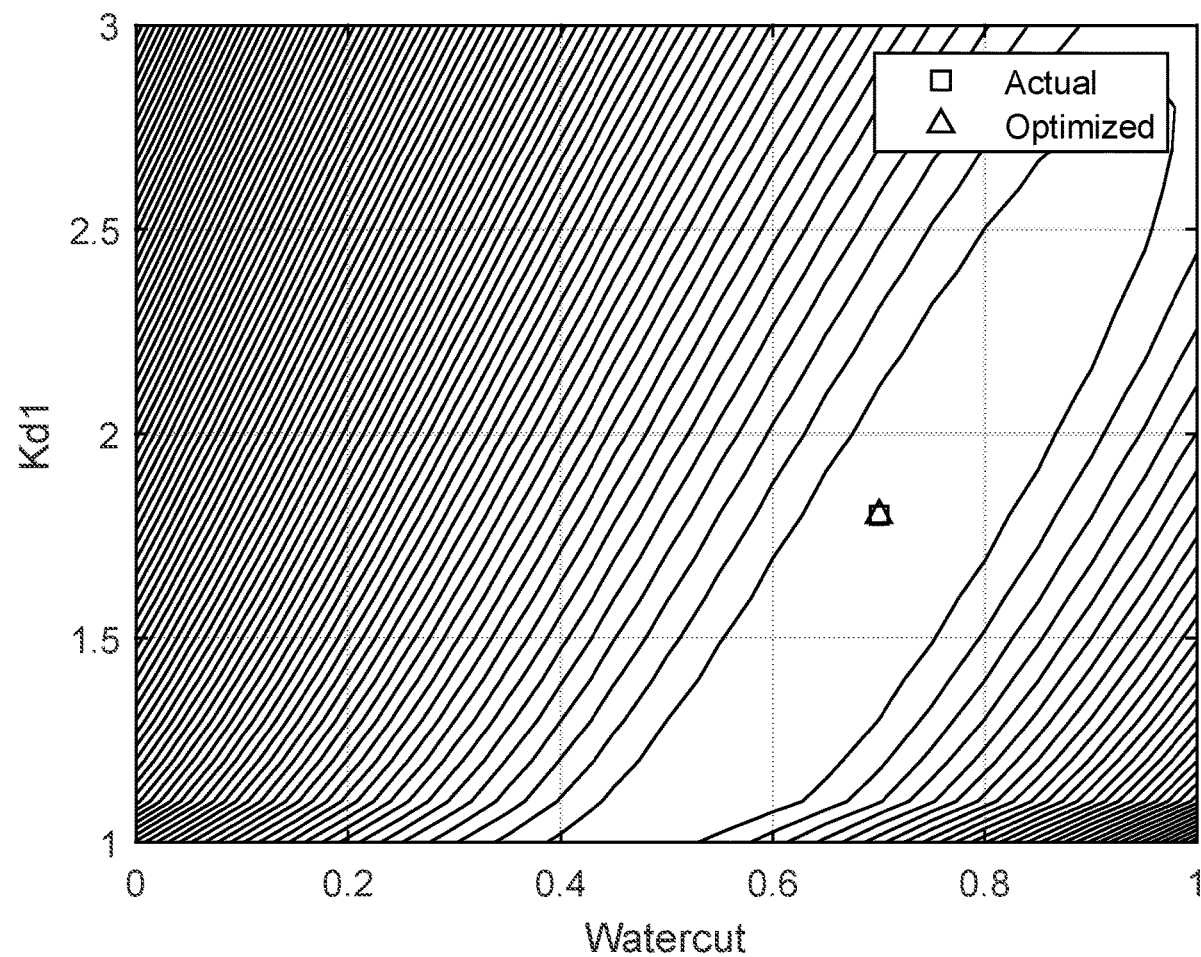
FIG. 52 is a graphical representation of an error function for a three-phase flow simulation of a dual frequency Coriolis meter enhanced with a decoupling model in accordance with the present disclosure.
Figure 53:
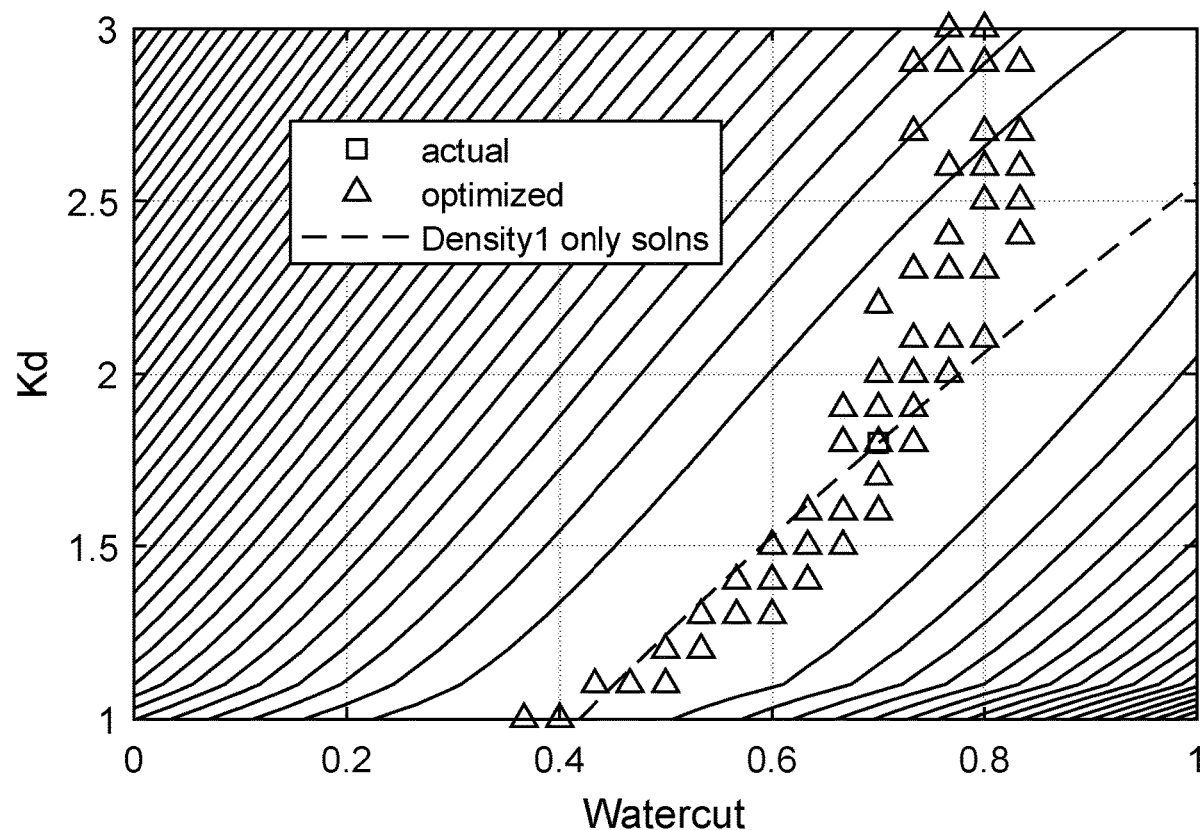
FIG. 53 is a graphical representation of an error function for a three-phase flow simulation of a dual frequency Coriolis meter enhanced with a decoupling model in accordance with the present disclosure.

FIG. 51 shows the error function for the correct gas void fraction of 1% as a function a watercut and decoupling parameter. As shown, the optimization determines the correct values, but the error contours reveal a trough of almost equiprobable solutions. This trough of almost equiprobable solutions indicates that this method would be susceptible to noise and/or modeling errors, FIG. 52 shows error contours for a similar simulation for which the input gas void fraction was 5%. As shown, there is similar trough like structure, indicating that this approach would be susceptible to noise at this gas void fraction as well. FIG. 53 shows contours of the error function for a simulation of a dual frequency Coriolis meter for the same conditions as those used for FIG. 52 solving for flow parameters and $K_d$, with solutions for 100 simulations with 1% maximum amplitude random noise added to the simulated measured densities overlayed on the contour plot As shown, the optimized solutions exhibit significant error, with most of the optimized solutions for $K_d$ and watercut within the trough region of the error function.

It would be desirable to reduce the range of the almost-equiprobable solutions to determine a more accurate representation of the decoupling parameter and other characteristics of a multiphase flow.

One embodiment of the present disclosure improves the ability to characterize the decoupling parameter. Such an embodiment utilizes a dual frequency Coriolis meter operating on a fluid with essentially constant liquid density, but varying gas void fraction, to determine a characteristic of the fluid and to characterize the decoupling parameter. For N instances with varying gas void fraction, but sufficiently constant liquid properties and sufficiently constant decoupling parameters, the liquid density, decoupling parameter, and gas void fractions for each instance in time can be determined by minimizing the following expression:

$$f(K_{d_1}, wc, \alpha_{i=1:N}) = err = \sum_{i=1}^{N}\left(\alpha_1\left(\frac{\rho_{meas1_i} - \rho_{actual1_i}}{\rho_{actual1_i}}\right)^2 + \alpha_2\left(\frac{\rho_{meas2_i} - \rho_{actual2_i}}{\rho_{actual2_i}}\right)^2\right)$$

(Equation 58)

Figure 54:
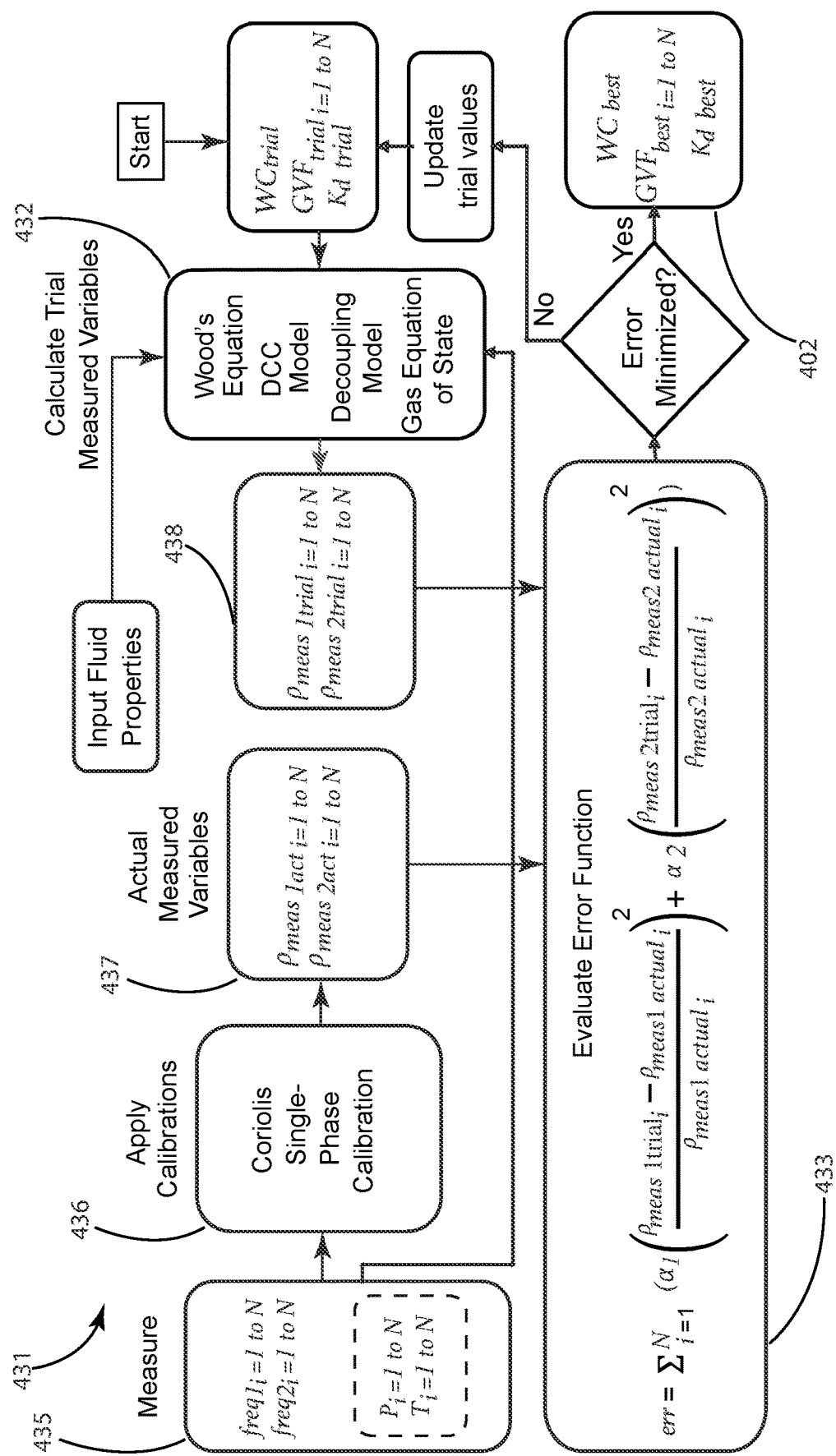
FIG. 54 is a schematic representation of an optimization process to determine a common watercut and common decoupling parameter and gas void fractions in accordance with the present disclosure.

In this particular embodiment, the values for the density and sound speed of the oil, water, and gas components that comprise the bubbly mixture are assumed to be known. Referring to FIG. 54, Wood's equation is utilized with the various models 432 within optimization procedure 431, the compressibility decoupling parameters are assumed to be known, and the density decoupling parameters at the two frequencies of a dual frequency Coriolis meter are related as disclosed herein above. The optimization parameter of watercut, gas void fraction, and a decoupling parameter at the two frequencies for each instance N over time for both frequencies are iteratively updated until the error function 433 is minimized. The optimization procedure 431 utilizes the density and sound speeds of the oil, water, and gas components, as input to various models 432, disclosed herein above such as Wood's Equation, a model for the effects of decoupling and compressibility of Coriolis meters, gas equation of state and a model linking the decoupling parameter at one frequency to the decoupling parameter at another frequency for the same fluid associated with the vibration of two modes of the same fluid-conveying flow tube to produce trial measured densities 438 for each of the N instances. Optimization procedure 431 utilizes the measured parameters 435 of the dual frequencies, and the temperature and pressure of the process fluid. Known calibrations 436 are applied to the measured frequencies at each instant assuming a single-phase fluid to determine the actual measured densities 437 at the two frequencies and these are used as input into error function 433. Such functions as those disclosed with respect to FIG. 54 and Equations 52-57 can be performed using software and hardware residing in a processor or processors of a dual frequency Coriolis meter. Embodiments also include prior art dual frequency Coriolis meters that are retrofitted to include the methods disclosed herein to correct the prior art meters for the decoupling effects of inhomogeneous process fluids including those have bubbly flow and particles.

Figure 55:
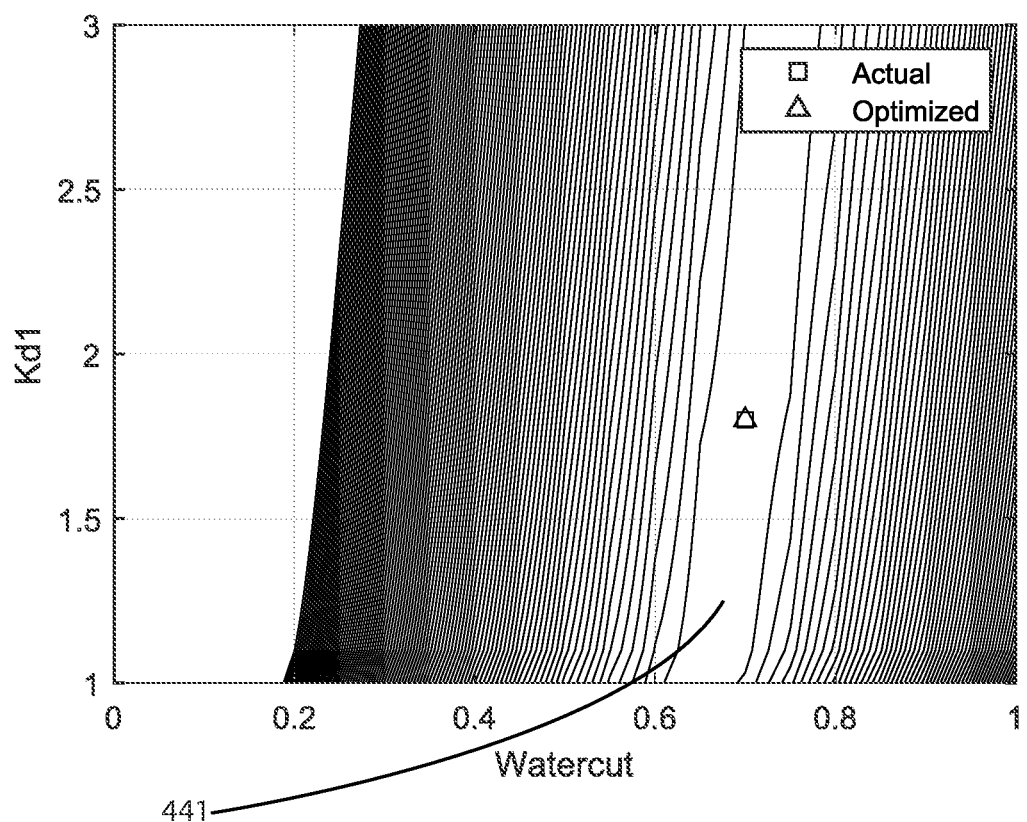
FIG. 55 is a graphical representation of an error function for a three-phase flow simulation of a dual frequency Coriolis meter enhanced with a decoupling model in accordance with the present disclosure.
Figure 56:
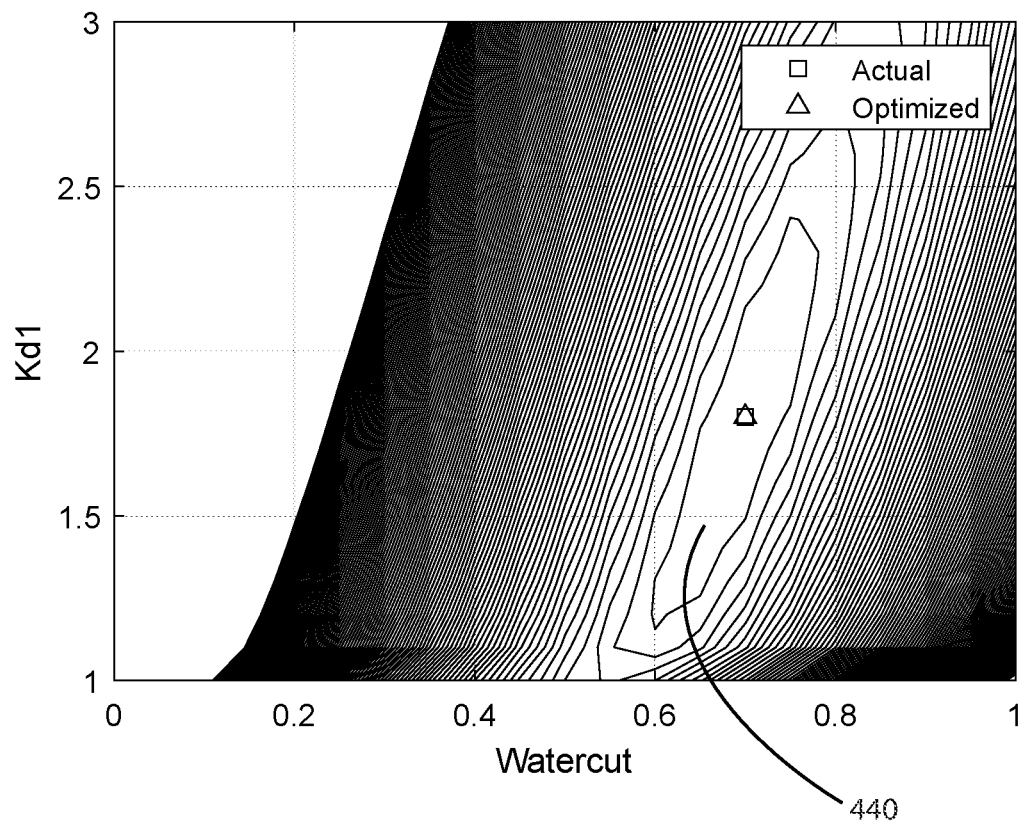
FIG. 56 is a graphical representation of an error function for a three-phase flow simulation of a dual frequency Coriolis meter enhanced with a decoupling model in accordance with the present disclosure.

FIGS. 55, 56 show a composite error function formed utilizing error functions generated using simulated data from 5 operating points. FIG. 55 shows a composite error function for a set of 5 operating points with the same watercut and decoupling parameters with the operating points at the same gas void fraction of 1% and FIG. 56 shows a composite errors function for a set of 5 operating points at 5 different gas void fractions, plotted as a function of decoupling parameter and watercut.

Referring still to FIGS. 55, 56, they are visualizations of an error function generated for 7 variables (watercut, decoupling parameter, and gas void fractions of 5 operating points associated with 5 sets of measured parameters) displayed as a contour plot over two dimensions. FIGS. 55 and 56 are the result of the optimization of Equation 55 that was formed by identifying the lowest values of the 7 dimensional global error function to identify an optimized gas void fraction for each of the 5 instances for which the two densities were measured, and then utilizing the identified best gas void fraction for each set point to construct an error function as a function of watercut and decoupling parameter that represents the sum of the contributions of each measured point at an optimized.

As shown in FIG. 56, the composition error function for the case with varying gas void fractions has contours 440 which are indicative of a unique optimization in the decoupling and watercut space, whereas in FIG. 55 the error function for which the gas void fraction was constant has an error function more indicative of trough 441 of almost-equiprobable solutions in the watercut and decoupling optimization space. Optimizations with trough-like regions of closely equiprobable solutions are likely sensitive to errors and noise in measurements and in model uncertainty, indicating that the topology of the error function for the 5 points with varying gas void fraction is preferable to the topology of the 5 points with a constant gas void fraction.

Figure 57:
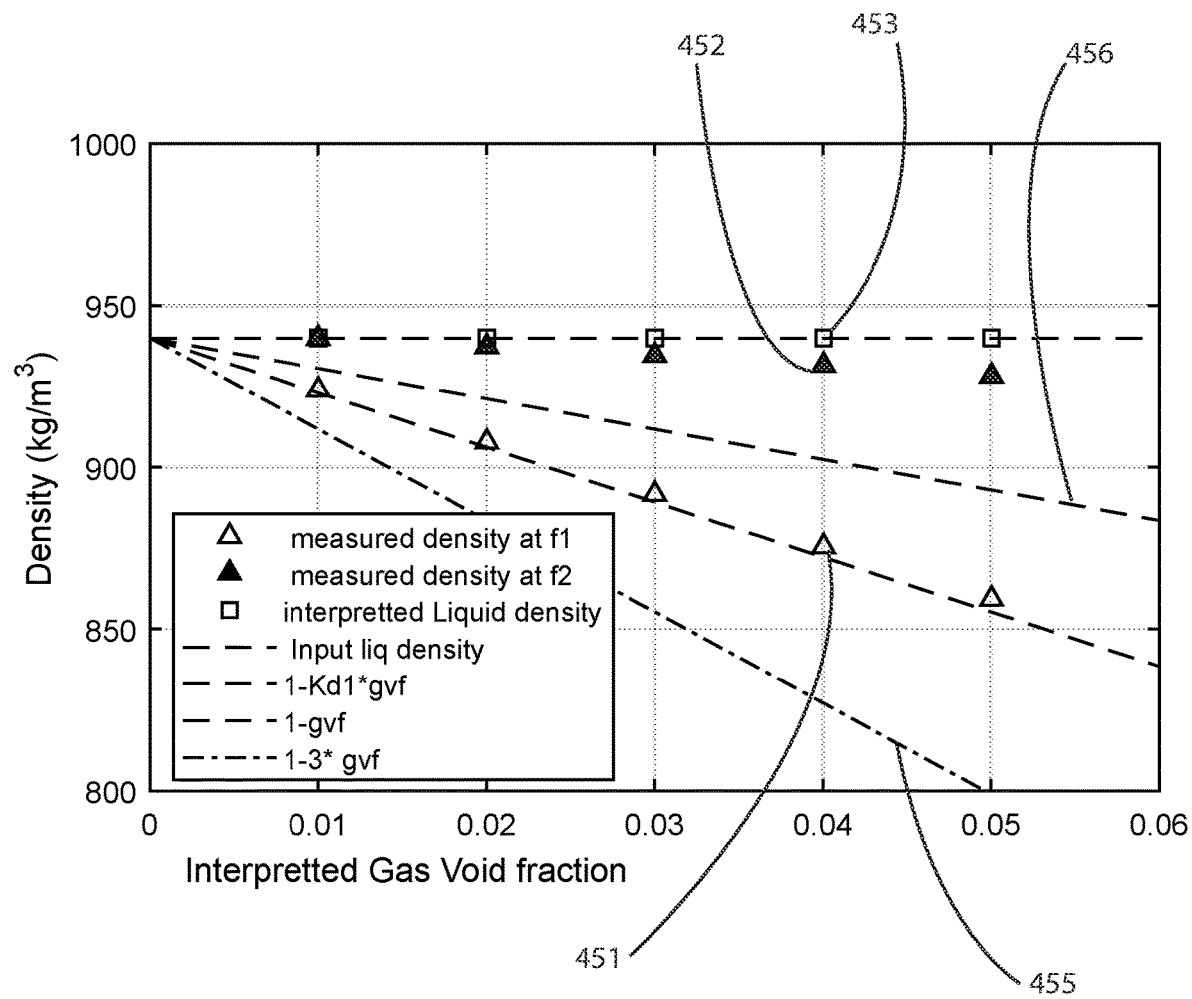
FIG. 57 is a graphical representation of density versus gas void fraction for a dual frequency Coriolis meter enhanced with a decoupling model in accordance with the present disclosure.

Referring to FIG. 57, there is shown a graphical representation of density results versus interpreted gas void fraction for a 5-point simulation with constant liquid density and varying gas void fraction without measurement noise. The density was measured at a first frequency 451 and a second frequency 452 of a dual frequency Coriolis meter, and the interpreted liquid density 453 as a function of the interpreted gas void fraction along the x-axis. Also shown are the measured density at the first frequency as expected due to decoupling 454 using the optimized decoupling parameter from optimization procedure 431 (FIG. 54) (without the effect of compressibility) as a function gas void fraction, and the expected measured density if the decoupling parameter was at the limit of low 455 ($Kd_1=1$) and high 456 ($Kd_1=3$) decoupling, indicating the broad range over which decoupling can confound the interpretation of conventional Coriolis meters operating on bubbly process fluid mixtures with unknown decoupling parameters. The results shown in the figures were generated without noise added to the measured densities.

Figure 58:
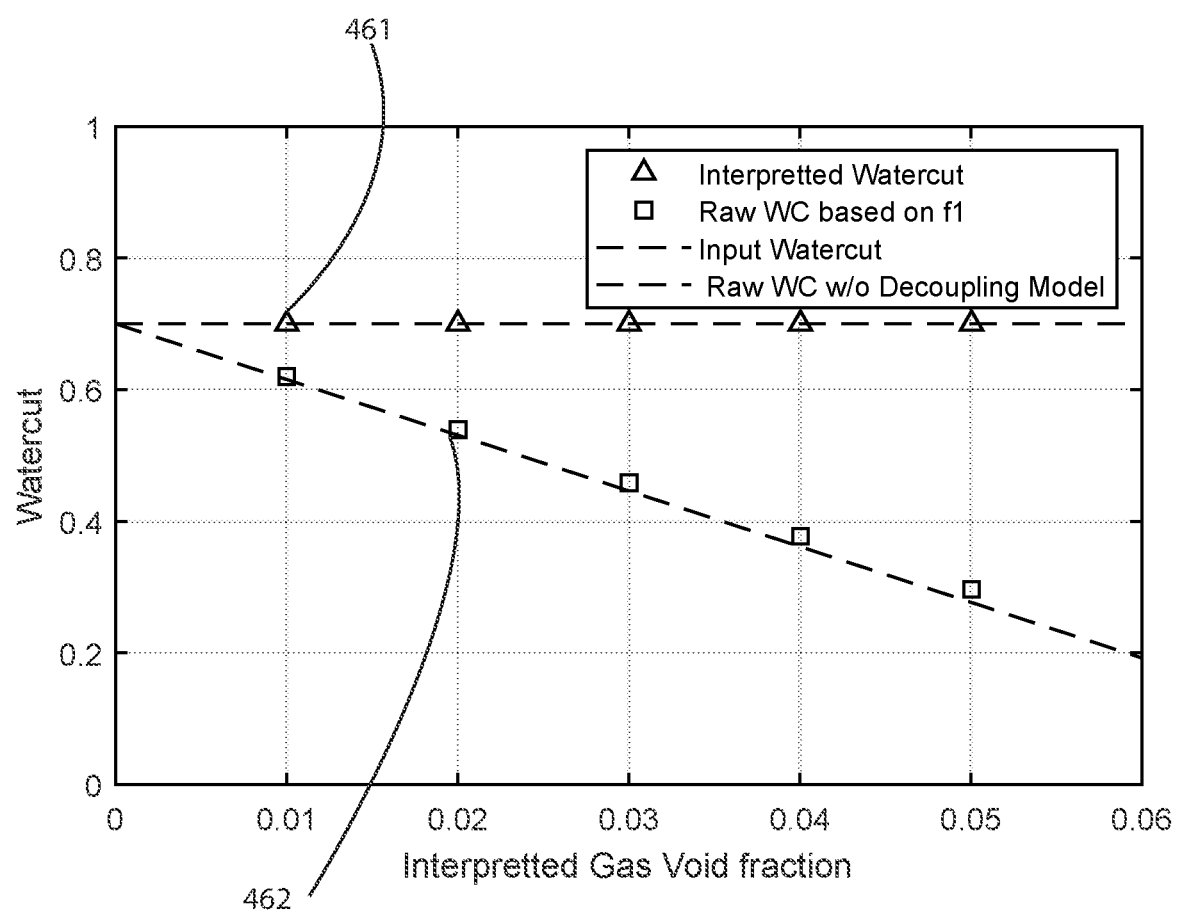
FIG. 58 is a graphical representation of density versus gas void fraction for a dual frequency Coriolis meter enhanced with a decoupling model in accordance with the present disclosure.

Referring next to FIG. 58, it shows the results of the simulation from FIG. 57, interpreted in terms of interpreted watercut 461 with the raw watercut 462 determined using the raw density measured from the first frequency 451, and the interpreted watercut utilizing the optimization procedure 431 (FIG. 54). As shown, the effects of primarily decoupling can have a significant impact on the interpreted watercut of a bubbly liquid.

Figure 59:
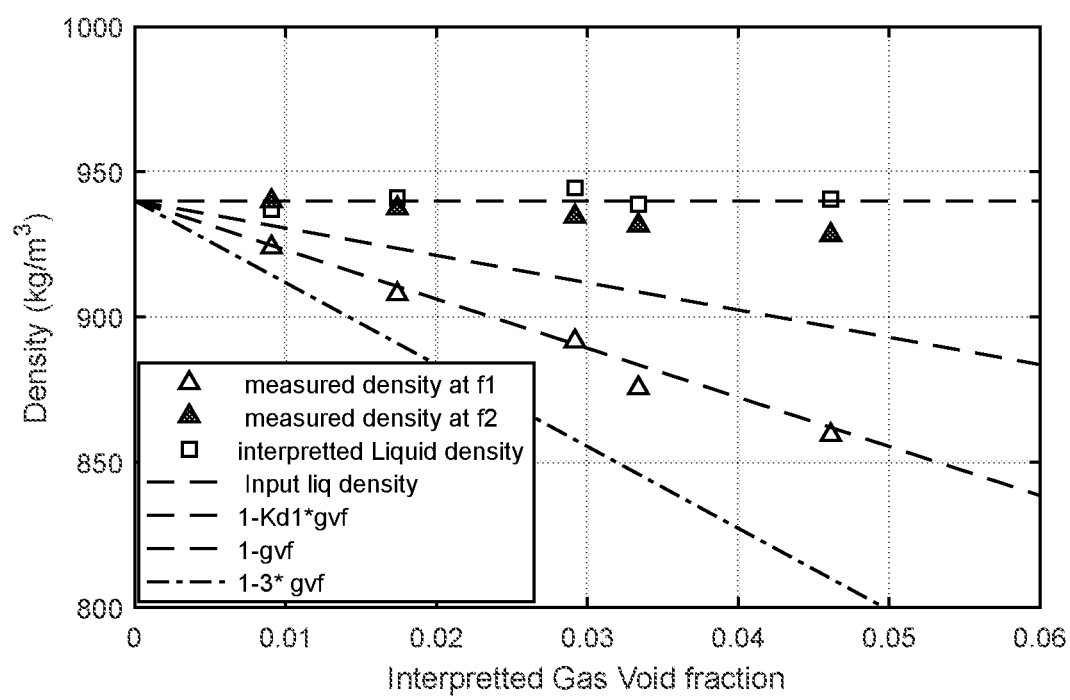
FIG. 59 is a graphical representation of density versus gas void fraction for a dual frequency Coriolis meter enhanced with a decoupling model in accordance with the present disclosure.
Figure 60:
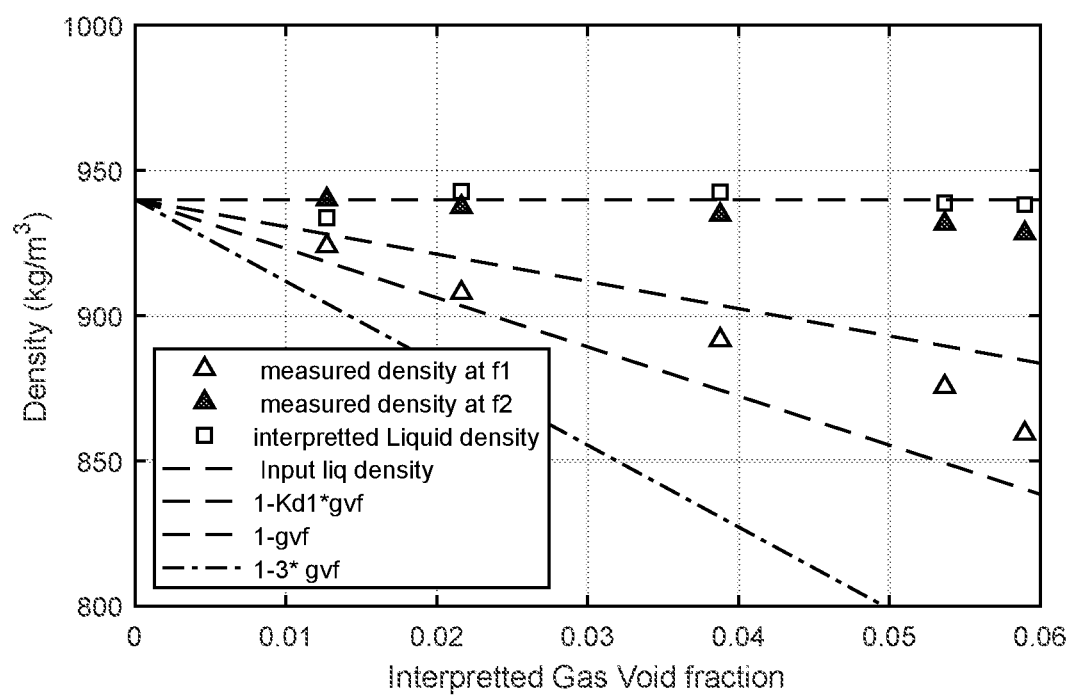
FIG. 60 is a graphical representation of density versus gas void fraction for a dual frequency Coriolis meter enhanced with a decoupling model in accordance with the present disclosure.

Next, FIG. 59 shows the results of a 5 point optimization procedure with 0.5% random noise added to the density measurements and FIG. 60 shows the results of a 5 point optimization procedure with 1.0% random noise added to the density measurements. As shown, even in the presence of noise imposed on the data, the simulation provides an accurate interpretation based on the two density measurements at each point, providing a measure of the watercut, the gas void fraction, and the decoupling parameter.

It should be noted that the 0.5% and 1.0% random noise introduced to the density measurements utilized in the optimization procedure 431 (FIG. 54) are relatively large compared to the density accuracy specifications of Coriolis meters of the prior art. A review of technical specifications prior art Coriolis meters indicates the +/−0.02% to 0.05% is a reasonable maximum uncertainty for density measurement on single phase flows. The simulations presented here have been subjected to an order of magnitude more uncertainty than that expected based on the commercial specifications of prior art Coriolis meters.

It should be appreciated by those skilled in the art that the above approach can be applied with data from any number of instances. In general, the larger the span of gas void fractions, the more robust the optimization procedure 431 will be in determining the decoupling parameter (or, by proxy, the bubble size parameter) and the liquid density (or, by proxy, the watercut of the liquid). Other considerations would be to restrict data to points for which the liquid density and decoupling parameters are essentially constant.

Also, the optimization procedure 431 (FIG. 54) for determining the decoupling parameter $K_{d1}$ does not need to be updated at the same update rate of the Coriolis meter. The optimization procedure 431 to determine the decoupling parameter can be executed periodically or based on observed characteristics of the process, such as process variability. If the decoupling parameter has been identified and assumed applicable over a range of process conditions, a similar, faster optimization can be performed to determine the watercut and gas void fraction utilizing the assumed known decoupling parameter. As indicated in FIG. 50, the error function over trial ranges of watercut and gas void fraction with a known decoupling parameter exhibits a well-defined, unique minimum utilizing measured densities from a single instance in time, enabling an efficient two-parameter optimization.

Figure 61:
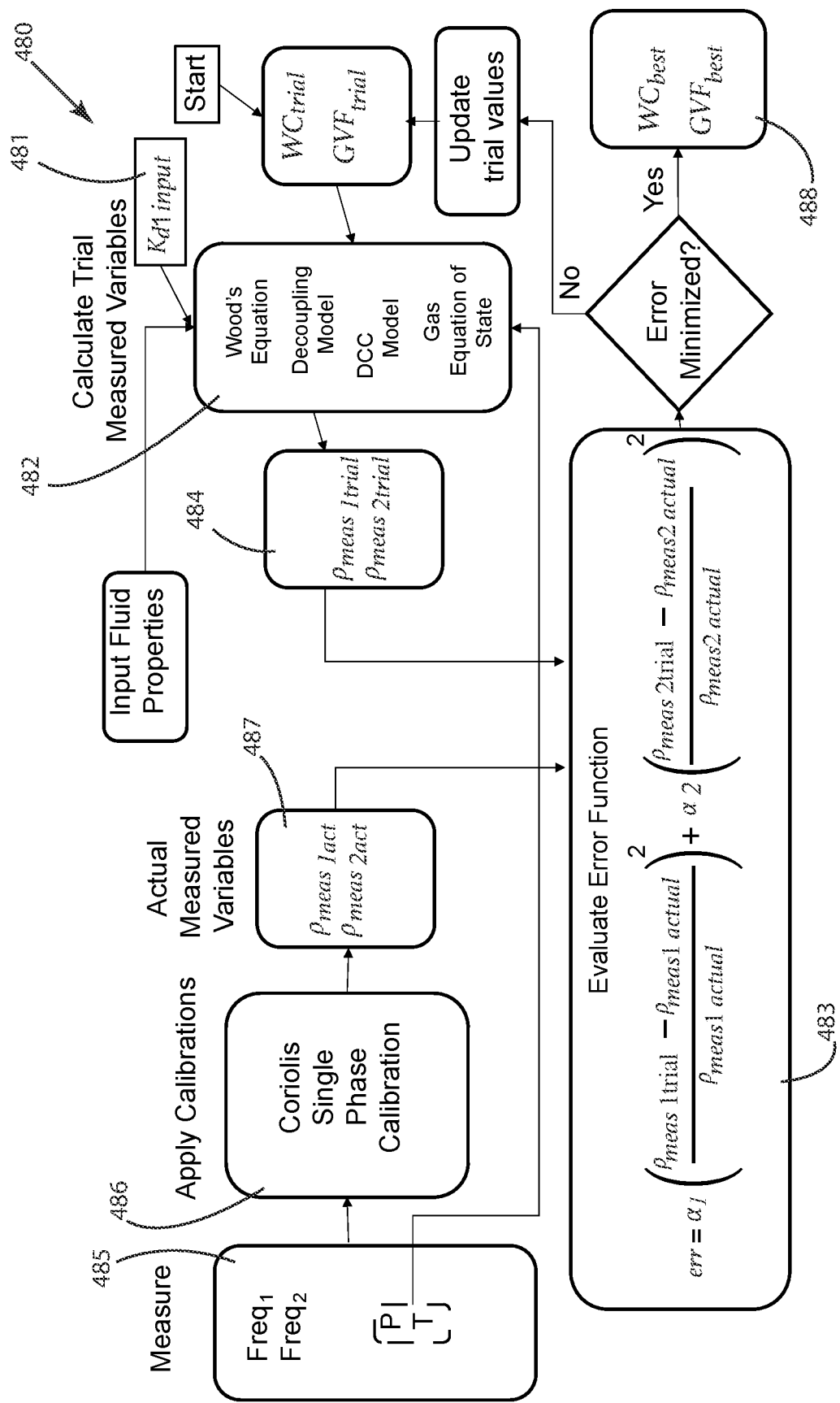
FIG. 61 is a schematic representation of an optimization process to determine watercut and gas void fraction using a dual frequency Coriolis meter with a known decoupling parameter in accordance with the present disclosure.

Referring next to FIG. 61, there is shown optimization procedure 480 to determine watercut and gas void fraction using a dual frequency Coriolis meter with known decoupling parameter. Although heretofore unknown (and therefor unused) the decoupling parameter $K_d$ can be determined using the apparatus and methods disclosed herein. In circumstances where the decoupling parameter $K_d$ has been previously determined and the characteristics of the process fluids can be assumed to have remained fairly constant, the previously determined decoupling parameter 481 can used as input to the optimization procedure 480. Similar to that described herein with reference to FIG. 54, various models 482 within optimization procedure 480 can include Wood's Equation, a model for the effects of decoupling and compressibility of Coriolis meters, gas equation of state and a model linking the decoupling parameter at one frequency to the decoupling parameter at another frequency for the same fluid associated with the vibration of two modes of the same fluid-conveying flow tube to produce trial measured densities 484 for each of the N instances. The optimization parameter of watercut and gas void fraction for each instance N over time for both frequencies are iteratively updated until the error function 483 is minimized. The optimization procedure 480 utilizes the density and sound speeds of a process fluid that can be comprised of oil, water, and gas components, as input to various models 482, disclosed herein above such as Wood's Equation, a model for the effects of decoupling and compressibility of Coriolis meters, gas equation of state and a model linking the decoupling parameter at one frequency to the decoupling parameter at another frequency for the same fluid associated with the vibration of two modes of the same fluid-conveying flow tube to produce trial measured densities 438 for each of the N instances. Optimization procedure 480 utilizes the measured parameters 485 of the dual frequencies, and the temperature and pressure of the process fluid. Known calibrations 486 are applied to the measured frequencies at each instant assuming a single phase fluid to output the measured densities 487 at the two frequencies and are used as input into error function 483. Such functions as those disclosed with respect to FIG. 61 and the various equations disclosed above can be performed using software and hardware residing in a processor or processors of a dual frequency Coriolis meter. Embodiments also include prior art dual frequency Coriolis meters that are retrofitted to include the methods disclosed herein to correct the prior art meters for the decoupling effects of inhomogeneous process fluids including those have bubbly flow and particles.

Figure 62:
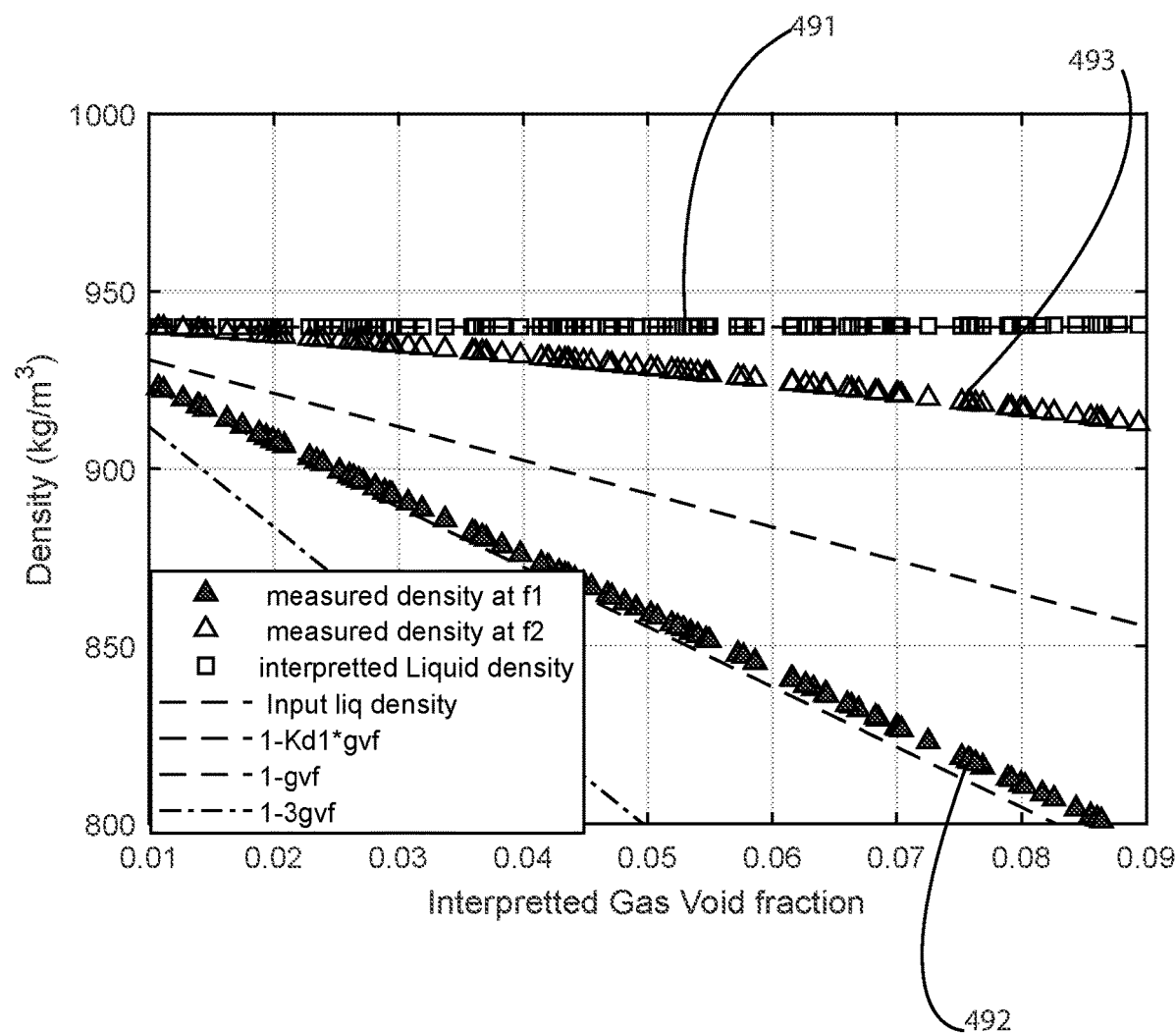
FIG. 62 is a graphical representation of density versus gas void fraction for a dual frequency Coriolis meter enhanced with a decoupling model in accordance with the present disclosure.

With reference still to FIG. 61 and further reference to FIG. 62, there is shown the results of 100 instances of simulated interpreted liquid densities 491 from a dual frequency Coriolis meter with measured liquid density at a first frequency 492 and a measured liquid density at a second frequency 493 used to optimize error function 483 with $K_{d1}$ known and fixed over a range of allowable gas void fraction and water cut based without noise added to the first frequency 492 and the second frequency 493. The simulated interpreted liquid densities 491 track the known liquid density very closely and the difference in the measured liquid densities between the first frequency 492 and the second frequency 493 increases as gas void fraction increases. As shown, with the density decoupling parameter known, a dual frequency Coriolis meter augmented with optimization procedure 480 can be used to measure mixtures with varying liquid phase densities and gas void fraction 488 with increased accuracy over the prior art.

Figure 63:
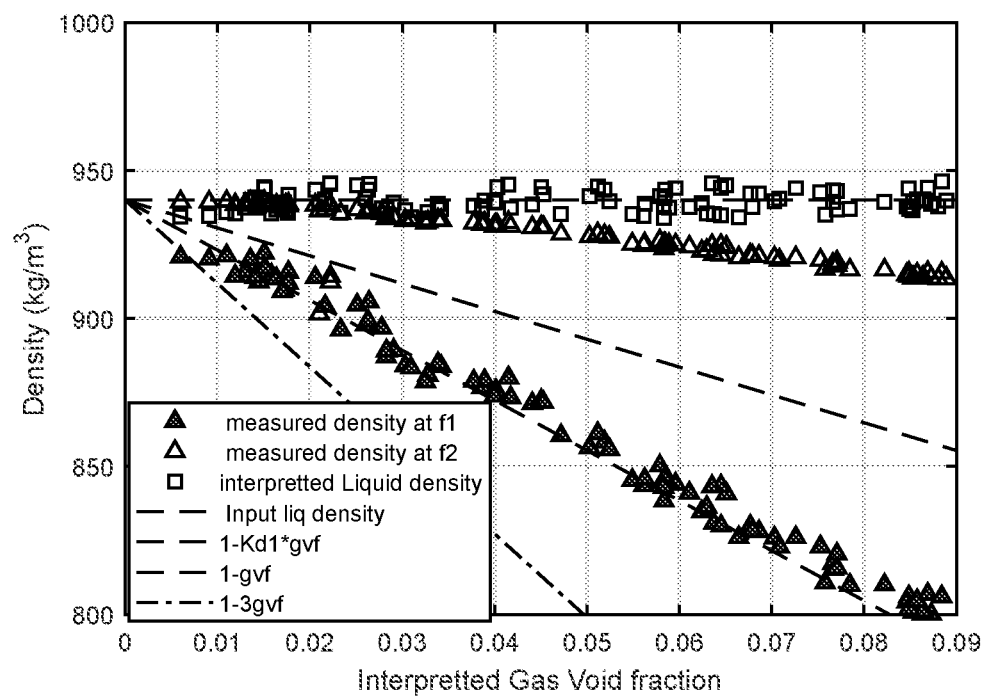
FIG. 63 is a graphical representation of density versus gas void fraction for a dual frequency Coriolis meter enhanced with a decoupling model in accordance with the present disclosure.
Figure 64:
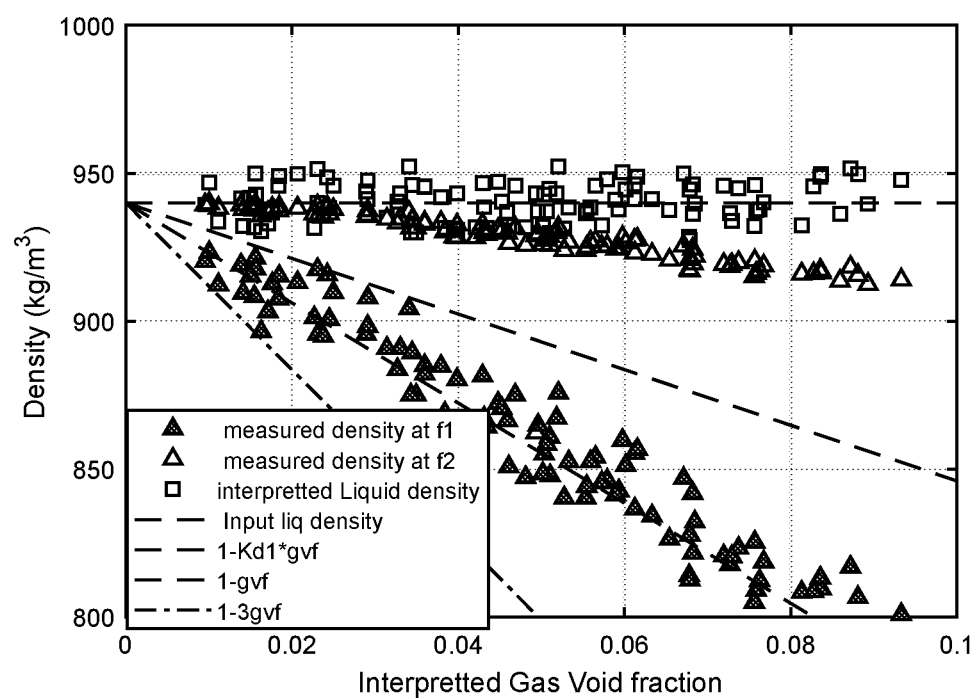
FIG. 64 is a graphical representation of density versus gas void fraction for a dual frequency Coriolis meter enhanced with a decoupling model in accordance with the present disclosure.

FIG. 63 shows examples of the optimization procedure 480 results with $K_{d1}$ fixed to determine the gas void fraction and water cut based on the two density measurements for 100 cases with 0.5% max amplitude random noise added to the measured densities 487. FIG. 64 shows examples of the optimization procedure 480 results with $K_{d1}$ fixed to determine the gas void fraction and water cut based on the two density measurements for 100 cases with 1% max amplitude random noise added to the measured densities 487. As shown, the optimization procedure 480 with known $K_{d1}$ can provide a reasonable determination of gas void fraction and watercut in the presence of significant noise.

Figure 65:
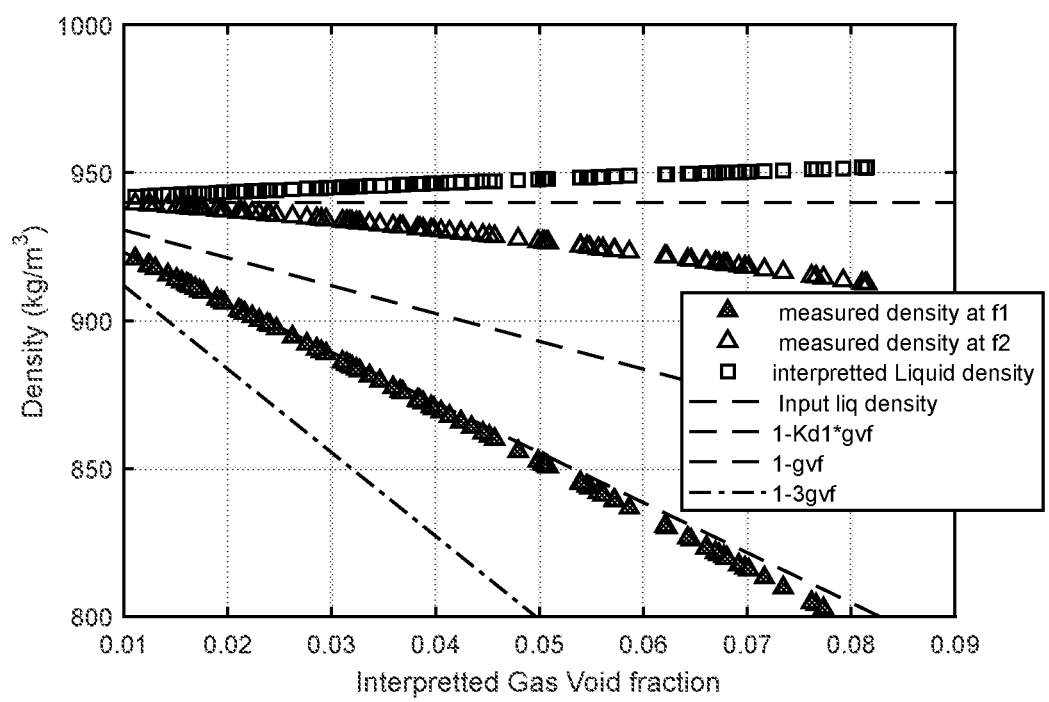
FIG. 65 is a graphical representation of density versus gas void fraction for a dual frequency Coriolis meter enhanced with a decoupling model in accordance with the present disclosure.
Figure 66:
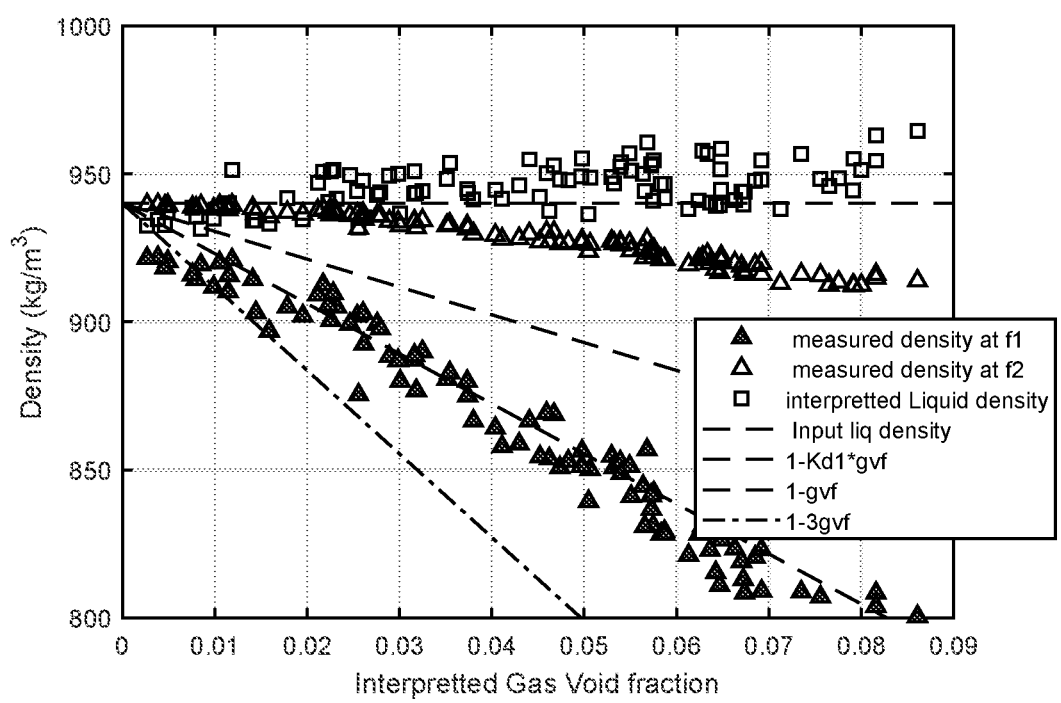
FIG. 66 is a graphical representation of density versus gas void fraction for a dual frequency Coriolis meter enhanced with a decoupling model in accordance with the present disclosure.

FIG. 65 shows examples of the optimization procedure 480 results with $K_{d1}$ used in Optimization fixed at $K_{d1}=2.1$, differing from the actual $K_{d1}$ used to simulate the measurements of $K_{d1}=1.8$ to determine the gas void fraction and water cut based on the two density measurements for a case with no noise imposed on the measured densities 487. FIG. 66 shows examples of the optimization procedure 480 results with $K_{d1}$ used in Optimization fixed at $K_{d1}=2.1$, differing from the actual $K_{d1}$ used to simulate the measurements of $K_{d1}=1.8$ to determine the gas void fraction and water cut based on the two density measurements for a case with 1% max amplitude random noise added to the measured densities 487. As shown, the dual frequency optimization procedure 480 is capable of providing an accurate measurement of the liquid density in presence of a significant error in an assumed decoupling parameter and in the presence of significant noise applied to the measured parameters.

Mass Flow Measurement of a Dual Frequency Coriolis Meter Augmented with Decoupling Parameters The decoupling parameter determined through the optimization procedure 480 of the density measurements from a dual frequency Coriolis meter can provide a good estimate of the mass flow decoupling parameter. It should be appreciated by those skilled in the art that the mass flow of the bubbly process fluid mixture can utilize the density decoupling parameter and the identified process fluid speed of sound and gas void fraction from the optimization procedure 480 to provide process fluid mass flow rate using equation 48 disclosed herein above. Assuming the bubbly flow is well-mixed, the process mass flow, density, and gas void fraction enable a determination of a process fluid flow, for example, the oil, water, and gas mass and volume flow rates.

Figure 67:
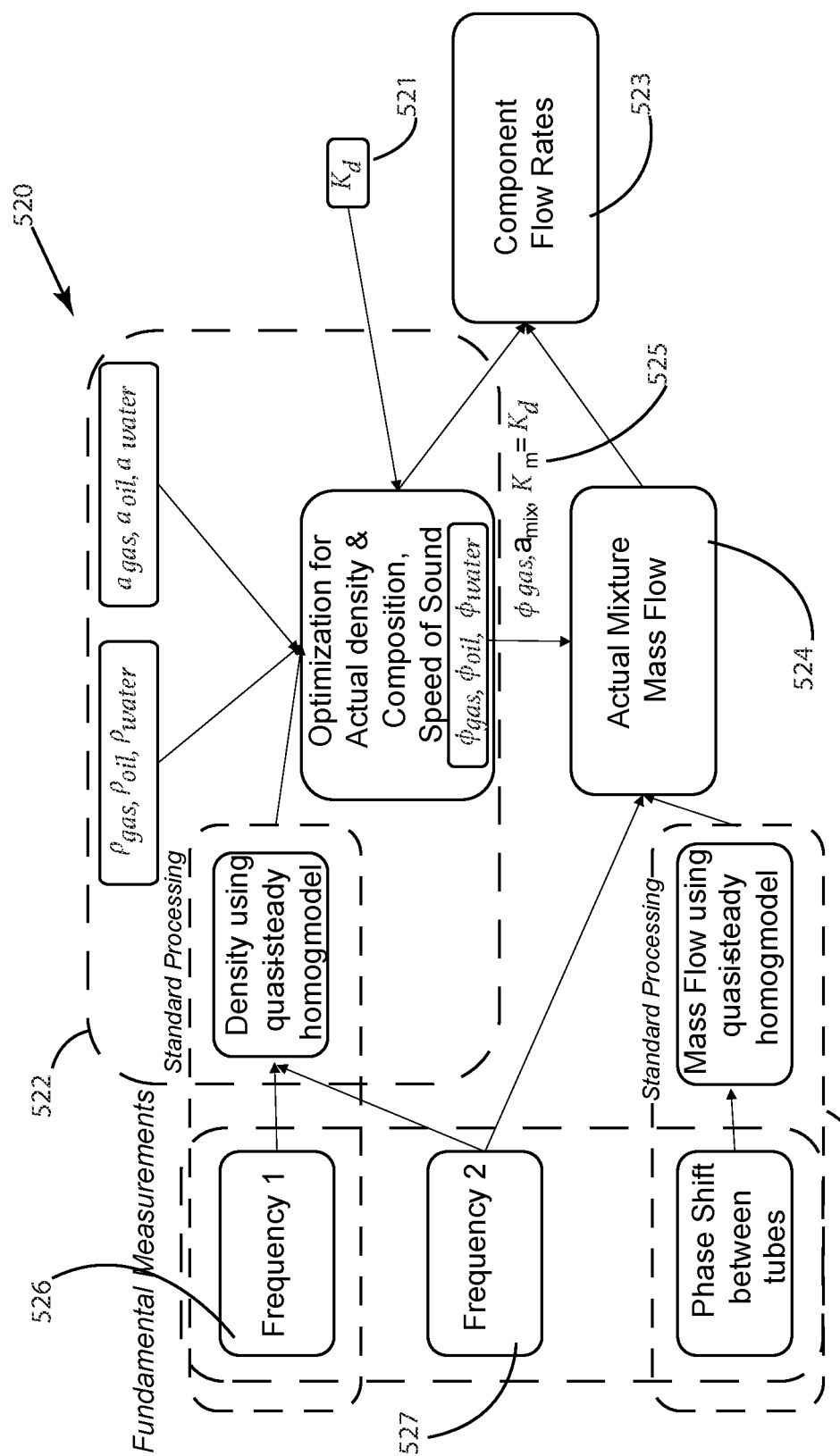
FIG. 67 is a schematic representation of an algorithm to optimize a decoupling parameter for use with a dual frequency Coriolis meter enhanced with a decoupling model in accordance with the present disclosure.

FIG. 67 shows a schematic of an algorithm 520 to measure 3-phase flows with a dual frequency Coriolis meter augmented with such an algorithm. The three phase flow may, for example, be comprised of oil, water and gas and the output includes the oil, water, and gas mass flow rates and volumetric flow rates 523. Algorithm 520 utilizes a watercut and gas void fraction optimization procedure with a specified $K_{d1}$, such as described in FIG. 61. The decoupling parameter, $K_{d1}$, could be determined utilizing an optimization procedure, such as disclosed with reference to optimization procedure of FIG. 54, based on data from a bubbly fluid operating at multiple gas void fractions. The constant $K_{d1}$ 521 in optimization procedure 522 is used to determine watercut and gas void fraction, and a process 524, which process can include a model for the effects of decoupling and compressibility on a Coriolis meter to interpret the mixture mass flow based on the measured mass flow 528 and, at least in part, on the relationships of Equation 42 which utilizes the identified density decoupling parameter 521 as the mass flow decoupling parameter, along the optimized speed of sound and gas void fraction 525 to determine mixture mass flow and mass flow rates of the oil, water, and gas components to output the volumetric flow rates 523. The liquid density measurement at a first frequency 526 and a second frequency 527 using standard processing are used as the two measured parameters in the optimization procedure 522. The phase shift between the tubes of the dual frequency Coriolis meter using standard processing together with the second frequency 527 are used as input to process 524.

Dual Frequency Coriolis Meter with Momentum-Based Differential Pressure Meter

Figure 68:
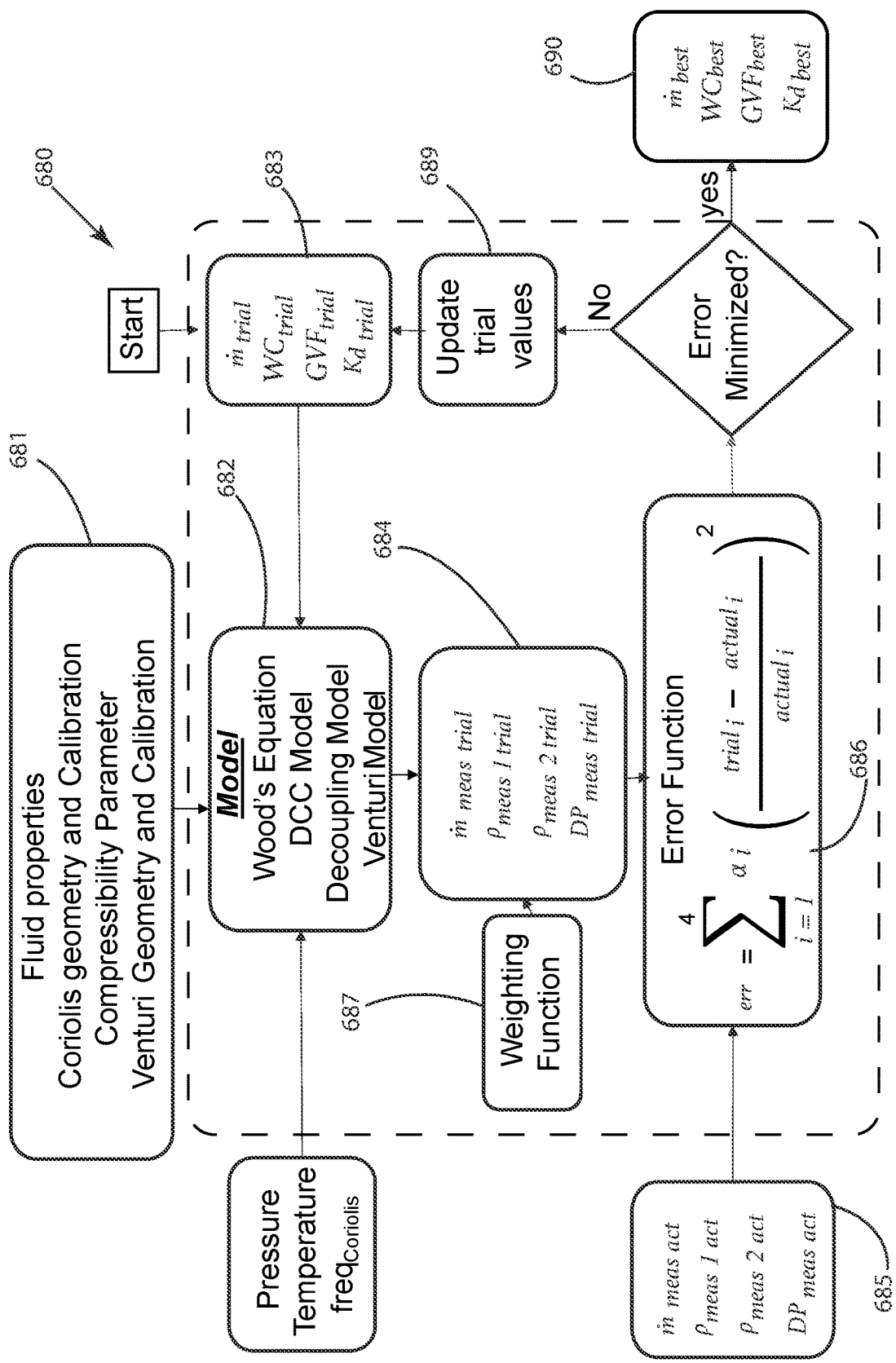
FIG. 68 is a schematic representation of an optimization process to determine optimized mass flow, watercut, gas void fraction, and a decoupling parameter in accordance with the present disclosure.

Referring next FIG. 68, there is shown an optimization process 680 for an embodiment of the current disclosure that utilizes measurements from a dual frequency Coriolis meter augmented with a momentum-based, differential pressure flow meter to inform a model-based optimization process the determine the decoupling parameters and characteristics of a multiphase flow. In this particular embodiment, the momentum-based flow meter could be installed in close proximity to the Coriolis flow (such as Venturi flow meter 258 in FIG. 29) such that the process fluid pressure and temperature conditions at the momentum-based flow meter are essentially the same as those within the Coriolis flow tubes. However, as appreciated by those skilled in the art of fluid mechanics and flow measurement, the momentum-based flow meter can be installed at any point with a process fluid piping network in communication with the Coriolis flow tubes and differences in the pressure and temperature of the process fluid can be corrected utilizing analytical models the effect of pressure and temperature on the process fluid. This particular embodiment advantageously includes several aspects for characterizing multiphase flows including a method that is relatively insensitive to errors in measured parameters, an ability to leverage the flow tubes of an existing single frequency Coriolis meter, and the with a retrofitted transmitter having a processing unit, the flexibility to install a commonly available venturi, or similar, momentum based flow meter in line with the existing Coriolis flow tubes to provide an additional measured parameter.

Optimization process 680, which utilizes process fluid properties, Coriolis and Venturi flow meter geometry and calibration information and a compressibility factor 681, as part of the input to model 682 to simulate the described process fluid measurements based on trial values of characteristics of a three phase flow. In this particular embodiment, the trial characteristics of the multiphase flow are process fluid mass flow, watercut of the liquid, decoupling parameter and gas void fraction are input as trial set 683. The three components of the flow, oil, water and gas, are assumed to be well-mixed, with each phase, or components, flowing at nominally the same flow velocity.

The model 682, which includes Wood's Equation, a decoupling compressibility Coriolis model, a decoupling model and a Venturi model (and additional models in some cases) simulates process fluid measurements 684 associated with each trial set 683. These simulated measurements 684 for each trial flow condition are compared to the actual process measurement parameters 685 within a positive-definite error function 686. The four actual process measurement parameters 685 include a mass flow measurement, a density measurement at a first frequency and a density measurement at a second frequency using a dual frequency Coriolis meter and a differential pressure measurement using a Venturi meter. Optimization process 680 includes a set of weighting functions 687 that weight errors associated with each of the simulated measurements 684. The value of the error function is evaluated at step 688 to determine if it is minimized within a tolerance, and if the error is not determined to be minimized, the trial values are updated at step 689 and the process is repeated until the error is minimized. The values of mass flow, watercut, and gas void fraction that result in the minimum error function are reported as the mass flow, watercut, density decoupling parameter $K_d$ and gas void fraction at step 690.

The values of the weighting function 687 can be updated based on available information. For example, for periods in which the drive gain of the Coriolis is low, indicating limited multiphase conditions, the weighting of the Coriolis mass flow can be increased, and the weighting on the Venturi differential pressure can be decreased. Conversely, when the drive gain is elevated, more relative weighting can be placed on the Venturi.

Figure 69:
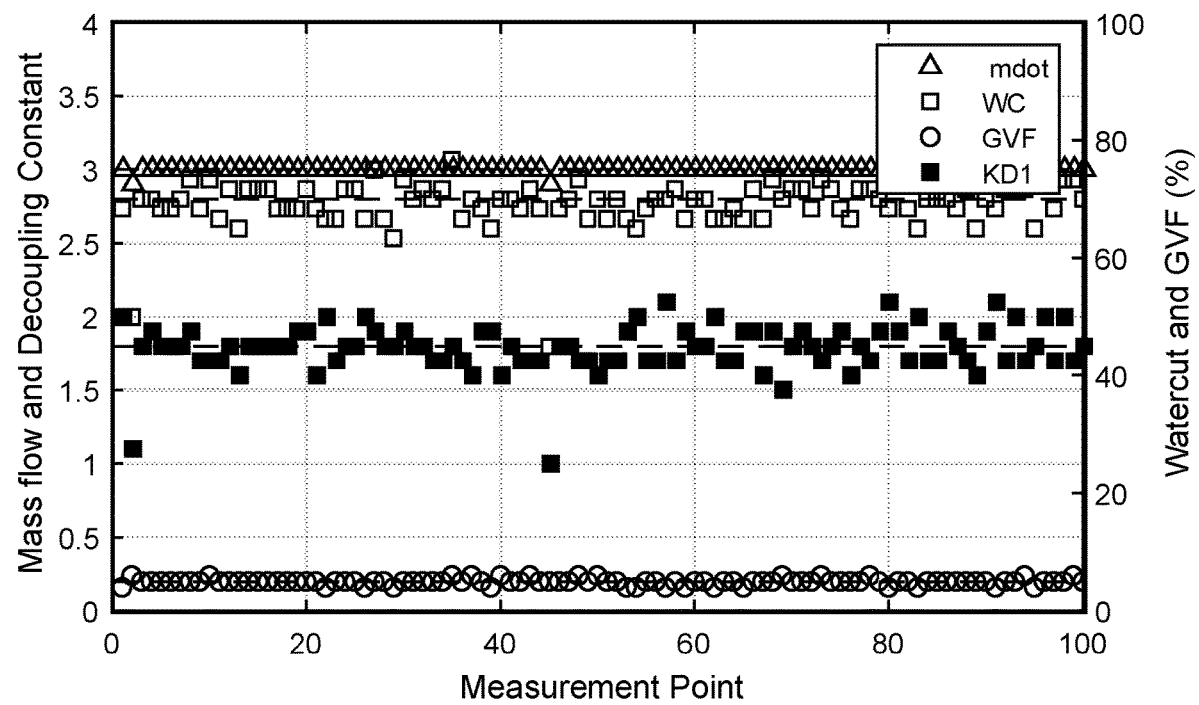
FIG. 69 is a graphical representation of a simulation of a method to determine the mass flow, watercut, gas void fraction, and decoupling parameter based on an model based optimization utilizing a measured Coriolis mass flow, a measured Coriolis density at a first frequency, and measured Coriolis density at a second frequency, and a differential pressure measurement.

The results of a simulation of the method described in FIG. 68 for a system with parameters described in Table 3 with 5% gas void fraction are shown in FIG. 69. The optimization process 680 leverages the relationship between the decoupling parameter $K_d$ based on the relationship between the inverse stokes number for the two modes of the Coriolis meter described in equations 55-57, and the model equates the mass flow decoupling parameter for the first vibratory modes to the density decoupling parameter for the first vibratory mode of the Coriolis meter. As shown in FIG. 69, the measurement system of this particular embodiment provides an accurate measure of the multiphase flow characteristics and decoupling parameter in the presence of 1% max amplitude random noise applied to the measured parameters of mass flow measurement, density measurement at a first frequency, density measurement at a second frequency and differential pressure at each of the 100 instances for which the optimization procedure was performed.

Figure 70:
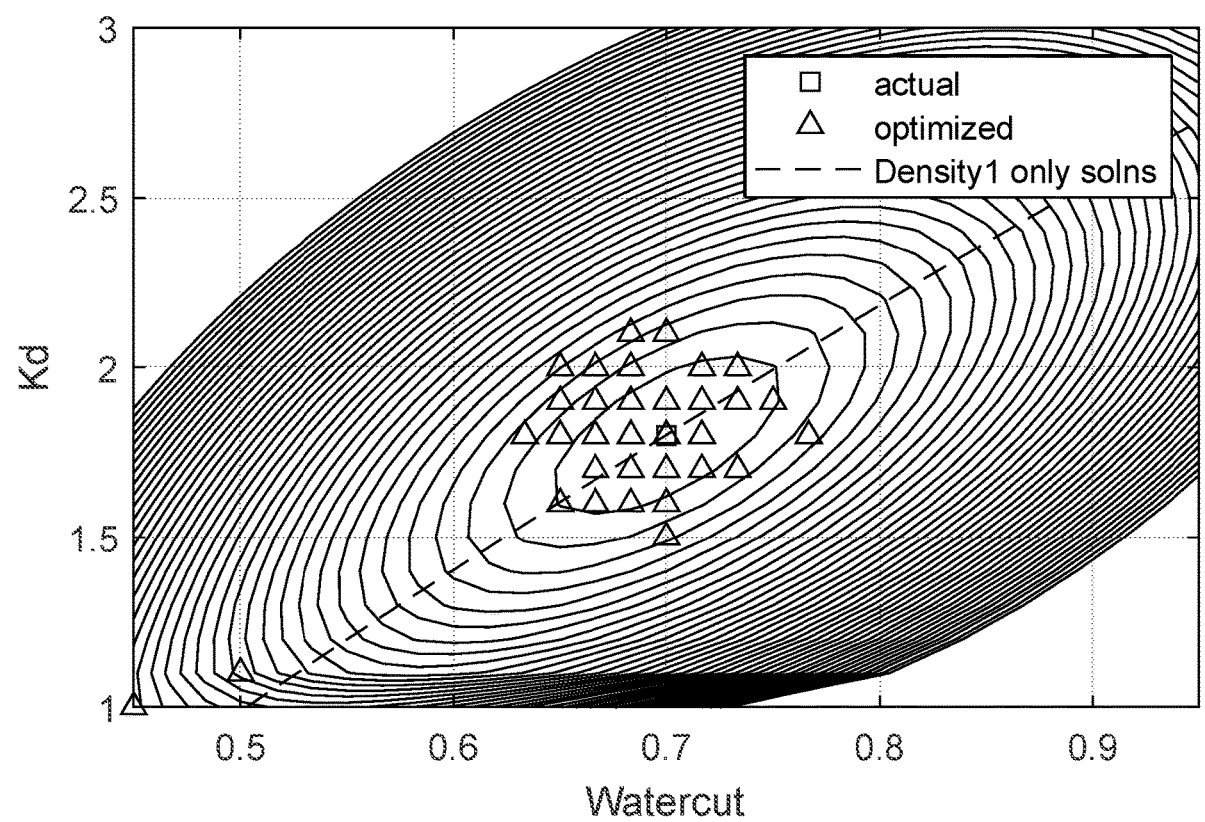
FIG. 70 is a graphical representation of an error plot for a simulation in accordance with the present disclosure.

Similar to that described herein before, FIG. 70 shows contours of an error plotted as a function of the decoupling parameter $K_d$ versus watercut generated using measured values without noise with results from a 100 point simulation with 1% maximum amplitude noise added the measured values. As shown, the cluster of points from the 100 point simulation with random noise are well aligned with the contours around the input, actual conditions.

Figure 71:
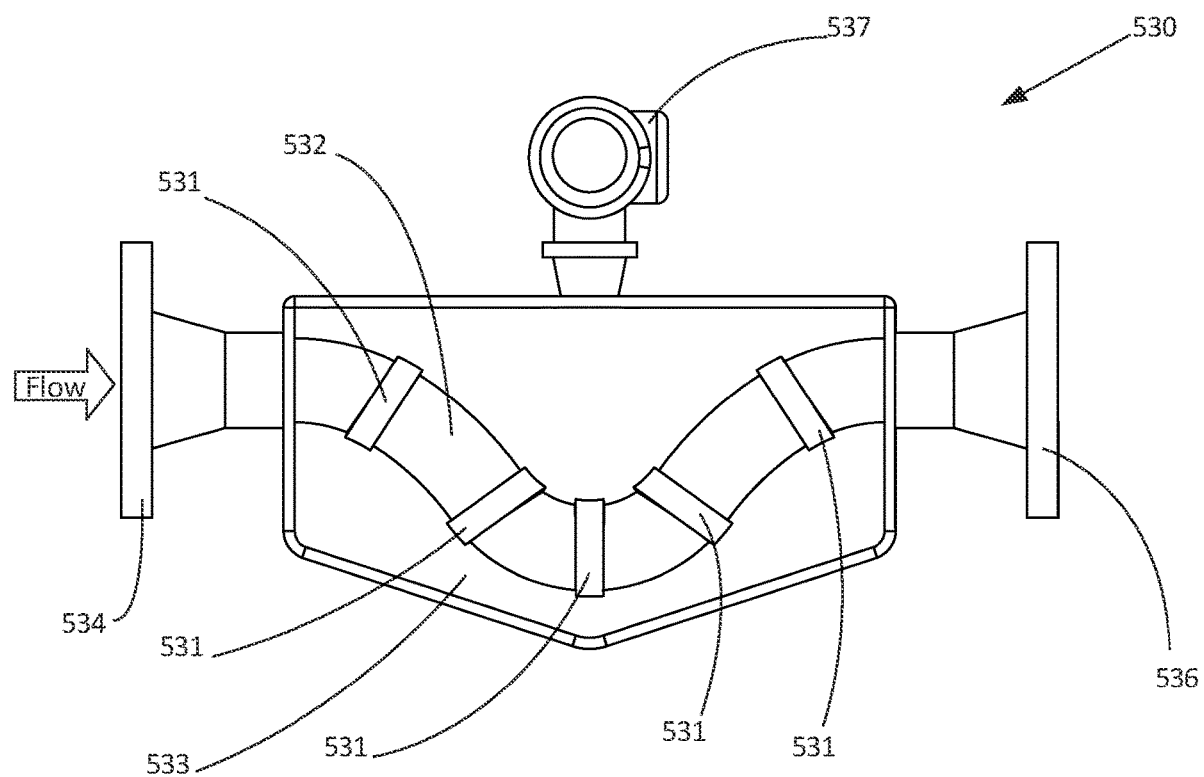
FIG. 71 is a side view of a Coriolis meter enhanced with a decoupling model in accordance with the present disclosure.

Referring to FIG. 71 there is shown a general embodiment of a Coriolis meter enhanced with a decoupling model as disclosed herein above. Although flow meter system 530 comprises a bent tube Coriolis meter with an array of strain-based pressure sensors 531 attached to the flow tube 532 positioned within housing 533, various embodiments of the present disclosure can omit such sensors without deviated from the scope of the present disclosure. The array of strain-based pressure sensors in this embodiment is to achieve a measured multiphase fluid speed of sound of the process fluid, but other methods could be utilized to determine the speed of sound of the process fluid. Flow meter system 530 further includes inlet flange 534 configured to be in fluid communication with a flow 535 of process fluid and an outlet flange 536 as well as a transmitter 537. Flow meter system 530 further includes outlet flange 536 where process fluid exits the flow meter. Transmitter 537 includes a processing unit having a processor (similar to processor 76 disclosed herein above with reference to FIG. 7) and it performs the standard Coriolis measurement requirements of the prior art such as to drive the flow tube 532 and measure and interpret the vibrational characteristic of the flow tube, as well as measure and interpret the output of the array of strain-based pressure sensors 531 in terms of process-fluid speed of sound. One embodiment of such a strain based sensor is disclosed in US Patent Application US20210010841A1, titled Apparatus and Method for Measuring Fluid Flow Parameters, having a publication date of 14 Jan. 2021. In addition, flow meter system 530 can comprise a dual frequency Coriolis flowmeter capable of driving flow tube 532 at two different frequencies or it can include a second flow tube (not shown) adapted to be driven at a second frequency different from flow tube 532. Transmitter 537 includes memory, communications capability, hardware and software capable of performing the algorithms, optimization procedures, error functions and the like described herein to provide accurate and robust measurement of measurement of single and multiphase flows as disclosed herein above. The memory of transmitter 537 can include computer system readable media in the form of volatile memory, such as random access memory (RAM) and/or cache memory. By way of example only, the memory can include a storage system that can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, nonvolatile optical disk such as a CD-ROM, DVD-ROM or other optical media can be provided. In such instances, each can be connected to a bus (not shown) by one or more data media interfaces. Transmitter 537 can include programs and utilities, having a set (at least one) of program modules, which may be stored in memory by way of example, and not limitation, as well as an operating system, one or more application programs, other program modules, and program data. Each of the operating systems, one or more application programs, other program modules, and program data or some combination thereof, may include an implementation of n optimization procedure disclosed herein. Program modules generally carry out the functions and/or methodologies of embodiments to store and analyze data.

Still referring to FIG. 71, an artificial intelligence (AI) platform can be included in transmitter 537 and can be in communication with the processing unit. In one embodiment, the AI platform may be local to memory. The AI platform provides support for identification, detection and analysis of one or more parameters and/or characteristics of a process fluid flowing through flow meter system 530 as will be disclosed in more detail herein after. As can be appreciated by those skilled in the art, the AI platform includes tools which can be, but are not limited to, an optimization procedure, an error function optimizer and an optimization algorithm. Each of these tools functions separately or combined in the AI platform to dynamically evaluate one or more process fluid parameters and/or characteristics.

As will be disclosed in detail herein below, the AI platform of flow meter system 530 of FIG. 71 can use a trained neural network to produce an optimized decoupling parameter for a process fluid. The inputs (e.g., phase difference between sensor signals, frequency of flowtube oscillation, temperature, pressure, drive gain, speed of sound, compressibility constant decoupling parameter etc.) to a neural network are based on data available to the metering system, either through raw measurements or calculations based on these measurements. The inputs are selected to provide a smooth, continuous input in relation to the outputs. Note that more than one neural network can be used depending on the measurements to be corrected. The network is trained using the raw measurements listed above from a plurality of states of liquids and matching reference data as inputs. The various equations disclosed herein above are used calculate the inputs and to calculate targets based on the reference input. The neural network is trained by calculating the corrections factors between the raw input and the reference input. The results are then used to generate corrected fluid characteristics for the plurality of states. As part of the present disclosure the trained neural network model is either hosted on, or otherwise accessed by, the AI platform of transmitter 537. The trained neural network uses the raw measurements of flow meter system 530 to calculate the processed inputs and apply the corrections form the trained neural network to produce the corrected or enhanced output.

All of the methods disclosed and claimed herein can be made and executed without undue experimentation in light of the present disclosure. While the apparatus and methods of this disclosure have been described in terms of preferred embodiments, it will be apparent to those of skill in the art that variations may be applied to the methods and in the steps or in the sequence of steps of the method described herein without departing from the concept, spirit and scope of the disclosure. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the disclosure.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated other The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. In addition, although expressed as a "decoupling parameter" or a "decoupling parameter" and referred to in various forms such as $K_d$, $K_D$, $k_D$, or $k_d$ these terms and symbols have equal meaning within this disclosure. Similarly, although expressed as a "decoupling parameter" or a "decoupling parameter" and referred to in various forms such as $K_m$, $K_M$, $k_m$ or $k_M$ these terms and symbols have equal meaning within this disclosure. Other such equivalent nomenclature should also be understood as equivalents unless otherwise expressly stated herein.

While the foregoing is directed to embodiments of the present disclosure, other and further embodiments of the disclosure may be devised without departing from the basic scope thereof, and the scope thereof is determined by the claims that follow.

REFERENCES

[1] Hemp, J., and Kutin, J. "Theory of errors in Coriolis flowmeter readings due to compressibility of the fluid being metered", Journal of Flow Measurement and Instrumentation, Volume 17, Issue 6, December 2006, Pages 359-369.

[2] Gysling, D, "An aeroelastic model of Coriolis mass and density meters operating on aerated mixtures" Journal of Flow Measurement and Instrumentation, Volume 18, Issue 2 April 2007, Pages 69-77.

[3] Weinstein, Joel, Multiphase Flow in Coriolis Mass Flow Meters-Error Sources and Best Practices, 28th International North Sea Flow Measurement Workshop 26-29 Oct. 2010.

[4] Weinstein, Method and apparatus for measuring a fluid parameter in a vibrating meter, U.S. Pat. No. 10,466,087.

[5] Weinstein, Joel, "The Motion of Bubbles and Particles in Oscillating Liquids with Applications to Multiphase Flow in Coriolis Meters", PhD Thesis, Department of Mechanical Engineering, University of Colorado Boulder, 2008.

[6] Cage, System and method for fluid compressibility compensation in a Coriolis mass flow meter, U.S. Pat. No. 6,502,466.

[7] Zhu, Hao, "Method for Ascertaining a Physical Parameter of a Gas-Containing Liquid", US Patent Application Publication US 2020/0271494 A1, Aug. 27, 2020.

[8] Gysling, D., Apparatus and method for augmenting a Coriolis meter, U.S. Pat. No. 7,299,705.

[9] Gysling, D., et al, Apparatus and method for compensating a Coriolis meter, U.S. Pat. No. 7,380,439.

[10] Basse, N. T., A review of the theory of Coriolis flowmeter measurement errors due to entrained particles, Flow Measurement and Instrumentation 37 (2014) 107-11.

[11] Zhu, Hao, Applications of Coriolis Mass Flowmeters in Bubbly of Particulate Two-Phase Flows, ISBN 978-3-8322-8216-5, Shaker-Verlag, 2009

[12] Zhu, Hao, From Disturbance to Measurement: Application of Coriolis Meter for Pattern Identification of Gas Bubbles, Flomeko 2019, 18$^{th}$ International Flow Meter Conference, Lisbon, Portugal, 2019

[13] Temkin, S., Sound Propagation in Bubbly Liquids—A Review, Naval Research Laboratory Memorandum Report 6403, 1989.

[14] Gysling, D. and Dragnea, G., Density-based Watercut using a Speed-of-Sound Augmented Coriolis Meter on a Gas/Liquid Separator with Variable Gas Carry-Under, 38$^{th}$ International North Sea Flow Measurement Workshop, 26-29 Oct. 2020

What is claimed is:

1. A method of measuring a multiphase fluid comprising:
providing a flow measuring device comprising at least one fluid-conveying flow tube conveying the multiphase fluid;
measuring a resonant frequency of a first vibratory mode of the at least one fluid-conveying flow tube at multiple of instances over a period of time;
determining a first parameter of the multiphase fluid at multiple of instances over the period of time, using the resonant frequency of the first vibratory mode of the at least one fluid-conveying flow tube;
measuring a speed of sound, at multiple of instances over the period of time, wherein the speed of sound is non-constant and comprises a speed at which sound propagates through the multiphase fluid;
determining at least one additional parameter of the multiphase fluid using the speed of sound at multiple of instances over the period of time; and
calculating a density of a liquid phase of the multiphase fluid using the first parameter and the at least one additional parameter.

2. The method of claim 1 further comprising:
calculating at least one decoupling parameter.

3. The method of claim 2 further comprising:
wherein calculating the at least one decoupling parameter is calculated concurrently with the at least one additional parameter of the multiphase fluid.

4. The method of claim 1 wherein at least one characteristic of the multiphase fluid is varying and at least one characteristic of the multiphase fluid is constant and wherein the calculating the density of the liquid phase comprises using the first parameter and the at least one additional parameter of the multiphase fluid using the speed of sound.

5. The method of claim 2 wherein the at least one decoupling parameter comprises a density decoupling parameter, the method further comprising measuring a measured mass flow and utilizing the density decoupling parameter to calculate a mass flow decoupling parameter and utilizing the mass flow decoupling parameter and the measured mass flow to determine a mass flow rate of the multiphase fluid.

6. The method of claim 5 further comprising:
calculating a bubble size parameter using the at least one decoupling parameter.

7. The method of claim 1 wherein measuring the resonant frequency of the first vibratory mode and measuring the speed of sound occur simultaneously over at least one period of time for which at least one characteristic of the multiphase fluid is essentially constant.

8. The method of claim 7 further comprising measuring a differential pressure generated at least in part by a flow of the multiphase fluid through a cross sectional area change within a process fluid piping network of the multiphase fluid.

9. The method of claim 7 in which the at least one characteristic of the multiphase fluid is the density of the liquid phase.

10. A flowmeter system comprising:
a flow measuring device comprising:
at least one flow tube configured to convey a multiphase fluid and capable of measuring a first parameter of the multiphase fluid wherein the first parameter comprises a parameter indicative of a resonant frequency of a first vibratory mode of the flow tube; and
the flow measuring device further configured to measure a speed of sound of the multiphase fluid; and
a processing unit configured to:
receive the first measured parameter and the measured speed of sound; and determine at least one additional parameter of the multiphase fluid using the speed of sound at multiple of instances over a period of time; and calculate a density of a liquid phase of the multiphase fluid using the first parameter and the at least one additional parameter.

11. The flowmeter system of claim 10 further comprising: the processing unit configured to calculate at least one decoupling parameter.

12. The flowmeter system of claim 11 further comprising: the processing unit configured to calculate the density of the liquid phase concurrently with the at least one characteristic of the multiphase fluid.

13. The flowmeter system of claim 11 wherein the at least one decoupling parameter comprises a density decoupling parameter, the flow measuring device is further configured to measure a measured mass flow and wherein the density decoupling parameter is utilized to determine a mass flow decoupling parameter and wherein the mass flow decoupling parameter and the measured mass flow are utilized to determine a mass flow rate of the multiphase fluid.

14. The flowmeter system of claim 13 wherein the flowmeter system is further configured to calculate a bubble size parameter using the at least one decoupling parameter.

15. The flowmeter system of claim 10 wherein the period of time occurs when at least one characteristic of the multiphase fluid is varying and at least one of characteristic of the multiphase fluid are constant or known and the flowmeter system is configured to calculate the at least one decoupling parameter using the first parameter and the speed of sound.

16. The flowmeter system of claim 10 wherein the flowmeter system is further configured to measure the first measured parameter and the at least one additional parameter are measured simultaneously over at least one period of time for which a characteristic of the multiphase fluid is essentially constant.

17. The flowmeter system of claim 16 further comprising a differential pressure meter generated at least in part by a flow of the multiphase fluid through a cross sectional area change within a process fluid piping network of the multiphase fluid.

18. A method of correcting a Coriolis flow meter measurement of a multiphase fluid, the Coriolis flow meter measurement comprising at least one flow tube configured to convey a multiphase process fluid and capable of measuring a resonant frequency of a first vibratory mode of the flow tube at multiple of instances over a period of time, the method comprising:

determining a first parameter of the multiphase fluid at multiple of instances over the period of time;

configuring a device to measure a speed at which sound propagates through the multiphase fluid at multiple of instances over the period of time and to determine at least one additional parameter of the multiphase fluid using the speed at which sound propagates at multiple of instances over the period of time; and configuring a processing unit to receive the first parameter and the at least one additional parameter and to determine a density of a liquid phase of the multiphase fluid.

19. The method of claim 18 further comprising: configuring the processing unit to determine at least one decoupling parameter.

20. The method of claim 19 further comprising configuring the processing unit to calculate a bubble size parameter using the at least one decoupling parameter.

21. The method of claim 18 further comprising: configuring the processing unit to determine the at least one decoupling parameter concurrently with the at least one additional parameter of the multiphase process fluid.

22. The method of claim 18 further comprising configuring the processing unit to measure the first parameter and the speed of sound at the multiple of instances over the period of time over which at least one characteristic of the multiphase fluid is varying and at least one of characteristic of the multiphase fluid are constant or known and to determine the at least one decoupling parameter using the first parameter and the speed at which sound propagates.

23. The method of claim 18 further comprising configuring the processing unit to measure the first parameter and the speed at which sound propagates simultaneously over at least one period of time for which a characteristic of the multiphase process fluid is essentially constant.

24. The method of claim 23 further comprising correcting the Coriolis flow meter measurement of the multiphase fluid with a measure of a differential pressure generated at least in part by a flow of the multiphase fluid through a cross sectional area change within a process fluid piping network of the multiphase fluid.

25. The method of claim 18 wherein the at least one decoupling parameter comprises a density decoupling parameter further comprising correcting the Coriolis flow meter measurement of the multiphase fluid to measure a measured mass flow and configuring the processing unit to determine a mass flow decoupling parameter and to determine a mass flow rate of the multiphase process fluid utilizing the mass flow decoupling parameter and the measured mass flow.

\* \* \* \* \*